US010477027B1

United States Patent
Howard

(10) Patent No.: US 10,477,027 B1
(45) Date of Patent: *Nov. 12, 2019

(54) QUEUEING MULTI-CHANNEL COMMUNICATIONS FOR A CONTACT CENTER

(71) Applicant: Noble Systems Corporation, Atlanta, GA (US)

(72) Inventor: Michael L. Howard, Austin, TX (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/402,649

(22) Filed: May 3, 2019

Related U.S. Application Data

(63) Continuation of application No. 16/216,382, filed on Dec. 11, 2018, now Pat. No. 10,348,904.

(51) Int. Cl.
| | |
|---|---|
| *H04M 3/00* | (2006.01) |
| *H04M 3/523* | (2006.01) |
| *H04Q 3/00* | (2006.01) |
| *H04L 29/06* | (2006.01) |

(52) U.S. Cl.
CPC ....... *H04M 3/5233* (2013.01); *H04M 3/5235* (2013.01); *H04M 3/5238* (2013.01); *H04Q 3/0029* (2013.01); *H04L 65/1069* (2013.01)

(58) Field of Classification Search
CPC .............. H04M 3/5233; H04M 3/5235; H04L 65/1069
USPC ....... 379/265.01–265.14, 266.01–266.1, 309
See application file for complete search history.

(56) References Cited

U.S. PATENT DOCUMENTS

| | | | |
|---|---|---|---|
| 5,754,639 A | 5/1998 | Flockhart et al. | |
| 6,088,444 A | 7/2000 | Walker et al. | |
| 6,493,695 B1 | 12/2002 | Pickering et al. | |
| 6,535,601 B1 | 3/2003 | Flockhart et al. | |
| 6,859,529 B2 | 2/2005 | Duncan et al. | |
| 7,110,525 B1 | 9/2006 | Heller et al. | |
| 7,158,628 B2 | 1/2007 | McConnell et al. | |
| 7,269,253 B1 | 9/2007 | Wu et al. | |
| 8,000,989 B1 | 8/2011 | Kiefhaber et al. | |

(Continued)

OTHER PUBLICATIONS

Ten of the Best Ways to Efficiently Manage Inbound Calls in your Call Center, Danny Cresswell, Contact Center Management, Syntext Blog, Telecoms, Nov. 2, 2014.

(Continued)

*Primary Examiner* — William J Deane, Jr.

(57) ABSTRACT

Various embodiments of the invention provide methods, systems, and computer program products for routing a communication in a contact center. Specifically, a treatment is selected for a communication from a plurality of treatments. Here, each treatment includes a plurality of agents to handle communications placed in the treatment and a set of queues in which each queue includes a value range. A determination is made as to whether the communication is using a chaining or non-chaining channel. If the communication is using a chaining channel, then a target agent designated to handle communications placed in the treatment using the chaining channel and corresponding queue are identified based on a value of the communication. If the communication is using a non-chaining channel, then a queue is selected from the set of queues for the treatment based on the value of the communication falling within the value range for the queue.

18 Claims, 40 Drawing Sheets

(56) References Cited

U.S. PATENT DOCUMENTS

| | | |
|---|---|---|
| 8,472,611 B2 | 6/2013 | Chrishti |
| 8,781,100 B2 | 7/2014 | Spottiswoode et al. |
| 8,903,079 B2 | 12/2014 | Xie et al. |
| RE45,959 E | 3/2016 | McCord et al. |
| RE46,181 E | 10/2016 | Monza et al. |
| 9,712,679 B2 | 7/2017 | Chrishti et al. |
| 10,091,361 B1 | 10/2018 | Howard |
| 10,116,798 B1 | 10/2018 | Howard |
| 10,200,537 B1 | 2/2019 | Howard |
| 2001/0024497 A1 | 9/2001 | Campbell et al. |
| 2004/0081183 A1 | 4/2004 | Monza et al. |
| 2004/0083195 A1 | 4/2004 | McCord et al. |
| 2004/0103017 A1 | 5/2004 | Reed et al. |
| 2009/0190747 A1 | 7/2009 | Spottiswoode |
| 2014/0249873 A1 | 9/2014 | Stephan et al. |

OTHER PUBLICATIONS

Notice of Allowance Received for U.S. Appl. No. 15/875,288 dated Jul. 5, 2018.

Notice of Allowance Received for U.S. Appl. No. 16/054,511 dated Sep. 6, 2018.

Notice of Allowance Received for U.S. Appl. No. 16/140,720 dated Nov. 14, 2018.

Queueing Models for Call Centres, Mag. DI Dr. Christian Dombacher (9125296) Nikolaus Lenaugasse 8 A-2232 Deutsch-Wagram, May 13, 2010.

Resource Pools within Resource Pools, https://www.simul8.com/support/help/doku.php?id=features:pool_within_pool, Aug. 17, 2017.

QUEUEING MULTI-CHANNEL COMMUNICATIONS FOR A CONTACT CENTER

CROSS REFERENCE TO RELATED APPLICATIONS

This application is a continuation of U.S. patent application Ser. No. 16/216,382, filed on Dec. 11, 2018, of which the entire contents are incorporated by reference for all that they teach.

BACKGROUND

Many contact centers generally address three questions with respect to handling inbound and/or outbound communications, such as telephone calls, short messaging service ("SMS") messages, multimedia messaging service ("MMS") messages, Web chats, emails, etc. The first of these questions is what are the best treatments to institute for handling the communications? A treatment is considered a process used to conduct a particular communication. For example, a contact center may define a treatment that involves having telephone calls from remote parties who primarily speak Spanish handled by agents working for the contact center who also primarily speak Spanish.

In many instances, a contact center's objective is to route each communication to a particular treatment that results in maximizing the benefit of the communication to the contact center and/or business for whom the contact center is handling the communication. Typically, a contact center applies some set of criteria and/or associated business rules to select the best treatment for a particular communication. This can be as simple as routing a communication to an agent who speaks the same language as the remote party involved with the communication or as complex as making use of predictive models in a variety of ways Thus, many contact centers are routinely faced with determining what treatments to support and what logic to use to determine which treatment to apply to each communication. The answer to these two inquires varies based on the nature of the business, its products and/or services, and its client/prospect service philosophy.

The second question many contact centers consider with respect to handling communications is how should queues used for holding communications waiting to be serviced be structured and managed to attempt to derive optimal gain for the contact center and/or business? Generally speaking, once a family of treatments is established, some approach to structuring and managing the queues for the different treatments must also be established. For instance, one approach is to have a separate pool of agents dedicated to serving each treatment queue. While another approach is to have a single pool of agents that collectively handles all treatment queues, in effect creating a single queue combining all treatments.

However, the first approach is typically too restrictive in terms of dealing with intermittent phenomena such as agent idle time and random or deterministic call arrival rate surges. While the second approach can reduce the total number of agents needed to service the totality of treatment queues, but tends to degrade quality and effectiveness of service for all treatments. In some instances, a contact center may institute a compromise between the two approaches to attempt to capture the strong points of both. For example, one method is to give each agent a primary assignment to handle only communications for a specific treatment, but allows agents who are trained to handle more than one treatment to divert from their primary assignment under special circumstances such as when they become idle or when other treatment queues have temporary surges in demand. In addition, other considerations arise when a given treatment is multichannel and multitasking (individual agents handle communications from more than one channel).

Finally, the third question many contact centers consider with respect to handling communications is how should agent staff be trained and assigned to individual queues to support chosen business goals while minimizing cost? Therefore, some systematic process is needed for hiring and training agents, and that process needs to support the selected family of treatments and the chosen approach to queue management. Due to agent attrition and changes in overall communication volumes, it is generally necessary to hire, train, and lay off agents on an ongoing basis, while striving to retain and further develop highly productive members of the staff. After preliminary steps such as formal courses and shadowing of experienced agents, training has to transition to actual handling of communications. Ideally there would be some process for routing more routine communications, or communications that are deemed of less importance, to agents who are in training or who are less experienced. Another important goal is to reduce overall staff levels without significant degradation of response times or service quality, at least for parties who contribute materially to the stability and/or growth of the business. Again, additional considerations arise when a given treatment is multichannel and multitasking. For example, when a treatment is multichannel then the agents assigned to the treatment often need to be cross-trained on the channels of communication associated with the treatment.

Therefore, a need in the art exists that would facilitate contact centers in better addressing questions two and three once the contact centers have decided on which treatments to support. It is with respect to these considerations and others that the disclosure herein is presented.

SUMMARY

Various embodiments of the invention provide computer program products, methods, systems, apparatus, and computing entities for routing a communication involving a remote party in a contact center. Specifically, a treatment is selected for a communication from a plurality of treatments supported by the contact center. Generally speaking, each treatment is applicable to a reason and/or an opportunity for conducting a communication with a remote party. In addition, each treatment includes a plurality of agents assigned to handle communications placed in the treatment and includes a set of queues in which each queue in the set of queues includes a communication value range and a set of agents from the plurality of agents who are assigned to handle communications placed in the queue.

Accordingly, a communication value is determined in various embodiments for the communication based on a computation that is specific to the selected treatment. In addition, a determination is made as to whether the communication is using a chaining channel that is a channel of communication facilitating the remote party exchanging a sequence of single directional non-interactive communications with one or more agents or a non-chaining channel that is a channel of communication facilitating the remote party conducting a bi-directional interactive communication with one or more agents. In particular embodiments, the communication value is required to be a positive number to properly support processing of communications placed in a queue.

If the communication is using a chaining channel, then a determination is made in particular embodiments as to whether the communication is part of an existing chain of communications being conducted between the remote party and at least one agent. If so, then the communication is placed in a queue for the agent that is configured to hold communications assigned to the agent that are using the chaining channel. The communication is then connected with the agent upon the agent becoming available.

However, if the communication is not part of an existing chain, then a target agent is identified in particular embodiments from a group of agents who are designated to handle communications placed in the selected treatment using the chaining channel based on the value of the communication and a ranking of the target agent with respect to the other agents who are designated to handle communications placed in the selected treatment using the chaining channel. Here, the communication is placed in a queue for the target agent that is configured to hold communications using the chaining channel that are assigned to the target agent. Although in particular instances, the queue may also be configured to hold communications assigned to the agent that are using a second chaining channel different than the chaining channel. As a result, the communication is connected to the target agent upon the target agent becoming available.

If the communication is not using a chaining channel, but is using a non-chaining channel instead, then in particular embodiments a queue is selected from the set of queues for the selected treatment based on the value for the communication falling within the communication value range for the queue. The communication is placed in the selected queue so that the communication can be connected to an agent from the set of agents assigned to handle the communications placed in the queue and accordingly, the communication is connected with the agent upon the agent becoming available to handle the communication.

In particular embodiments, one or more of the queues in the set of queues used for non-chaining channels may include a service level requirement identifying a level of service that is to be maintained by the set of agents assigned to handle the communications placed in that queue. In addition, one or more of the queues in the set of queues may be configured to hold communications assigned to the queues that are using a second non-chaining channel different than the non-chaining channel. Further, the communication value range for each queue in the set of queues may be sequentially positioned to the communication value range for another queue of the set of queues for the selected treatment.

Furthermore, a priority value may be determined for the communication placed in the selected queue based on the value of the communication and an amount of time the communication has waited in the selected queue. Here, the communication may then be connected with the agent based on the priority value for the communication being higher than the priority values for all other communications that have been placed in the selected queue. Finally, in particular embodiments, for at least one of the set of queues, the communication value range for each queue in the set of queues, and the set of agents assigned to handle communications placed in each queue in the set of queues may be re-established in response to a change in a current condition of the contact center that affects a performance of the selected treatment.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
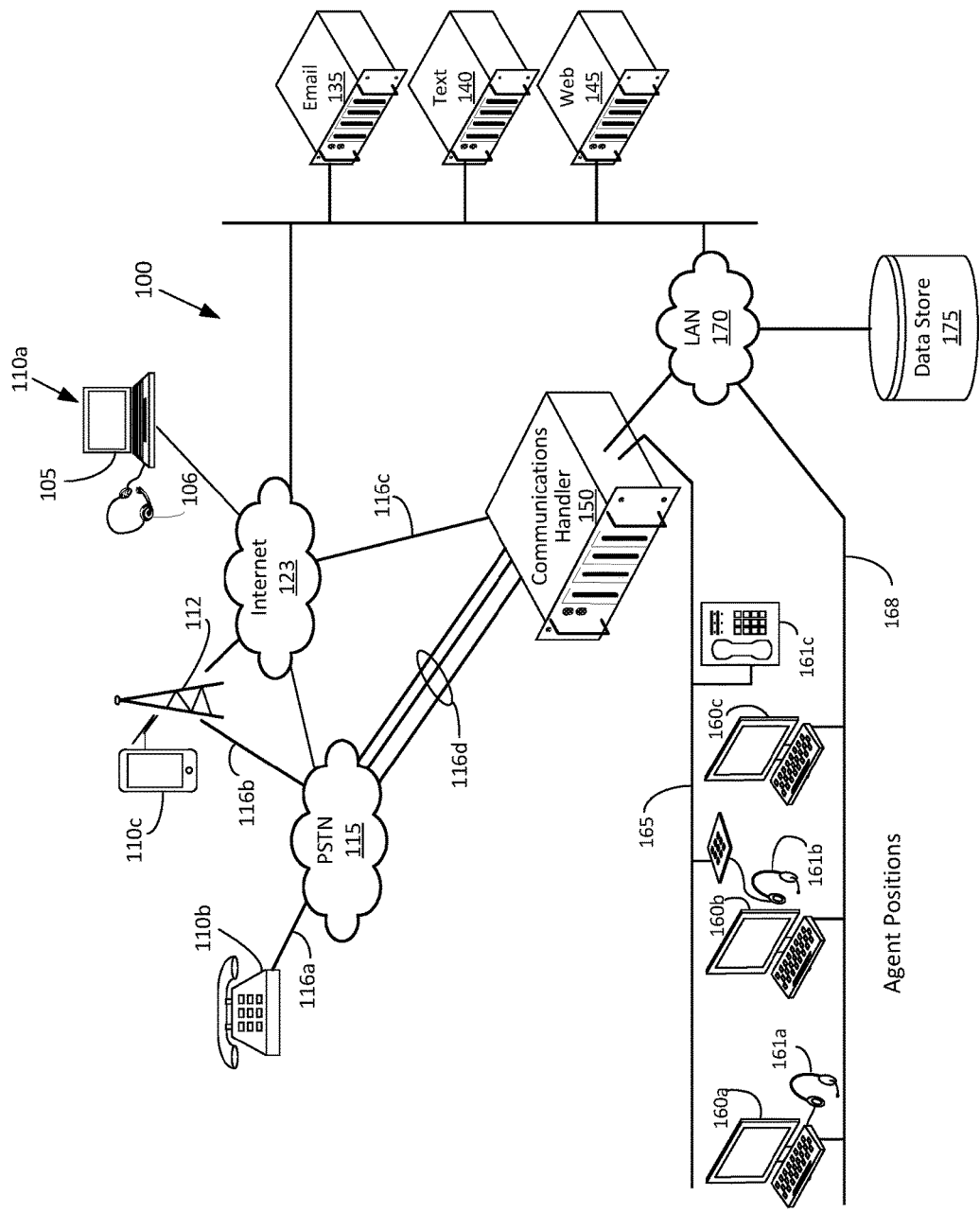
FIG. 1 illustrates an architecture of various components of a contact center that may be used in accordance with various embodiments of the present invention.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Aspects Related to Overall Approach

Some aspects related to the overall approach of various embodiments of the invention are presented here to help facilitate the discussion of such embodiments.

Chaining Channel

A chaining channel is one in which an outside party exchanges a sequence of single directional non-interactive communications with one or more agents. In various embodiments, this chain of non-interactive communications constitutes a conversation, and that conversation ends when the final communication in the chain has been received. Depending on the circumstances, the first communication in the chain is originated by the outside party (inbound communication) or is created within the contact center (outbound communication). Email is an example of a chaining channel.

Assigned Chain

A chain for a given chaining channel is called an assigned chain in various embodiments after a specific agent has been associated with it. If the initial communication in a chain is inbound and is not addressed to a specific agent, then the chain is not assigned until it is connected to an agent that will handle it until it terminates. If the initial communication in a chain is outbound then it also becomes assigned if it requires connect to an agent prior to being sent out of the contact center. A chain whose ongoing sequence of inbound communications are not addressed to a specific agent may remain unassigned until an assignment is made or the chain terminates. An assigned chain may be returned to unassigned status in some circumstances, such as when the agent assigned completes his or her shift and leaves for a week's vacation. A given chain may switch from one chaining channel to another, for example from SMS to MMS, and either remain assigned to the same agent or be reassigned. As long as the same agent continues the interchange of communications, the chain is still assigned in various embodiments. In particular instances, if a chain is switched to a non-chaining channel, then the non-chaining channel communication may be treated as the final communication in the chain if it is directed to the same agent. If the final communication is not directed to the same agent, then the chain may be considered to be terminated when the last chaining communication is completed.

Non-Chaining Channel

A non-chaining channel is understood in various embodiments to be a channel whose individual communications are continuous bi-directional interactive conversations between a remote party and a contact center agent. Such a conversation may be initiated by the remote party (inbound communication) or by the contact center (outbound communication). A telephone call is a typical example of a communication using a non-chaining channel. Note that even a telephone conversation is made up of a sequence of alternating exchanges in which the remote party and the agent take turns speaking to one another. Since chat typically maintains an open two-way connection, it is regarded in particular embodiments as a non-chaining channel when the pauses between contiguous communications in the chain are relatively brief. In cases where those pauses have varying durations, some of which are substantial, chat may be more properly classified as a chaining channel. In a given contact center, the management of chat can include termination of a chat session if no new communication is received within a selected timeout interval of relatively short duration. Use of such a management technique can allow the chat channel to be unambiguously classified as non-chaining, and can also minimize the impact on communications operations of erratic outside party behavior.

Multichannel

When a given treatment uses two or more channels, then an agent assigned to that treatment is multichannel if he or she is designated to handle two or more of the treatment's channels. Support of several channels by a single agent may be in either monotasking or multitasking mode (see below).

Monotasking

When an agent assigned to a given treatment is restricted to handling only a single communication at a time, meaning there is no overlap between the time intervals of any of the communications he or she handles, then that agent is monotasking. An agent may operate in monotasking mode irrespective of whether the agent is multichannel or is restricted to handling communications of a single channel.

Multitasking

When an agent assigned to a given treatment may handle two or more communications concurrently, meaning the handling period time intervals of the two or more communications are allowed to overlap, then that agent is multitasking. An agent may do multitasking irrespective of whether the agent is multichannel or only handles communications of a single channel. Multitasking of agents gives rise to the concept of virtual agents (see below).

Agent

A single human, or a contact center artificial intelligence ("AI") entity, such as a chatbot, constitutes a contact center agent. In various embodiments, a multitasking human agent spawns and reabsorbs virtual agents, each of which is a temporary fractional portion of the total agent. A chatbot typically does not give rise to virtual agents, since multiple chatbots can normally be cloned as needed for a given treatment by the contact center. The more general term "combot" is used to represent a contact center AI entity like a chatbot that may handle one or more communication channels. In general, the term "agent" will be reserved for human agents.

Virtual Agent

A virtual agent is a temporary association of a fraction of an agent with a single communication. In various embodiments, a virtual agent is created (spawned) for the sole purpose of handling a single communication, and that virtual agent demises (is reabsorbed into the virtual agent pool) when that communication terminates. Contact center AI entities (combots) are similar to virtual agents in some respects, since an instance of a combot is constituted to handle a single communication and may be de-constituted once the communication terminates. In particular instances, all combots of a given class (based on treatment and channel) can be constituted (spawned) from the same primal combot source. In that respect primal combot sources are similar to agents, but without the limitations on use in concurrent assignments that are inherently necessary for agents. A combot may be restricted to a specific channel, or it may have the capability to service more than one channel and to manage a chain of communications that switches channels.

Agent Pool/Virtual Agent Pool

A contact center's agent pool is all the agents employed by a contact center, and a treatment's agent pool is all the agents in the contact center's pool who are assigned to a specific treatment. Likewise, a contact center's on-shift agent pool is all the agents employed by a contact center who are currently working a shift. Accordingly, a treatment's on-shift agent pool is all the agents in the contact center's on-shift agent pool who are assigned to a specific treatment.

In similar fashion, a contact center's online agent pool is all the contact center's agents who are currently on-shift and able to handle communications for the center. Accordingly, a treatment's online agent pool is all the agents currently in the contact center's online agent pool who are assigned to a particular treatment. Unless otherwise identified the phrase "agent pool" refers to an online agent pool at the contact center level or treatment level. A specific headcount can typically be determined for any agent pool of this type, although the headcount can vary with time of day.

Another useful concept is that of a potential virtual agent pool rather than an online virtual agent pool since virtual agents start their existence when they are spawned to handle a particular communication and cease to exist once that connection is closed. At any particular time, there are typically some members of a treatment's online agent pool that are assigned to handle a specific channel. However, such an agent is often only allowed to handle a defined maximum number of communications using that channel concurrently (see virtualization discipline below). Thus, the potential virtual agent pool for a treatment, channel, and time is all the possible virtual agents that could exist simultaneously if each of the treatment's online agents who handle the channel spawned their maximum allowed number of concurrent virtual agents for that channel.

The headcount for a treatment's potential virtual agent pool of a given channel is the sum of the maximum number of communications of the given channel that can be handled concurrently by each of the treatment's online agents who handle the channel. For example, if a treatment currently has three online agents of which only two of the agents can handle the chat channel, with the first of those two agents being allowed to handle two chats concurrently and the second of those two agents being allowed to handle one chat at a time, then the treatment's potential virtual agent pool for the chat channel includes three potential virtual agents.

In reality the various channels used by a given treatment normally compete for agent resources. Therefore, although a treatment's total potential virtual agent pool headcount is the sum of all the channel potential virtual agent headcounts for the treatment, that sum can normally be expected to significantly exceed the actual capacity of the online agent pool. For example, if a given online agent is allowed to handle two chats concurrently, or a single voice communication, but is not allowed to handle chat and voice communications concurrently, then the total number of potential virtual agents for that agent is three, although that agent cannot actually instantiate three concurrent virtual agents.

Virtualization Discipline

A given agent's virtualization discipline is the set of constraints placed on the agent with respect to what combinations and numbers of communications from different channels the agent may handle concurrently, along with the logic required to determine under what conditions that agent may spawn a new virtual agent for a given channel. For example, an agent who is very effective in voice communications, but less effective in chat due to poor typing or spelling skills would normally be primarily focused on voice. While an agent with a difficult accent or who has hearing difficulties, but who has excellent typing, spelling, and grammar skills would normally be primarily focused on chat, SMS, MMS, and/or email channels. Thus, an agent could be allowed to handle various combinations of communications using different channels such as, for example, two chats and one email, or one voice call and one email, and be restricted from more numerous combinations, such as three chats or five emails, or one voice call and two chats.

For particular channels, handling multiple communications concurrently using these channels does not necessarily provide any advantage over handling them sequentially. For example, if an agent is assigned to handle two or more emails concurrently, then typically the most efficient method for the agent to use in handling the emails is to write and send a response to each email one at a time, in other words, sequentially. Therefore, in the example, having the agent spawn two virtual agents concurrently to write the responses to the emails is equivalent to spawning the virtual agents one-by-one and only having them exist one at a time, in sequence. Other chaining channels, such as SMS and MMS, may be similar to email in this aspect of how they are handled by agents. Accordingly, this feature can be used in various instances to simplify the management logic and bookkeeping for concurrent communications by simplifying the virtualization disciplines.

If an agent is allowed to handle communications from at most two channels concurrently, then the virtualization discipline for that agent can be represented in a simple table structure. An example is shown below in Table A. Each of the off-diagonal entries contain one or two ordered pairs of integers which identifies the maximum count for that combination of two channels (the count for the channel in column, followed by the count for the channel in row). Each diagonal entry addresses only a single channel, and those contain a single integer that is the maximum number of communications from that channel the agent can handle concurrently when all other channels are excluded. If the agent is allowed to handle communications from more than two channels concurrently then additional axes will be needed to capture the allowable concurrent combinations. Other representation may be used to define the constraints such as, for example, a logic tree.

TABLE A

Representation of an Agent's Virtualization Discipline

| [0001] | CHAT | EMAIL | VOICE | SMS | MMS |
|---|---|---|---|---|---|
| CHAT | 2 | (2,1) | (1,0) or (0,1) | (2,1) | (1,1) |
| EMAIL | | 1 | (1,1) | (1,1) | (1,1) |
| VOICE | | | 1 | (1,1) | (1,0) or (0,1) |
| SMS | | | | 1 | (1,1) |
| MMS | | | | | 1 |

Assigning Agents to Queues

As discussed further herein, an agent need not be assigned to a single queue but instead, his or her full capacity for handling communications may be parceled out to two or more queues. The following terminology is helpful in stating how an agent's capacity may be divided up between queues.

Channel-assigned—an agent is said to be channel-assigned to a queue when that agent's full capacity to handle that channel is assigned to that queue. The agent's capacity for another channel may be assigned to a different queue. Examples: chat-assigned, call-assigned, email-assigned, and SMS-assigned.

Non-chaining-assigned—an agent is said to be non-chaining-assigned to a queue when that agent's full capacity to handle non-chaining channels is assigned to that queue.

Chaining-assigned—an agent is said to be chaining-assigned to a queue when that agent's full capacity to handle chaining channels is assigned to that queue.

Fully-assigned—an agent is said to be fully-assigned to a queue when that agent's full capacity to handle all his or her channels is assigned to that queue. In various embodiments, no online agent for a treatment who is currently handling one or more chaining channels and also one or more non-chaining channels will be fully-assigned to a queue. In various embodiments, each online agent who handles only chaining channels will be fully-assigned to a queue.

Communication Arrival Rate

Communication arrival rate is the average rate (e.g., communications per second) at which new communications show up at the contact center. The phrase "show up" is used to identify inbound communications that are received by the contact center and outbound communications originated by the contact center. The communication arrival rate for communications assigned to a specific treatment is of primary interest in various embodiments, and that rate will be lower than the communication arrival rate for the entire contact center unless the contact center has only one treatment.

Communication Value

Communication value is a number assigned to each communication routed to a given treatment that defines the expected payback from applying that treatment to that communication. In various embodiments, the computation of communication value depends on the treatment chosen, and is based on logic that may make use of one or more predictive models. That is to say, in various embodiments, the computation of such values is normally different for different treatments. Furthermore, communication values in various embodiments allow communications within the same treatment to be compared based on their expected payback.

Particular embodiments, as described herein, make use of a lost value rate, a value capture rate, and a priority value. In these particular embodiments, for the lost value rate and the value capture rate to be meaningful, it is necessary for the communication value to be on a numeric scale for which, if one call has a higher call value than another, then the call with the higher call value is indeed more valuable than the other call. Ideally if communication A is considered twice as valuable as communication B then the communication value of A should be twice as big as the communication value of B, but that is not essential. Accordingly, a pure ranking scale, such as a scale in which communication values are letters of the alphabet instead of numbers, does not typically satisfy the numeric scale requirement. In addition, a logarithm scale may tend to distort the effect of a communication value when computing the lost value rate and the value capture rate and therefore is typically avoided. When priority value is made use of then it must always have a positive value to perform correctly. That in turn requires the communication value must always be a positive number.

Abandon Rate

For a set of communications, the abandon rate is the ratio of the number of communications that self-dispose (e.g., calls that hung up) before being connected to an agent, to the total number of communications in the set. Of primary interest in particular embodiments is the abandon rate for a set of communications routed to a particular treatment during some time window (an hour, a day, and so on) in that the abandon rate can serve as a significant factor for the effectiveness of the treatment.

In many instances, the abandon rate for a set of chaining communications should be near zero, since outbound chaining communications should self-dispose only due to human or processing errors, and the same applies to inbound chaining communications. In particular embodiments, a time limit may be set for receiving the next inbound communication in a chain and if that time limit is reached, then the chain is terminated as "lost" by the contact center and the chain is effectively self-disposed.

Lost Value Rate

When a communication placed in a treatment abandons then the value of that communication is lost. A useful variant on abandon rate is the lost value rate: the ratio of the sum of the values of the abandoned communications to the sum of the values of all the communications routed to the treatment. Like abandon rate, the lost value rate is normally computed for some time window of the communications routed to the treatment. Ideally this rate will be zero, but that is unrealistic. Various embodiments of the invention focus on minimizing lost value rate.

Value Capture Rate

Another variable related to communication value is value capture rate. For all the communications routed to a chosen treatment in some selected time interval, the value capture rate is the ratio of the sum of communication values of all those communications that were connected to an agent, to the sum of the values of all of the communications routed to the treatment. Various embodiments of the invention focus on maximizing value capture rate. Note that the effect of abandonment rate is implicit in the definition of value capture rate, since the values of abandoned communications are lost (not included in the numerator), but the values of the abandoned communications are counted in the sum of the values for all the communications routed to the treatment (the denominator). The value capture rate is maximized if there are no abandoned communications, but again that is unrealistic. In addition, maximizing the value capture rate is equivalent to minimizing the lost value rate, since the value capture rate and the lost value rate sum to one.

Agent Ranking

A fundamental aspect in various embodiments of the invention is agent ranking. In these particular embodiments, each agent assigned to a given treatment is given a ranking value. These ranking values may have a variety of forms such as, for example, positive integers or real numbers. In many instances, the nature of the scale used for agent ranking is not important, since all that is needed is a means to place each agent for a given treatment in a ranking position. In addition, the assignment of a ranking value to an agent in particular embodiments is based on some measure of agent performance such as, for example, the ratio of the number of successfully handled communications to total minutes the agent was engaged in the communications. Other factors such as level of experience or customer satisfaction rating may also be employed.

Various embodiments employ separate agent rankings for each channel when a treatment uses two or more channels. For example, an agent who is quite effective at voice communications may be less effective with chat, email, and SMS due to poor typing, spelling, or grammatical skills. Here, a single ranking covering all channels may be used, but the single ranking may tend to reduce the performance of the approach described herein due to its channel-specific inaccuracy. In many instances, when a separate ranking is used per channel, then the terms channel-ranking and channel-ranked are used to describe channel-specific ranking of agents. For example chat-ranking, SMS-ranking, call-ranking, and so on.

Agent Availability Rate

A variable used in various embodiments is agent availability rate, which for a given treatment is the rate at which agents become available to handle communications. This is somewhat similar to communication arrival rate, and is in effect an agent arrival rate. In many instances, the "arrival" of an agent to handle a communication is a random event, just as the arrival of a communication can be a random event.

In particular embodiments, when multichannel is used for a treatment but multitasking is not, then there is a separate agent availability rate for each channel. However, when both multichannel and multitasking are used, then there is a separate virtual agent availability rate for each channel.

Wait Time

Wait time is the total length of time a communication placed in a queue to wait to be connected to an agent spends in the queue from the time it enters the queue to the time it is connected to the agent. Another useful concept in various embodiments is average wait time. In a given window of time, for a given queue, there will be a set of communications which leave that queue and are connected to agents. The sum of the wait times for that set of communications, divided by the number of communications in that set, is the average wait time for that queue in that time window.

An alternate definition of wait time that may be used in various embodiments includes both the length of time a communication takes to reach the queue after it arrives at the contact center and the time it spends actually waiting in the queue before being connected to an agent. The average wait time based on this definition may be useful in some instances in better aligning the operation of a treatment with the overall process of the contact center, and providing insight into total center performance rather than the local performance only.

Another alternate definition of wait time that may be used in various embodiments includes those communications that leave a queue by self-disposing and are never connected to an agent. Thus, inclusion of self-disposing communications provides a definition of wait time as the length of time a communication placed in a queue waits in the queue before it is connected to an agent or self-disposes. Note that self-disposing communications have a truncated or censored wait time, in the sense that it impossible to know how long their wait time would have been had they waited until connected to an agent. In particular embodiments, this definition of average wait time can be useful in evaluating contact center and treatment performance.

It is noted that in call centers, the wait time can be referred to as "time to answer." While in the broader context of contact centers, it can be generalized to "time to connect to an agent," or simply "time to connect."

Service Level Requirement

Generally speaking in various embodiments, a service level requirement for a single independent queue within a given treatment is a statement of required performance in terms of how long communications may wait in the queue before being connected to an agent. Three common forms of a service level requirement are given below:

Given a chosen percentage between 0 and 100 and a selected wait time, that chosen percentage or greater of all communications processed for a queue must be connected to an agent without waiting in the queue longer than the selected wait time.

Given a selected wait time, the average (mean) wait time for the queue must not exceed that selected wait time.

Given a selected wait time, the median wait time for the queue must not exceed that selected wait time.

In particular embodiments, the communications that self-dispose are not considered in each of these forms as part of the total, since their wait time until connection to an agent is undefined. The first form is often considered the most robust of the three forms, but is typically less convenient to work with than the other two forms. The second form is the simplest computationally and the easiest to understand. However, since all actual wait time distributions are skewed to the right, the mean value is typically higher than the 50% value. The third form is not significantly more computationally demanding than the second form. However, this form always uses the 50% value of the wait time distribution regardless of the actual shape of that distribution.

The communication values of a given queue can be used to generalize the form of the service level requirement by use of a communication value cutoff. For instance, instead of applying the service level requirement to all the communications of a queue, the requirement is only applied to those communications with communication values greater than a chosen cutoff value. For example, if a queue's communication values range from 1 to 1000 and the cutoff value is 300, then the requirement is only applied to the set of communications whose value is greater than 300. Typically such a cutoff value is chosen in various embodiments to correspond to a selected percentage of the total communication volume handled by the queue. For instance, in the example, if the selected percentage is 80%, then the cutoff value of 300 would have been chosen because 80% of all communications handled by the treatment by placing them in that queue have communication values greater than 300. In general it may be more practical to state the requirement in terms of the selected percentage, rather than the cutoff value. This is because the same selected percentage can be used for a family of queues, but each of those queues may have a different communication value cutoff due to having different communication value distributions. Furthermore, the cutoff value for a given queue may change with time. Note the selected percentage used to define a service level requirement should not be confused with the chosen percentage used in the first example of a service level requirement described above. To keep the distinction clear the former is referred to herein as the applicable set percentage and the latter is referred to herein as the total volume percentage.

The communication value threshold for a selected percentage of the total set of communications of a queue (of all the communications of a queue) is a reference value such that all the communications of the queue with communication values larger than the reference value is the selected percentage of all the communications of the queue. Given the communication value threshold for a selected percentage of all the communications of the queue, the applicable set of communications is defined to be the set of all the communications of the queue with communication values larger than that communication value threshold.

Thus, the three common forms from above can be restated to incorporate these more general forms:

(I) Given a selected wait time and the communication value threshold for a selected percentage of all the communications of a queue, and given a chosen percentage (distinct from the selected percentage), that chosen percentage or greater of all the communications in the applicable set must be connected to an agent without waiting in the queue longer than the selected wait time.

(II) Given a selected wait time and the communication value threshold for a selected percentage of all the communications of a queue, the average (mean) wait time in the queue of the communications in the corresponding applicable set must not exceed that selected wait time.

(III) Given a selected wait time and the communication value threshold for a selected percentage of all the communications of a queue, the median wait time in the queue of the communications in the corresponding applicable set must not exceed that selected wait time.

Use of a common selected percentage in various embodiments for a family of queues allows the same definition of service level requirement to be stated for all of the queues, even though the communication value thresholds for the selected percentage may differ for the individual queues. While each of these three forms of defining service level requirements can be used in various embodiments, to avoid inconsistency only one is normally used within a treatment. In other words, the three forms should not normally be mixed within a treatment; one form is typically selected and used throughout.

Note that in particular embodiments, quantities such as abandon rate and value capture rate may be used in evaluation of queue and treatment performance, in addition to adherence to a chosen service level requirement. Another factor that may be used in evaluating performance is how well on average communication value has been matched to agent ranking. Here, ideally higher value communications are connected to higher ranking agents and lower value communications are connected to lower ranking agents.

As discussed further herein, the overall management and feedback control process of a treatment is called the Treatment Control System ("TCOS"). In various embodiments, the TCOS has two major components, one of which manages all chaining communications for the treatment, and the other of which manages all non-chaining communications for the treatment. These two major components are called the Single Agent Queues Subsystem ("SAQS") and the Interlinking Queues Subsystem ("IQUS") respectively. The SAQS will control a family of single agent queues and will manage each of those queues independently. The IQUS will control a family of interdependent queues and will manage all of those queues jointly. Each treatment queue, whether managed by the SAQS or the IQUS, will have a service level requirement. More details on the SAQS and IQUS are included later herein.

The service level requirements for each the SAQS queues will be stated in terms of one of the formats (I), (II), or (III) above, and the same form will be used for all the SAQS queues of a given treatment. The service level requirements are defined separately for each chaining communication channel when there are two or more such channels handled by a given treatment.

The IQUS family of queues may have one of three forms: the minimal form with only a single queue, the basic form with two queues, and the general form with three or more queues. When the IQUS is operating in its minimal form then the service level requirements for the single IQUS queue will be stated in terms of one of the formats (I), (II), or (III), and whichever of those three formats are used for the service level requirements of the SAQS queues will also be used by the IQUS minimal form queue. The service level requirements for the single queue of the IQUS minimal form are defined separately for each non-chaining channel when there are two or more such channels handled by a given treatment.

When the IQUS is operating in its basic form then its two queues are called the high queue and the low queue, with the high queue handling non-chaining communications for a higher range of communication values and the lower queue handling non-chaining communications for a lower range of communication values. Both of these queues will have their service level requirements defined separately for each non-chaining channel of a given treatment in terms of one of the requirement formats (i), (ii), or (iii) above. The same format will be used for each non-chaining channel and for both the high and low queues. The format used will also conform to the choice of format chosen for the SAQS queues, in the sense that if the SAQS uses format (I) then the IQUS will use format (i), if the SAQS uses format (II) then the IQUS will use format (ii), and if the SAQS uses format (III) then the IQUS will use format (iii). The service level requirement for the low queue is treated as goal or target, rather than a hard requirement that must be met. During stressing operational conditions the achievement of the low queue service level goal may be temporarily sacrificed as agent resources are shifted on a short term basis to the high queue to insure that its service level requirement is satisfied.

When the IQUS is operating in its general form then its family of queues will be ordered, with queues which are higher in the ordering handling non-chaining communications for a higher range of communication values and queues which are lower in the ordering handling non-chaining communications for a lower range of communication values. Each of these queues will have its service level requirements defined separately for each non-chaining channel of a given treatment in terms of one of the requirement formats (i), (ii), or (iii) above. The same format will be used for each non-chaining channel and for each of the general form queues. The format used will also conform to the choice of format chosen for the SAQS queues for the treatment, in the sense that if the SAQS uses format (I) then the IQUS will use format (i), if the SAQS uses format (II) then the IQUS will use format (ii), and if the SAQS uses format (III) then the IQUS will use format (iii). The service level requirement for the lowest queue is treated as goal or target, rather than a hard requirement that must be met. During stressing operational conditions the achievement of the lowest queue service level goal may be temporarily sacrificed as agent resources are shifted on a short term basis to the higher queues to insure that their service level requirement are satisfied.

In various embodiments, the configuration of the IQUS may be restricted by the user for a given treatment to only operate in its minimal form, to only operate in either it minimal form or basic form and to transition as needed between those two forms, or to operate in its minimal, basic or general forms and to transition as needed between minimal and basic form and between the basic and general form. When the general form is allowed, then the number of IQUS queues may be increased or decreased based on operational conditions. The service level requirements will be adjusted when there is a transition of the IQUS configuration between the minimal and basic form, between the basic and general form, and when the general form increases or decreases the number of IQUS queues.

Wait Time Threshold

A selected wait time is used as a specific type of cutoff value in each of the common forms of defining a communication queue's service level requirement. For all three forms that selected wait time is called the wait time threshold. Note that selected wait time values have a different qualitative meaning and a different quantitative impact for each of three forms. If one of the requirement forms is replaced by either of the other two, then the value of the wait time threshold for the new form is typically not the same as for the starting form. Furthermore, regardless of which form is selected for a treatment, the wait time threshold is in general different for different channels.

Communication Value Threshold

Generally speaking, a selected communication value is used as a specific type of cutoff value based on a selected percentage of the total volume of communications handled by a queue in each of the common forms of defining a communication queue's service level requirement. For all three forms that selected communication value is called the communication value threshold, and that selected percentage is called the total volume percentage. For whatever single form is selected for a treatment, the total volume percentage can be the same for all channels. There is, however, some degree of flexibility in many instances to choose different total volume percentages for different channels. In addition, a different chosen percentage of the subset of all a queue's communications that have communication values greater than the communication value threshold may be selected for the first form of the service level requirement.

Such a subset may be referred to as the applicable set and the chosen percentage may be referred to as the applicable set percentage.

Stability Requirement

Generally speaking a single queue configuration within a treatment is inherently stable. However, when a treatment includes in its overall configuration a set of two or more interdependent queues such as is found in some embodiments of the IQUS, then stability concerns may surface in managing that set of queues. This is because the multiple queues of the set are inextricably linked. Resources may be moved from one queue to another, and the number of queues may be increased or decreased based on the operational state of the treatment. Accordingly, a feedback control process is used in various embodiments to correctly identify when these changes are needed and to perform the changes effectively.

Stability requirements are used in various embodiments for a set of interdependent queues of a treatment to ensure the feedback control process has the information it needs to work as it is designed to. Care is taken to perform corrective actions only when such actions are really needed, which requires determining that need with a high degree of certainty using the available information. Thus, in various embodiments, the essential information needed to make such a determination is whether or not the service level requirement is being met and more specifically, whether or not the overall service level requirement for all the channels combined for each queue of a treatment is being met.

Consider the problem of determining if service level requirement for a given channel of a queue is being met (satisfied). Wait time is a random variable, and the probability distribution of that random variable is implicitly assumed to be available to use as a basis for evaluating performance on the service level requirement for the given channel of the queue. However, what is actually available is an approximation of that distribution of wait time.

The approximation is obtained by taking the following steps for a given channel of a queue: (1) selecting a window of time starting at some point in the recent past and ending with the current time; (2) determining which communications handled by the queue made use of the given channel and were connected to an agent during the selected window of time; and (3) compiling the set of wait times of those communications. The set of wait times identified is a random sample from the wait time probability distribution, and provides the basis for estimating if the service level requirement for the given channel of the queue is currently being met. Stability in feedback control decision-making requires that estimate to be reliable. However, the estimate can be quite unreliable in certain situations.

For example, if the selected window of time is so short that very few communications for the given channel of the queue were connected to an agent within the window of time, then the sample obtained (the set of wait times) represents the actual wait time distribution very poorly. To illustrate this consider a simplified wait time distribution that is uniform between 1 to 5 seconds. Each wait time between 1 and 5 seconds is equally likely to occur, and no wait time less than 1 second or greater than 5 seconds will occur. The mean and the median of this distribution are both 3 seconds. Suppose that wait time set is {1, 4, 3.5}. Based on that sample the mean (=median) value is estimated to be 4.25 seconds, which diverges greatly from the correct value of 3 seconds. This example demonstrates that the set of wait times should not be too small, which means the time window should not be too short.

How short the time window can be is dependent on the frequency at which communications of the given channel of the queue are being connected to agents (connection rate). If the frequency is high, say 50 connections per second, then a 3 second window will produce a wait time set with about 150 wait times. That number of wait times is likely to provide a reliable estimate. On the other hand, if the frequency is quite low, such as only 0.02 connections per second (one connection every 50 seconds), then a 3 second window is likely to produce a wait time set that is empty. No reliable estimate can be provided by an empty wait time set.

However, simply expanding the size of a window that is too short can lead to another problem. For instance, looking at the last example, expanding the size of the window to obtain a wait time set with 100 wait times would require the window of time to be 100/0.02 seconds=5,000 seconds=1.39 hours. Such a large window can cause problems due to the dynamic nature of a contact center throughout the day. Suppose a 1.39 hours window of time, with a connection rate of 0.04 connections per second during the first hour, and with a connection rate of 0.02 connections per second for the remaining 0.39 hours. Then 72% of the wait time set will have occurred in the first hour when the connection rate was 0.04 connections per second and 28% of the wait time set will have occurred in the last 0.39 hours when the connection rate was 0.02 connections per second. This implies the mean connection rate for the entire 1.39 hours is 0.03444 connections per second. However, the connection rate for the current conditions of the contact center is 0.02 connections per second.

The mean wait time can be roughly approximated by queue length/connection rate. For convenience assume a constant queue length of 2, which allows the determination that the mean wait time for current conditions is 2/0.02=100 seconds. On the other hand, the estimated mean wait time based on the wait time set is 2/0.0344=58 seconds. Here, the window of time is so long that the window mainly represents something completely different from the current conditions of the contact center.

The two examples demonstrate that the connect rate cannot fall below some minimum level to get reliable estimates. In other words, the connect rate cannot fall below some minimum level so that a large enough sample of wait times is obtained using a window of time short enough to present the current conditions of the contact center. Thus, the stability requirement for a given channel of a queue is defined in terms of a minimum allowable connection rate. How long a window of time can be used safely is a factor in selecting that minimum.

Accordingly, the main focus for stability requirements in various embodiments is at the level of the total queue (the aggregate of all channels), rather than at the single channel level. The reasons for focusing at that level include: (1) the queue connection rate for the aggregate of all the channels is the sum of the connection rates of the individual channels. Having a higher connection rate makes it possible to achieve the stability requirement with a larger number of queues, which in turn gives better performance on assigning higher ranking agents to higher value communications and lower ranking agents to lower value communications; (2) a channel with a low connection rate, relative to the overall connection rate for the queue, represents a small percentage of total communication volume of the queue; (3) using the aggregate level for stability requirements prevents having a small percentage of the queue's total communication volume becoming a determining factor in decisions on whether to increase or decrease the number of queues (in order to meet the channel level stability requirements of each queue); (4) if the number of non-chaining channels is small (e.g., ≤3) and the stability requirement for the queue is being met, then the stability requirement for each channel that has a significant percentage of the total communication volume of the queue is at least marginally being met; and (5) a channel with a low connection rate performs better at assigning higher ranking agents to higher value communications and lower ranked agents to lower value communications, when treated with the aggregated channels rather than with a single channel.

Exemplary Contact Center Architecture

FIG. 1 illustrates a contact center architecture 100 that may be used in accordance with the various technologies and concepts disclosed herein. The contact center architecture 100 shown in FIG. 1 may process voice communications and non-voice communications that are inbound-only, outbound-only, or a combination of both (sometimes referred to as a "blended" contact center). Therefore, although many aspects of contact center operation may be disclosed in the context of voice calls, the contact center may process other forms of communication such as, for example, facsimiles, emails, text messages (SMS and/or MMS), video chats/calls, and Web chats.

Since the contact center may handle communications originating from a party, or initiated to a party, the term "party," "user," or "customer" without any further qualification, refers to a remote person associated with a communication processed by the contact center, where the communication is either received from or placed to the party. Thus, use of these terms is not intended to limit the concepts described in this application.

Accordingly, inbound voice calls can originate from calling parties using a variety of different phone types. For instance, a calling party may originate a call from a conventional analog telephone 110b connected to a public switched telephone network ("PSTN") 115 using an analog plain old telephone service ("POTS") line 116a. The calls may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of the calls.

Inbound voice calls may also originate from a mobile phone device 110c, such as a smart phone, tablet, or other mobile device, which wirelessly communicates with a mobile service provider ("MSP") 112. The voice calls may be routed to the PSTN 115 using an integrated services digital network ("ISDN") interface 116b or other types of interfaces that are well known to those skilled in the art. In particular embodiments, the MSP 112 may also route calls as packetized voice, referred to herein as voice-over-IP ("VoIP") to an Internet provider 123 using Internet-based protocols, such as SIP or H.323 protocols. For convenience, unless indicated otherwise, the term "trunk" refers to any type of facility 116c, 116d providing voice calls to, or from, the contact center, regardless of the type of protocol or technology used. Specifically, a "trunk" is not limited to time-division multiplexing ("TDM") technology, but could refer to various VoIP communication channels.

Inbound voice calls may also originate from a calling party employing a so-called "IP phone," "VoIP phone," or "soft phone" 110a. In particular embodiments, this device may comprise a computing device 105, such as a laptop, computing tablet, or other electronic device, which interfaces with a headphone/microphone combination, also referred to as a "headset" 106. An IP phone may use a digital voice control protocol and may process packetized voice data according to various Internet based voice protocols, such as session initiated protocol ("SIP") and the call may be conveyed by an Internet provider 123. Those skilled in the art will recognize that a variety of Internet Protocols ("IP") and facilities may be used to convey voice calls.

The term "voice call" may encompass a voice call using any form of currently available technology and/or originating from any type of device, such as a soft phone 110a, a conventional telephone 110b, a mobile phone 110c, or other device known in the art. The term "call" as used herein may encompass an active instance of two-way communication, an attempt to establish two-way communication, or a portion of the two-way communication. For example, a user at a conventional telephone 110b can dial a voice call in an attempt to establish two-way communication, and a call can be said to exist even prior to establishment of the two-way connection.

In various embodiments, inbound voice calls from calling parties to the contact center may be received at a communications handler 150, which could be, for instance, an automatic call distributor ("ACD"). In particular embodiments, the communications handler 150 may be a specialized switch for receiving and routing inbound calls under various conditions. Further, the communications handler 150 may be embodied as a dedicated form of equipment readily available from various manufacturers, or the communications handler 150 may be a so-called "soft switch" comprising a suitable programming module executed by a processing device to perform the necessary specialized functions. The communications handler 150 may route an incoming call over contact center facilities 165 to a phone device used by an available agent for servicing. Depending on the embodiment, the facilities 165 may be any suitable technology for conveying the call, including but not limited to a local area network ("LAN"), wide area network ("WAN"), ISDN, or conventional TDM circuits. In addition, the facilities 165 may be the same or different from the facilities used to transport the call to the communications handler 150.

The physical area at which the agent sits is often referred to as an agent "position" and these positions are often grouped into clusters managed by a supervisor, who may monitor calls and the agents' productivity. An agent typically uses a specially configured computing device 160a-160c, such as a computer with a display, and a voice device 161a-161c that is adapted for various contact center functions associated with processing communications. For instance, the voice device 161a-161c may be a soft phone device exemplified by a headset 161a connected to the computer 160a. Here, the soft phone device may be a virtual telephone implemented in part by an application program executing on the computer 160a. Further, the phone may also comprise an Internet Protocol ("IP") based headset 161b or a conventional phone 161c. Use of the term "phone" is intended to encompass all these types of voice devices used by an agent, unless indicated otherwise.

The combination of computing device 160a-160c and voice device 161a-161c may be referred to as a "workstation." Thus, for these particular embodiments, the workstation collectively has a data capability and a voice capability, although separate devices may be used. Here, data may be provided to an agent's workstation computer 160a-160c over facilities 168 along with routing the call to the agent's workstation voice device 161a-161c over other facilities 165. In some instances, "workstation" may be used in reference to either the data or voice capability at the agent's position. For example, "routing the call to the agent's workstation" means routing a call to one of the voice devices 161a-161c at the agent's position. Similarly, "routing the call to the agent" means routing a call to the appropriate equipment at an agent's position. The workstation typically has a display, provided via a computer monitor. This is used to convey information to the agent about the calls, and the agent may interact with the communications handler 150 using a mouse or other pointing device in conjunction with their computer display.

Depending on the embodiment, the agent positions may be co-located in a single physical contact center or multiple physical contact centers. The agents may be remotely located from the other components of the contact center, and may also be remotely located from each other, sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents positions are in their individual residences. It is even possible for the supervisor to be remotely located (e.g., work at home), and such an arrangement does not negate the existence of the contact center.

Agents typically log onto their workstations prior to handling calls. The workstation may also communicate this login information to the communications handler 150 to allow the contact center (including the communications handler 150) to know which agents are available for handling calls. In particular embodiments, the communications handler 150 may also maintain data on an agent's skill level that may be used to route a specific call to the agent or group of agents having the same skill level. The communications handler 150 may also know what types of channels and combinations of channels the agent can handle.

Accordingly, in various embodiments, the communications handler 150 may place a call in a queue if there are no suitable agents available to handle the call, and/or the handler 150 may route the call to an interactive voice response system (e.g., server) ("IVR") (not shown) to play voice prompts. In particular embodiments, these prompts may be defined to be in a menu type structure and the IVR may collect and analyze responses from the party in the form of dual-tone multiple frequency ("DMTF") tones and/or speech. In addition, the IVR may be used to further identify the purpose of the call, such as, for example, prompting the party to enter account information or otherwise obtain information used to service the call. Further, in particular embodiments, the IVR may interact with other components such as, for example, a data store 175 to retrieve or provide information for processing the call. In other configurations, the IVR may be used to only provide announcements.

As noted, the contact center may also receive non-voice communications such as, for example, text messages, emails, and chats. For instance, text messages may be sent by parties using smart phones 110c over a MSP 112 and the Internet 123 and are received by a text gateway server 140. These text messages may be SMS text messages and/or MMS text messages. Once received, the text gateway server 140 in particular embodiments may inform the communications handler 150 of the text messages and the handler 150 may then queue up the text messages for appropriate agents.

In other embodiments, the contact center may make use of one or more components separate from the handler 150, such as a communications router (not shown in FIG. 1) that instead handles the routing of various communications to agents. For instance, in these particular embodiments, the text gateway server 140 may instead inform a communications router of the text messages and the router may then queue up the text messages for appropriate agents. Similarly, the communications handler 150 may also inform the communications router of various calls so that the router can then queue up the calls for appropriate agents. However, with that said, the remainder of the specification makes reference to a communications handler 150 to carry out such functionality, although it should be understood that portions of the communications handler's 150 functionality may be performed by one or more other components within the contact center architecture 100.

Similarly, emails may be sent by users over the Internet 123 to an email server 135, and the email server 135 may inform the communications handler 150 of the emails so that the communications handler 150 can queue up the emails for appropriate agents. With respect to chats, in various embodiments a party can request a chat by accessing a website (e.g., one or more webpages) via a Web server 145. In turn, the Web server 145 informs the communications handler 150 of the chat and the handler 150 queues the appropriate agent(s) to handle the chat.

Depending on the embodiment, the interactions between the various components shown may involve using a local area network ("LAN") 170. However, other configurations are possible, such as, but not limited to, using a wide area network, wireless network, router, bridge, direct point-to-point links, etc. Furthermore, in lieu of using facilities 165 directly linked to the communications handler 150 for conveying audio to the agents, other facilities 168 associated with the LAN 170 may be used.

In addition to receiving inbound communications, the contact center may also originate communications to parties, referred to herein as "outbound" communications. For instance, in particular embodiments, the communications handler 150 may be a dialer, such as a predictive dialer, that originates outbound calls at a rate designed to meet various criteria. Here, the communications handler 150 may include functionality for originating calls, and if so, this functionality may be embodied as a private automatic branch exchange ("PBX" or "PABX"). In addition, the communications handler 150 may directly interface with voice trunks using facilities 116c, 116d to the PSTN 115 and/or Internet provider 123 for originating calls. After the calls are originated, the communications handler 150 may perform a transfer operation to connect the calls with agents, a queue, or an IVR. Furthermore, in various embodiments, the communications handler 150 may make use of one or more algorithms to determine how and when to dial a list of numbers so as to minimize the likelihood of a called party being placed in a queue while maintaining target agent utilization. In similar fashion, the email server 135, text gateway server 140, and the Web server 145 can be utilized in various embodiments to originate outbound emails, text messages, and chats with parties.

Finally, in various embodiments, the communications handler 150 determines which agent is authorized and available to handle a communication upon being made aware of a voice or non-voice communication, and thereafter appropriately coordinates any response to the communication. In addition, the communications handler 150 may also make use of one or more schemes in allocating communications to agents as described herein.

Although a number of the above components are referred to as a "server," each may also be referred to in the art as a "computing device," "processing system," "unit," or "system." A server may incorporate a local data store and/or interface with an external data store. Use of the word "server" does not require the component to interact in a client-server arrangement with other components, although that may be the case. Further, the above components may be located remotely from (or co-located with) other components. Furthermore, one or more of the components may be implemented on a single processing device to perform the functions described herein. For example, in various embodiments, one or more functionalities of the communications handler 150 or other component may be combined into a single hardware platform executing one or more software modules. In addition, the contact center architecture 100 may be provided as a hosted solution, where the call processing functionality is provided as a communication service (a so-called "communication-as-a-service" or "CaaS") to a contact center operator. Thus, there is no requirement that the components identified above actually be located or controlled by a contact center operator. Those skilled in art will recognize FIG. 1 represents one possible configuration of a contact center architecture 100, and that variations are possible with respect to the protocols, facilities, components, technologies, and equipment used.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

General Overview

Various embodiments of the invention described herein make use of a new integrated approach for answering the questions of how to manage queues and agent staff, given a family of treatments has been established for a contact center along with criteria/logic on assigning communications to the different treatments of the family. Various embodiments of this approach encompass inbound and outbound communications, such as telephone calls, short messaging service ("SMS") messages, multimedia messaging service ("MMS") messages, Web chats, emails, etc. Further, various embodiments of this approach encompass use of multiple channels of communication within a treatment, and use of individual agents who concurrently handle communications (multitasking) that may make use of more than one of these channels of communication (multichannel).

Accordingly, various embodiments of the invention set out to achieve one or more of the following goals: (1) extract the most benefit from each communication while allowing total agent resources to be reduced below what is normally possible with standard approaches; (2) create a natural training regime for new agents that reduces the business impact of such agents' communication handling errors; and (3) assign more effective agents to higher value communications and less effective agents to lower value communications. In addition, various embodiments of the invention optimize the use of agent resources by dynamically adapting to changing conditions in the contact center such as communication arrival rate, treatment-specific communication arrival rate, agent availability rate, and the distribution of communication values.

The overall management and feedback control process of a treatment is called the Treatment Control System ("TCOS"). In various embodiments, the TCOS has two major components, one of which manages all chaining communications for the treatment, and the other of which manages all non-chaining communications for the treatment. These two major components are called the Single Agent Queues Subsystem ("SAQS") and the Interlinking Queues Subsystem ("IQUS") respectively. In particular embodiments, the TCOS has an overall control function, referred to as the TCOS Executive Function (TEF), which guides and supports the SAQS and the IQUS, and provides an interface between the treatment and the contact center.

In various embodiments, the TEF has oversight of the SAQS and IQUS for a given treatment, and uses certain techniques to reduce or eliminate local bottlenecks. However, the main control functions for managing all the treatment queues reside in the SAQS and IQUS. Accordingly, the TEF normally allows these two subsystems to operate independently, and only considers making limited adjustments when it receives an error message from the SAQS or IQUS. Further, in particular embodiments, if a stressing situation arises which strongly affects the effectiveness of an entire treatment, then the TEF may send a request to contact center management for the temporary loan of agents who handle the channels of the treatment.

Furthermore, in particular embodiments, how the TEF responds to stressing conditions depends in part on the relative priorities of the channels. Those priorities can be defined when the treatment is created. For example, if the call channel for a treatment is assigned a higher priority than the SMS channel, then any resources usage conflict between these two channels will favor the call channel.

Figure 2:
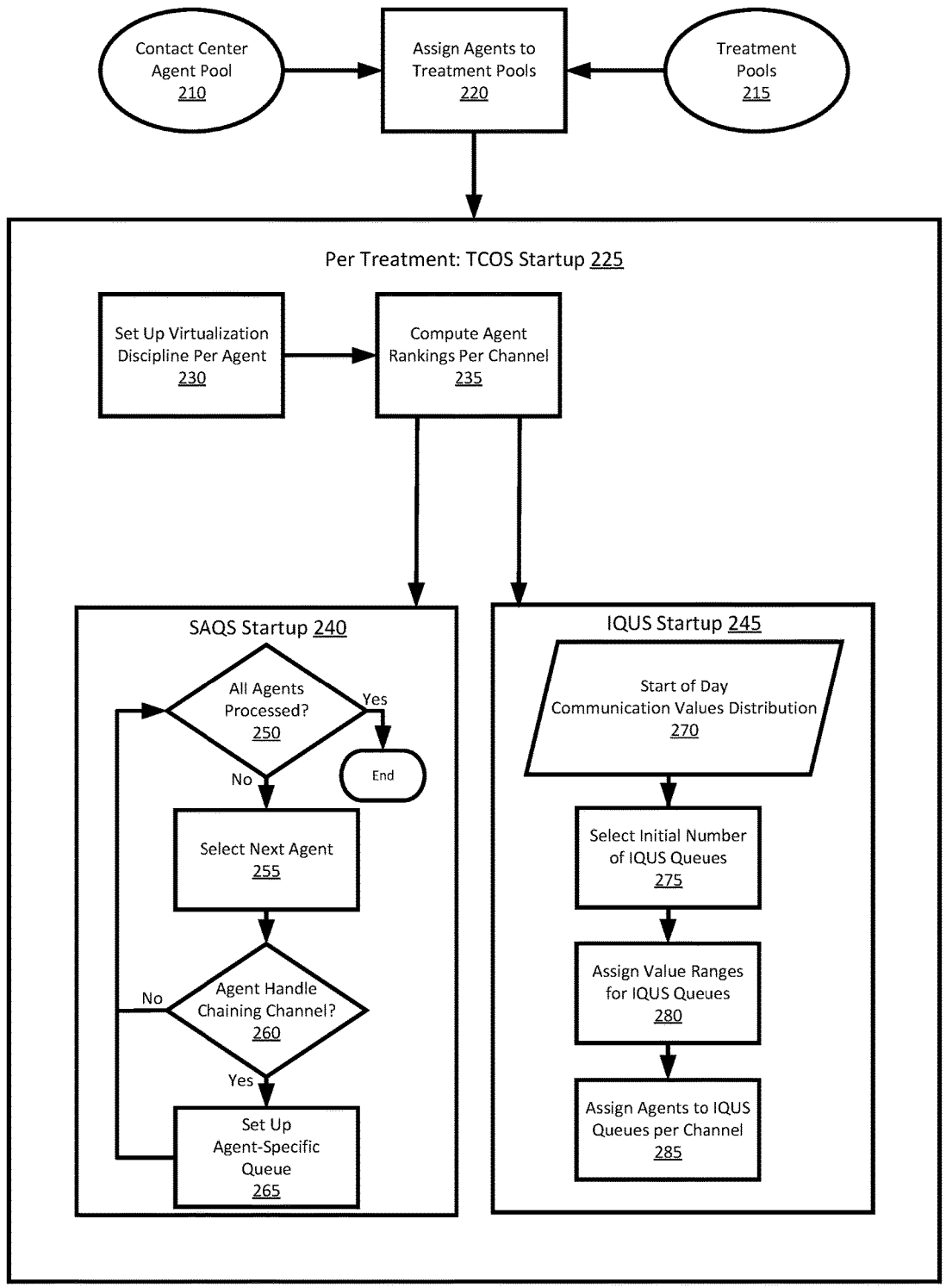
FIG. 2 illustrates an overview of startup process for a treatment that is involved in various embodiments of the present invention.

Turning now to FIG. 2, a contact center startup process for a treatment using various embodiments of the invention is summarized in FIG. 2. Here, the process begins at startup with the contact center agent pool 210 being assigned to the different treatments of the treatment pool 215 in Operation 220. Accordingly, in various embodiments, this step of the process is carried out based on criteria established by the contact center and the predicted amount of agent resources needed for each of the treatments.

For instance, the contact center may have established a family of treatments that is applicable to several different reasons and/or opportunities for conducting a communication with a remote party depending on the circumstances and the types of communications handled by the contact center. For example, the contact center may define a family of treatments that includes a first treatment for handling communications involving remote parties placing sales orders, a second treatment for handling communications involving remote parties returning a purchased product, a third treatment for handling communications involving remote parties needing technical support for a purchased product, and so forth. The contact center then assigns agents to these different treatments in the family based on a predicted number of communications each treatment is expected to handle over a given time period (e.g., a workday) and any skills the agents who handle the communications for each treatment may need to handle the communications for the treatment.

Accordingly, the TCOS institutes a startup 225 for each treatment in the family by first computing an agent ranking for each channel of communication utilized by communications assigned to the treatment in Operation 235. Here, in various embodiments, the TCOS may also set up the virtualization discipline for each agent assigned to the treatment in Operation 230 to establish which agents assigned to the treatment can handle communications for the various channels of communication. Thus, in particular embodiments, the TCOS may establish which agents are to be included in a ranking for a particular channel of communication based on the virtualization disciplines set up for the agents assigned to the treatment.

As is discussed further herein, the agent rankings for each channel of communication utilized by the treatment are used in assigning communications placed in the treatment to the various agents handling the treatment. More specifically, the agent rankings are used in various embodiments in assigning a communication to an appropriate agent based on the skills of the agent and the value of the communication. Ideally, higher valued communications should be assigned to higher skilled agents. Such practice helps to facilitate the contact center in maximizing the benefit of each communication in many instances to the contact center's business. This is the reason for utilizing a different agent ranking for each channel of communication. An agent's skill level may vary from channel to channel of communication. For example, an agent may be able to speak very clearly on telephone calls but may have trouble with committing a large number of typographical errors with typing. Therefore, in this example, the agent may be ranked rather highly on the rankings computed for the telephone channel and much lower on the rankings computed for the text message and Web chat channels.

At this point in the startup, the TCOS starts up the two subsystems for the treatment. Here, the SAQS startup 240 involves establishing a queue for each of the agents who is assigned to the treatment and handles at least one chaining channel of communication. For example, an agent who is assigned to the treatment and handles SMS and/or MMS text messages, and/or emails for the treatment. Therefore, in particular embodiments, the SAQS processes each agent assigned to the treatment and determines whether that agent handles any chaining channels of communications. Thus, the SAQS determines in Operation 250 whether all of the agents assigned to the treatment have been processed. If not, then the SAQS selects a next agent in Operation 255 and determines whether the selected agent handles a chaining channel in Operation 260. If the agent does handle at least one chaining channel, the SAQS sets up an agent-specific queue for the particular agent in Operation 265. At the end of the startup process 240, each agent assigned to the treatment who handles at least one chaining channel of communication has a queue set up for that agent. Therefore, when a communication using a chaining channel has been placed in the treatment and is assigned to a particular agent, the communication is then placed in that agent's queue.

As for the IQUS startup 245, the IQUS handles the communications placed in the treatment that are using a non-chaining channel such as a telephone call. Here, the IQUS establishes a start of the day communication values distribution for each non-chaining channel of communication utilized by the treatment in Operation 270. At the beginning of the day, a communication values distribution for a particular channel is made up of values assigned to a set of past communications that utilized the particular channel and were assigned to the treatment. For example, a communication values distribution for telephone calls would include communication values for a set of past telephone calls that were handled by the contact center and assigned to the treatment.

In particular embodiments, the IQUS then selects an initial number of queues to establish for each non-chaining channel in Operation 275. As is discussed in further detail herein, the initial number of queues is typically a single queue or two queues depending on the stability of such configurations in handling communications placed in the treatment. Generally speaking, each queue is configured to handle communications using any of the non-chaining channels that are placed in the treatment. For example, the treatment may be configured to handle both telephone calls and Web chats. Here, if the initial number of queues is set to two, then each of the two queues would be configured to manage both telephone calls and Web chats. Therefore, telephone calls and Web chats assigned to the treatment would be placed in either queue based on the values of the calls and chats. A two-queue configuration would include a "high" queue for higher valued calls and chats and a "low" queue for lower valued calls and chats.

Thus, in various embodiments, the IQUS assigns value ranges to the queues during startup in Operation 280. In particular embodiments, the values ranges are based on the values of the communications found in the communication values distribution for each of the non-chaining channels handled by the treatment and the volume of communications each of the queues are expected to handle for each non-chaining channel.

For instance, returning to the example involving the two-queue configuration, the IQUS would assign a first value range for telephone calls placed in the high queue, a second value range for Web chats placed in the high queue, a third value range for telephone calls placed in the low queue, and a fourth value range for Web chats placed in the low queue. Here, the high queue may be expected to handle seventy percent of the telephone calls and Web chats placed in the treatment. Therefore, the low queue is expected to handle thirty percent of the telephone calls and Web chats placed in the treatment.

The communication values distribution for telephone calls may include calls with communication values ranging from ten to three hundred and the communication values distribution for Web chats may include chats with communication values ranging from twenty to four hundred. The communication value distribution for the upper seventy percent of the telephone calls may range from thirty-five to three hundred and the upper seventy percent of the Web chats may range from fifty to four hundred. Thus, the IQUS would assign the value range thirty-five to three hundred to the high queue for telephone calls and the value range ten to thirty-four to the low queue for telephone calls. Likewise, the IQUS would assign the value range fifty to four hundred to the high queue for Web chats and twenty to forty-nine to the low queue for Web chats. Therefore, when a telephone call is placed in the treatment after startup in this example with a communication value of sixty-two, the telephone call would be placed in the high queue for the treatment. Had the communication value only been twenty-three, then the call would have been placed in the low queue for treatment.

Finally, the IQUS assigns agents to the queues per channel in Operation 285 during startup. The general approach per channel in carrying out this operation in various embodiments is for the IQUS to assign the higher channel-ranked agents to the queues that are to handle the higher valued communications. Again, returning to the example, the higher ranking agents in the rankings computed for telephone calls would be assigned to the high queue, with the lower ranking agents assigned to the low queue. In various embodiments, for each channel the number of higher ranking agents who are assigned to the high queue is contingent on a service level for that channel the contact center wants to provide to the communications placed in the queue. The remainder of the agents are then assigned to the low queue. Furthermore, an agent may be assigned to different queues for different channels of communication handled by the treatment. For example, an agent may be highly ranked for telephone calls, but much lower ranked for Web chats. Therefore, in this example, the agent may be assigned to the high queue for the telephone call channel and assigned to the low queue for the Web chat channel. At that point, the treatment has been started up and is ready to handle communications placed in the treatment.

Figure 3:
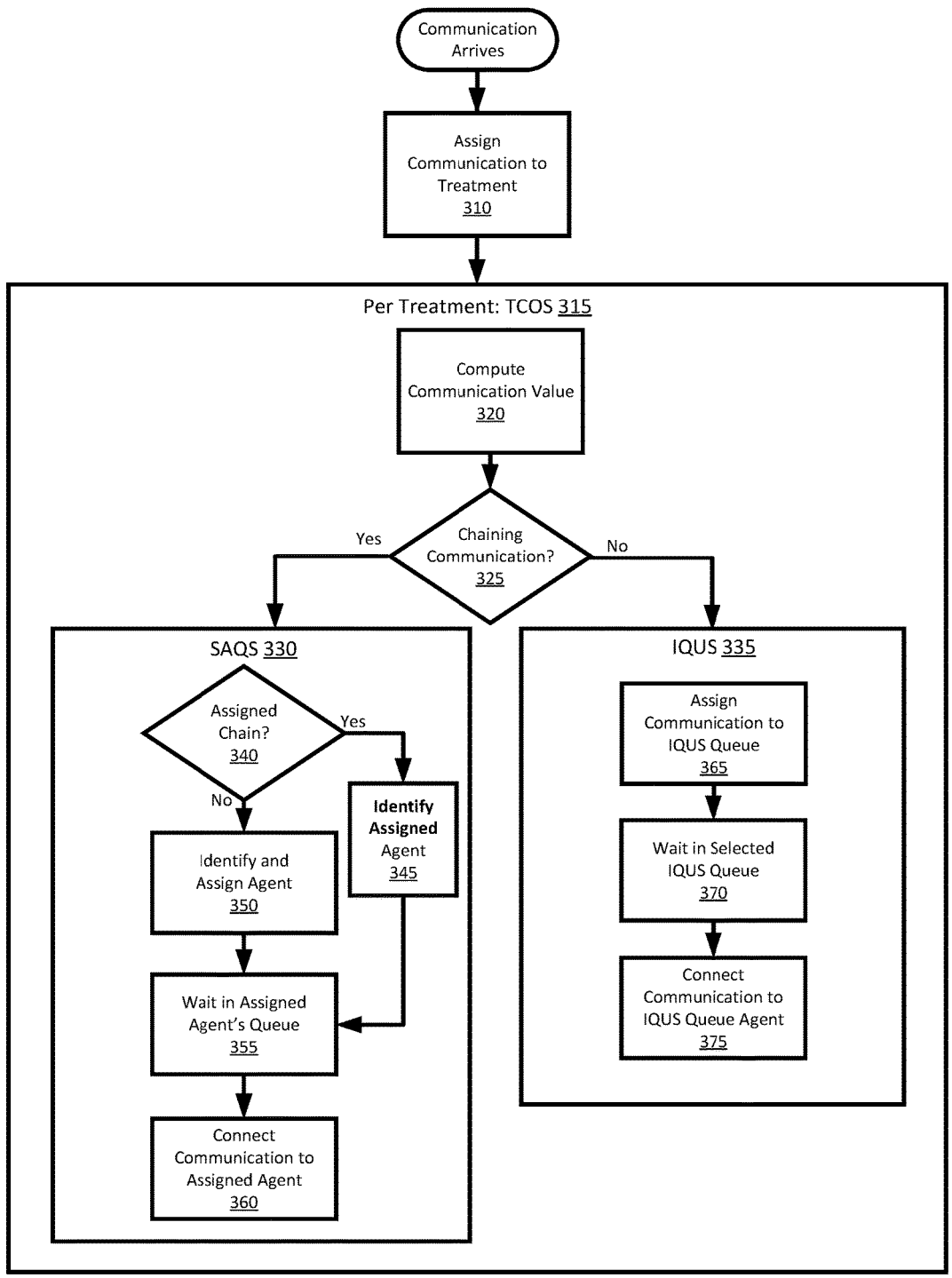
FIG. 3 illustrates an overview of a communication handling process for a treatment that is involved in various embodiments of the present invention.

As previously mentioned, the TCOS provides an executive function ("TEF") in various embodiments that involves managing the interface between the treatment and the contact center, the routing of communications to the SAQS and IQUS, and the alleviating of temporary treatment stress conditions dues to temporary overload of individual queues. Turning now to FIG. 3, a process for handling a communication that is assign to a treatment is shown. Accordingly, the communications "arrives," the communication may be inbound or outbound, and is assigned to the treatment in Operation 310. As already discussed, the contact center may make use of one or more rules and/or criteria is determining which of the treatments supported by the contact center the communication should be assigned to.

Once the communication is assigned to the treatment, the TCOS 315 computes a communication value for the communication in Operation 320. In various embodiments, the algorithm and/or model used in determining the communication's value may be specific to the treatment. That is to say, each treatment supported by the contact center may have a unique algorithm and/or model for determining the value of communications placed in the treatment. Furthermore, each channel of the treatment may have a unique algorithm and/or model for determining the value of communications placed in the treatment utilizing the channel.

Next, the TCOS 315 determines whether the communication involves the use of a chaining channel in Operation 325. If so, then the TCOS 315 alerts the SAQS 330 to the presence of the communication. The SAQS 330 responds by first determining whether the communication is part of an existing chain of communications in Operation 340. In other words, the SAQS 330 determines whether the communication is involved in an existing exchange of communications assigned to an agent that is taking place between that agent and a remote party. For example, the communication may be an email received from a particular party. In this instance, the email may be a response to an email sent by an agent to the particular party asking for requested information and the received email from the particular party may include the requested information. Therefore, the particular party who sent the email is already engaged in an exchange of emails with a particular agent of the contact center. Normally, the contact center would want the received email to be sent to the particular agent already engaged in the exchange of emails with the party for continuity reasons. Thus, if the SAQS 330 determines the communication is part of an existing chain, then the SAQS 330 identifies the assigned agent involved in the chain in Operation 345.

However, if the communication is not part of an existing chain, then the SAQS 330 goes about identifying and assigning an agent to the communication in Operation 350. Generally speaking, the SAQS 330 performs this operation in various embodiments by attempting to match the communication with an appropriate agent who is authorized to handle the communication's channel by considering the value of the communication and ranking of the agent for that channel. Therefore, if the value of the communication is quite high, the SAQS 330 will attempt to assign the communication to a higher ranking agent for the appropriate channel. However, the SAQS 330 in particular embodiments will also consider the agent's capacity to handle the communication adequately if assigned to him or her. For example, the agent that appropriately matches up with the value of the communication may currently have five other communications assigned to the agent sitting in the agent's queue. In this instance, the SAQS 330 considers whether the communication will be handled by the agent in a timely manner if the communication is assigned to the agent and is placed sixth in the agent's queue. If not, then the SAQS 330 considers the next appropriately ranked agent for the channel and so forth until an agent is identified who has the capacity to handle the communication.

At this point, the SAQS 330 places the communication in the selected agent's queue in Operation 355. Therefore, the communication waits in the agent's queue until the agent becomes available to handle the communication. Depending on the embodiment, communications waiting in an agent's queue may be connected to agent based on different criteria. For instance, in particular embodiments, the communications in an agent's queue may be simply connected to agent based on a first-in-first-out (FIFO) configuration. However, in other instances, the communication's value may also be considered in addition to (or instead of) the amount of time the communication has waited in the agent's queue. Once the agent becomes available to handle the communication, the SAQS 330 connects the communication to the agent in Operation 360 and the agent then responds to the communication in an appropriate manner.

Returning to Operation 325, if the TCOS 315 determines the communication is not using a chaining channel, but instead a non-chaining channel, then the TCOS 315 notifies the treatment's IQUS 335 of the communication. In response, the IQUS 335 assigns the communication to an appropriate queue based on the communication's value in Operation 365. As previously mentioned, the value ranges for the different queues of the treatment may vary with respect to the channel of communication being utilized by the communication. Therefore, the IQUS 335 in various embodiments not only considers the value of the communication but also considers the channel of communication being utilized by the communication.

Once assigned to a queue, the communication waits in the selected queue in Operation 370 for an agent assigned to the queue who handles the corresponding channel of communication to become available to handle the communication. Again, depending on the embodiment, the communication may be processed through the queue using different criteria such as FIFO or a combination of the communication's value and the time the communication has spent in the queue. Once such an agent becomes available (again, the IQUS may be configured in particular embodiments to consider the communication's value and agents' rankings in finding an appropriate agent to connect the communication to), then the IQUS 335 connects the communication to the identified agent in Operation 375.

Figure 4:
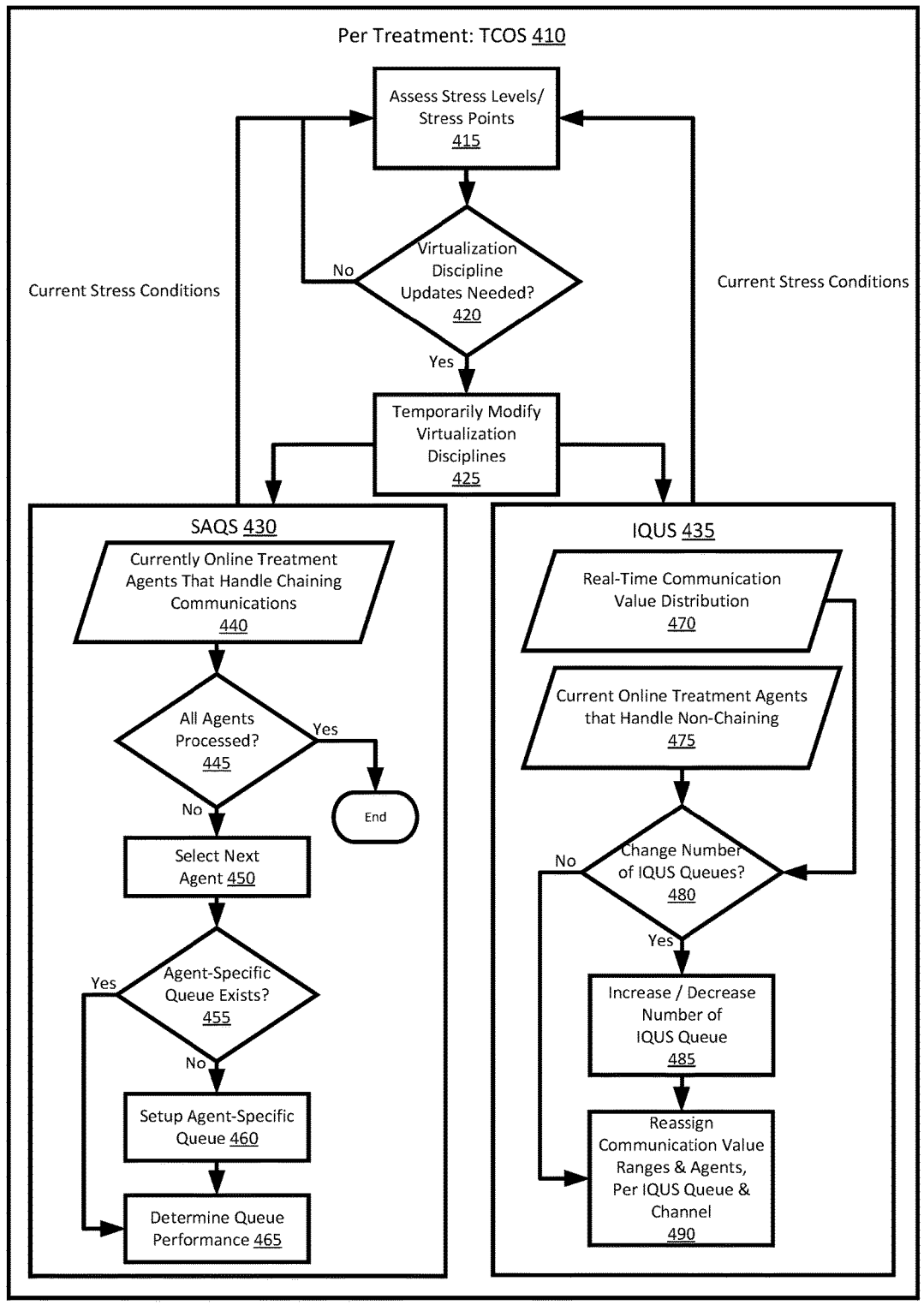
FIG. 4 illustrates an overview of a treatment control process that is involved in various embodiments of the present invention.

Finally, turning to FIG. 4, a process is provided for handling temporary stress conditions that are the result of one or more overloaded queues for a treatment. In various embodiments, an overloaded queue is viewed as a SAQS queue that is not currently satisfying its service level requirement for one or more channels and an IQUS queue that is not currently satisfying its stability requirement and/or service level requirement for one or more channels. Accordingly, the TCOS 410 receives messages from the SAQS 430 and IQUS 435 on current stress conditions and assesses the stress levels and stress points being encountered by the SAQS 430 and IQUS 435 in Operation 415. This assessment carried out by the TCOS 410 in various embodiments is to determine the magnitude of the overload on the one or more queues so that appropriate action can be taken to relieve the stress.

Thus, in various embodiments, the TCOS 410 is configured to address the current stress conditions by adjusting the virtualization discipline for one or more agents to counteract the stress conditions. Therefore, in Operation 420, the TCOS 410 determines whether the virtualization discipline for one or more agents needs to be updated in light of the current stress conditions. For example, the current stress conditions may indicate that a queue for a particular agent who is handling chaining communications is overloaded and the communications currently assigned to the agent's queue are waiting too long before being connected to the agent. Here, the TCOS 410 may address the overload of the agent's queue by adjusting the virtualization discipline of the agent to limit the number of chaining communications that can be assigned to the agent at any given time. As a result, the SAQS 430 may not assign any further chaining communications to the particular agent until the agent has worked through the backlog of communications already in the agent's queue. The TCOS 410 can then restore the agent's virtualization discipline to its original setting once the backlog has been taken care of by the agent.

Therefore, if the TCOS 410 determines the virtualization discipline for one or more agents needs to be updated, the TCOS 410 will do so in Operation 425. Accordingly, the update to the one or more agents' virtualization discipline is communicated to the SAQS 430 and IQUS 435 so that the two subsystems can operate accordingly.

In turn, the SAQS 430 evaluates the performance of the agent-specific queues for the treatment to determine whether any such queues are experiencing an overload condition. The SAQS 430 determines the current online agents who are handling chaining communications for the treatment in Operation 440. The SAQS 430 then works through the agents to determine whether any of the agents' specific queues are experiencing an overload condition.

Therefore, in Operation 445, the SAQS 430 determines whether all of the agents handling chaining communications have been processed. If not, then the SAQS 430 selects the next agent in Operation 450. Here, the SAQS 430 initially determines whether a queue exists for the specific agent in Operation 455. The SAQS 430 performs this operation in particular embodiments because the selected agent may have just come online (e.g., an agent who may have started work in the middle of a workday) and a queue for the agent was not created at startup. If a queue does not exist, then the SAQS 430 creates a queue for the agent in Operation 460.

The SAQS 430 then determines the performance of the queue for a particular agent in Operation 465. In various embodiments, this particular operation involves the SAQS 430 determining whether the overall performance for the queue is acceptable and/or whether the performance of queue with respect to each channel of communication handled by the queue is acceptable. If the SAQS 430 determines the queue for a particular agent is not performing at an acceptable level, the SAQS 430 may then report the condition to the TCOS 410 so that the TCOS 410 may take appropriate action such as updating the agent's virtualization discipline in an attempt to relieve the stress conditions.

As for the IQUS 435, the IQUS 435 retrieves the real-time communication value distribution for the various channels of the treatment in Operation 470, as well as retrieves the current agents who are online and assigned to the treatment to handle non-chaining communications in Operation 475. In various embodiments, the communication value distribution for each channel of the treatment is updated during the workday with real-time data as communications are assigned to the treatment. For instance, the treatment control process in particular embodiments may involve gradually replacing a start of the day communication value distribution for a particular channel of a treatment with a real-time communication value distribution derived from a moving window of time made up of the most recent communications to which the treatment was applied. For example, the number of communications to keep in the window of time may be fixed at 100, wherein the oldest communication is dropped from the window whenever a new communication is added. Accordingly, as the workday progresses, the start of day communication value distribution is gradually replaced with a real-time communication value distribution derived from the most recent 100 communications to which the treatment was applied as new communications are added to the window of time and old communications that were used in deriving the start of the day communication value distribution are dropped from the window of time. Furthermore, the real-time communication value distribution for the particular channel of the treatment is continuously updated as the treatment is applied to new communications using the channel during the workday, resulting in the most recent communications being added to the moving window of time and the oldest communications being dropped from the window of time.

Furthermore, as the workday progresses, conditions related to the treatment may occur that affect the performance of the treatment. For instance, the arrival rate of non-chaining communications and/or the availability rate of the treatment's agents handling non-chaining communications may change in a manner that affects the performance of the different non-chaining queues. For example, the arrival rate for telephone calls that are assigned to the highest queue of the treatment may increase from an arrival rate at startup of a telephone call arriving every thirty seconds on average to an arrival rate at the middle of the workday of a telephone call arriving every five seconds on average. Here, the increase in the arrival rate of telephone calls for the highest queue of the treatment may significantly affect the performance of the queue since the number of agents currently assigned to handle the queue must now service a significant increase in the number of calls.

Therefore, in particular embodiments, the IQUS 435 determines whether the configuration of the queues handling non-chaining communications for the treatment may need to be updated as a result of a change in conditions in Operation 480. If the IQUS 435 determines that such a change has occurred, then the IQUS 435 may attempt to address the change by changing the configuration of the queues by adding or subtracting one or more queues to the current configuration in Operation 485. For instance, returning to the example in which the arrival rate for telephone calls has significantly increased for the highest queue of the treatment, the IQUS 435 may attempt to address the increase by decreasing the number of queues handling non-chaining communications for the treatment so that more agents may be assigned to the highest queue.

As a result of the new configuration, the IQUS 435 reassigns communication value ranges and agents to the queues of the new configuration with respect to each non-chaining channel by the treatment in Operation 490. Here, in particular instances, the change in conditions may be so significant that the IQUS 435 is unable to appropriately address the change by increasing or decreasing the number of queues for the treatment and/or reassigning communication values and/or agents to the queues. For example, the arrival rate for telephone calls assigned to the highest queue of the treatment may have increased so dramatically that assigning all of the agents who handle telephone calls for the treatment to the highest queue still does not address the change in arrival rate. Therefore, in these instances, the IQUS in particular embodiments may reports such conditions to the TCOS 410 so that the TCOS 410 can take appropriate action to address the stress conditions.

Under certain conditions the directive to change the number of IQUS queues will not result in the number of IQUS queues being changed, due to a determination that increasing the number of IQUS queues is not feasible or that decreasing the number of IQUS queues is not actually necessary. However, under those circumstances in particular embodiments, the reassigning of communication value ranges and agents is still performed. Further, in various embodiments, these operations are also performed on an ongoing basis while the IQUS is in its steady state mode of operation, focused on maintaining a fixed number of queues in a proper working condition.

Treatment Initialization Module

Figure 5:
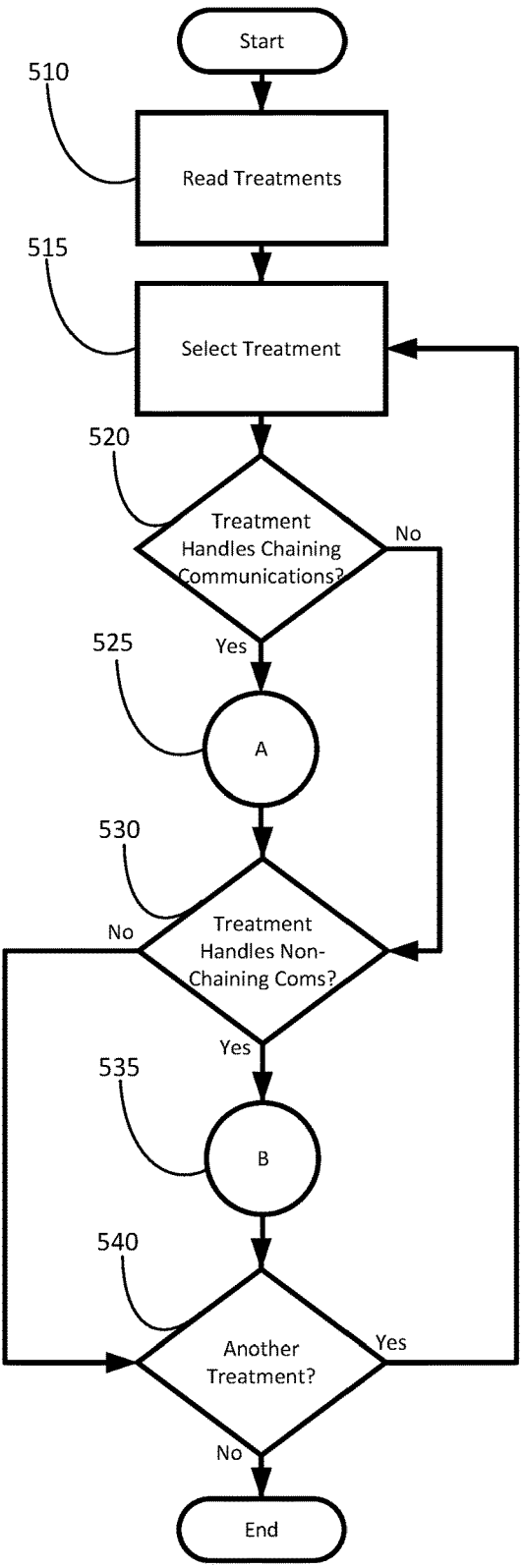
FIG. 5 illustrates a process flow for initializing the treatments for a contact center at startup in accordance with various embodiments of the present invention.

Turning now to FIG. 5, additional details are provided regarding a process flow for initializing the treatments for a contact center at startup (e.g., at the beginning of a workday) according to various embodiments of the invention. In particular, FIG. 5 is a flow diagram showing a treatment initialization module for performing such functionality according to various embodiments of the invention. For example, the flow diagram shown in FIG. 5 may correspond to operations carried out by one or more processors in one or more components, such as, for example, the communications handler 150 described above, as it executes the treatment initialization module stored in the component's volatile and/or nonvolatile memory.

Accordingly, a contact center may invoke the treatment initialization module in various embodiments at the start of a workday to initialize the treatments supported by the contact center. Therefore, the process begins with the treatment initialization module reading the family of treatments supported by the contact center in Operation 510. Here, depending on the embodiment, the treatment initialization module may read the family of treatments from some type of storage media located within or outside of the contact center (e.g., data store 175 in FIG. 1). In addition, the treatment initialization module may retrieve one or more pieces of information about each of the treatments such as, for example, the current queue configuration for a treatment, the service level requirements set for the queues of the treatment, and/or the communication volume percentages set for these queues.

Next, the treatment initialization module selects a particular treatment from the family of treatments in Operation 515. At this point, in particular embodiments, the treatment initialization module determines whether the selected treatment handles chaining communications in Operation 520. That is to say, the treatment initialization module determines whether the treatment handles any channels of communication that are considered chaining channels.

If the selected treatment does handle chaining communications, then the treatment initialization module invokes a SAQS startup module (FIG. 6) in Operation 525 to create queues for the agents who handle chaining communications for the treatment. As discussed in further detail herein, the SAQS startup module creates queues for the agents who handle chaining communications for the treatment and per channel assigns those agents who handle the channel to communication value intervals based on their rankings for that channel.

The treatment initialization module then determines whether the selected treatment handles non-chaining communications in Operation 530. If so, then the treatment initialization module invokes an IQUS startup module (FIG. 10) in Operation 535 to channel-assign agents who handle non-chaining communications for the treatment to the various non-chaining queues that make up the treatment. As discussed in further detail herein, the IQUS startup module determines per channel the number of agents that are required to be channel-assigned to the various non-chaining queues of the treatment based on performance requirements for the queues and per channel and assigns the required number of agents to each queue based on the agents' rankings for that channel.

At this point, the treatment initialization module determines whether another treatment is found in the family that needs to be initialized in Operation 540. If so, then the treatment initialization module returns to Operation 515 and selects the next treatment. If not, then the treatment initialization module simply ends the process. Accordingly, the contact center is now ready to begin processing communications by using the family of treatments as a result of initializing all of the treatments supported by the contact center.

SAQS Startup Module

Figure 6:
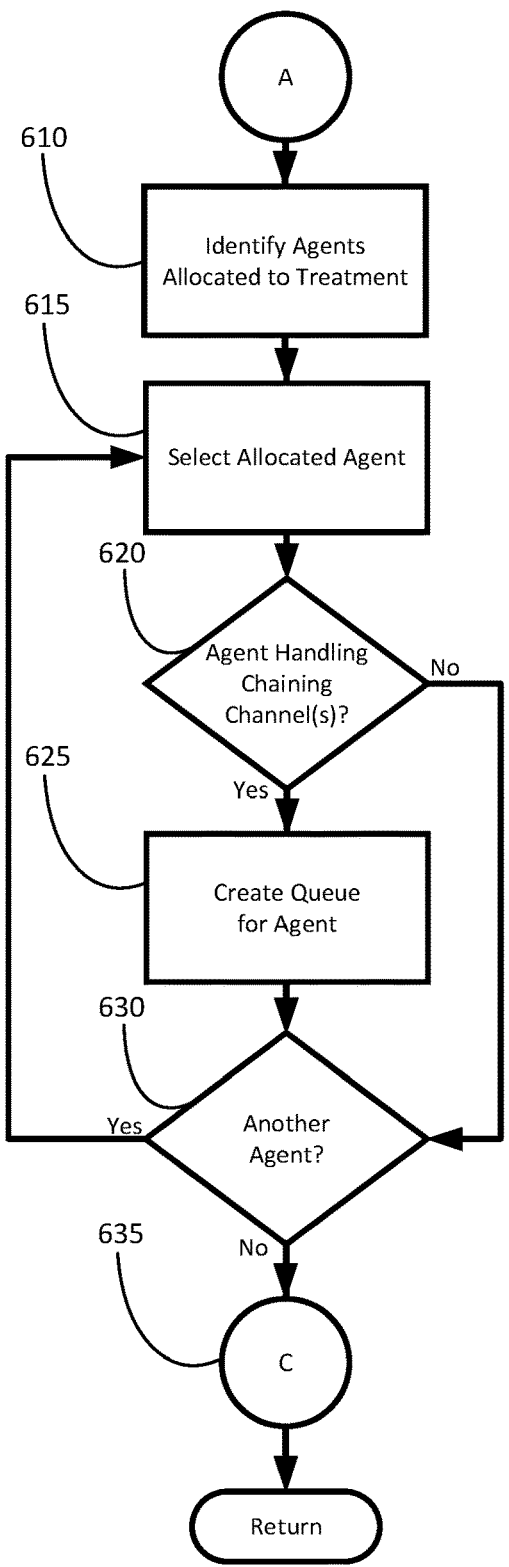
FIG. 6 illustrates a process flow for starting up the chaining queues for a treatment in accordance with various embodiments of the present invention.

Turning now to FIG. 6, additional details are provided regarding a process flow for starting up the chaining queues for a treatment according to various embodiments of the invention. In particular, FIG. 6 is a flow diagram showing a SAQS startup module for performing such functionality according to various embodiments of the invention. For example, the flow diagram shown in FIG. 6 may correspond to operations carried out by one or more processors in one or more components, such as, for example, the communications handler 150 described above, as it executes the SAQS startup module stored in the component's volatile and/or nonvolatile memory.

As already mentioned, the SAQS startup module is invoked by the TEF treatment initialization module in various embodiments to startup the SAQS configuration for the treatment and create queues for the agents who handle chaining communications for the treatment. However, in other embodiments, the SAQS startup module may not be invoked by the TEF treatment initialization module, but may instead be invoked by a different module or independently as a stand-alone module.

Accordingly, the process flow begins with the SAQS startup module identifying the agents who are online and allocated to the treatment in Operation 610. Here, depending on the embodiment, the SAQS startup module may access this information from some storage media located within or outside of the contact center and/or from some other component within or outside the contact center such as the communications handler 150 described in FIG. 1.

Next, the SAQS startup module selects one of the agents in Operation 615 and determines whether the selected agent is handling chaining communications for the treatment in Operation 620. If so, then the SAQS startup module creates a queue for the agent in Operation 625. In various embodiments, each of these single agent queues of a treatment is restricted to handling the communications of chains assigned to that agent. Thus, when an unassigned chain communication arrives, the chain is assigned to an agent prior to the communication being placed in that agent's queue.

Figure 7:
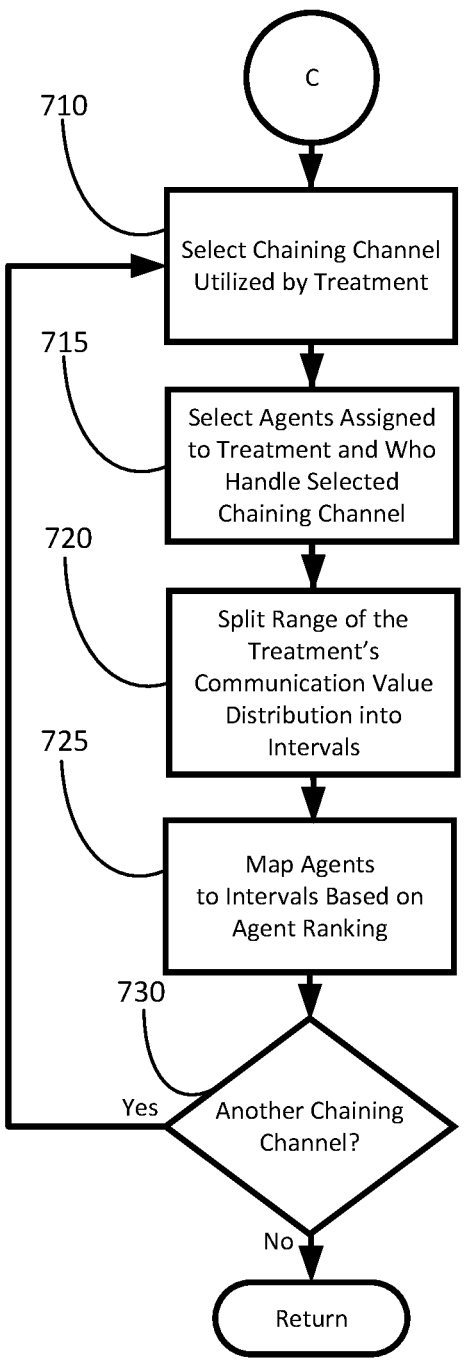
FIG. 7 illustrates a process flow for mapping the treatment agents for each chaining channel who handle that channel to communication value intervals in accordance with various embodiments of the present invention.

At this point, the SAQS startup module determines whether another agent is available who is online and allocated to the treatment in Operation 630. If so, then the SAQS startup module returns to Operation 615 and selects the next agent. If not, then the SAQS startup module associates (maps) per chaining channel each agent currently handling communications of that channel to range intervals of communication value, based on the rankings of the agents for that channel in Operation 635. For instance, in particular embodiments, the SAQS startup module performs this operation for mapping agents by invoking a SAQS agent mapping module (FIG. 7). In turn, the SAQS agent mapping module assigns per chaining channel the agents of the treatment who handle that channel to intervals corresponding to the communication values found in the communication value distribution for that channel. Accordingly, the higher the agent is ranked relative to the other agents handling a particular chaining channel for the treatment, the higher the communication value interval for that particular chaining channel the agent is mapped to. Once the agents handling chaining communications for the treatment have been mapped to communication distribution intervals based on their rankings for each chaining channel, the process is ended.

SAQS Agent Mapping Module

Turning now to FIG. 7, additional details are provided regarding a process flow for mapping for each chaining channel the treatment agents who handle that channel to communication value intervals based on the agents' ranking for that channel according to various embodiments of the invention. In particular, FIG. 7 is a flow diagram showing a SAQS agent mapping module for performing such functionality according to various embodiments of the invention. For example, the flow diagram shown in FIG. 7 may correspond to operations carried out by one or more processors in one or more components, such as, for example, the communications handler 150 described above, as it executes the SAQS agent mapping module stored in the component's volatile and/or nonvolatile memory.

As already mentioned, the SAQS agent mapping module is invoked by the SAQS startup module in various embodiments to assign the agents who handle chaining communications for the treatment to communication intervals for the different chaining channels. However, like the SAQS startup module, the SAQS agent mapping module in other embodiments may not be invoked by the SAQS startup module, but may instead be invoked by a different module or independently as a stand-alone module. For instance, in particular embodiments the SAQS may invoke the SAQS agent mapping module based on the occurrence of particular events such as, for example, agents going online or offline, the arrival of a new chaining channel communication in the SAQS, or the departure of a communication from one of the SAQS queues by either its connection to an agent or by its self-disposal.

Here, the SAQS agent mapping module begins the process in FIG. 7 by selecting a chaining channel utilized by the treatment in Operation 710. Depending on the embodiment, the SAQS agent mapping module may retrieve information used for identifying the chaining channels utilized by the treatment or the SAQS startup module may provide the SAQS agent mapping module with such information.

At this point, the SAQS agent mapping module selects the agents who are online and fielding communications for the treatment utilizing the selected chaining channel in Operation 715. In turn, the SAQS agent mapping module splits the range of the treatment's communication value distribution into intervals in Operation 720 based on the communication values found in the value distribution for the communications utilizing the selected chaining channel.

As previously mentioned, a ranking of the agents who handle a particular chaining channel is provided for each chaining channel handled by a treatment. Accordingly, this ranking may be different for different channels. At the beginning of the workday, a historical distribution of communication values for each chaining channel is retrieved. Here, the SAQS agent mapping module performs Operation 720 in various embodiments by splitting the communication value distribution of the selected channel into H range intervals, wherein H is the number of online agents assigned to the treatment who are handling the selected channel for the treatment and each of the H range intervals has approximately the same percentage of the total communication volume found in the communication value distribution for the channel.

Once the value distribution has been split into ranges, the SAQS agent mapping module then maps (assigns) the agents who are online and handling the selected channel for the treatment to the range intervals in Operation 725. Specifically, the SAQS agent mapping module performs this operation in particular embodiments by associating the highest ranking agent for the selected channel to the highest value range interval, associating the next highest ranking agent for the selected channel to the next highest value range interval, and so forth.

Upon completion of Operation 725, the SAQS agent mapping module determines whether the treatment is handling another chaining channel in Operation 730. If so, then the SAQS agent mapping module returns to Operation 710, selects the next chaining channel, and performs the same operations discussed above for the newly selected chaining channel. However, if the SAQS agent mapping module determines the treatment is not handling any additional chaining channels, then the process ends.

At this point, each agent who is handling a particular chaining channel for the treatment has been assigned to a value interval for the particular chaining channel. Therefore, as discussed in further detail herein, when a chaining communication of an unassigned chain arrives in the treatment, the chaining communication is assigned to a particular agent to handle (e.g., placed in a particular agent's queue) based on the value of the communication and the value range of the interval the agent has been mapped to due to his or her ranking for the applicable chaining channel. For example, the contact center may receive an initial SMS text message from a third party and assign the SMS text message to a particular treatment. Accordingly, the SMS text message may be determined to have a communication value of 527 and is assigned to an agent handling SMS text messages for the treatment who has been designated to an interval having a value range of 520 to 530.

SAQS New Agent Module

There may be occurrences after a treatment has been started at the beginning of a workday when a new agent may come online who was not online at startup. For example, a treatment may have been started up at 8:00 a.m., however an agent assigned to the treatment may have not been online at 8:00 a.m. because he had a doctor appointment and did not get to work until 10:00 a.m. Therefore, this agent is considered a new agent who has now come online and is assigned to the treatment.

Figure 8:
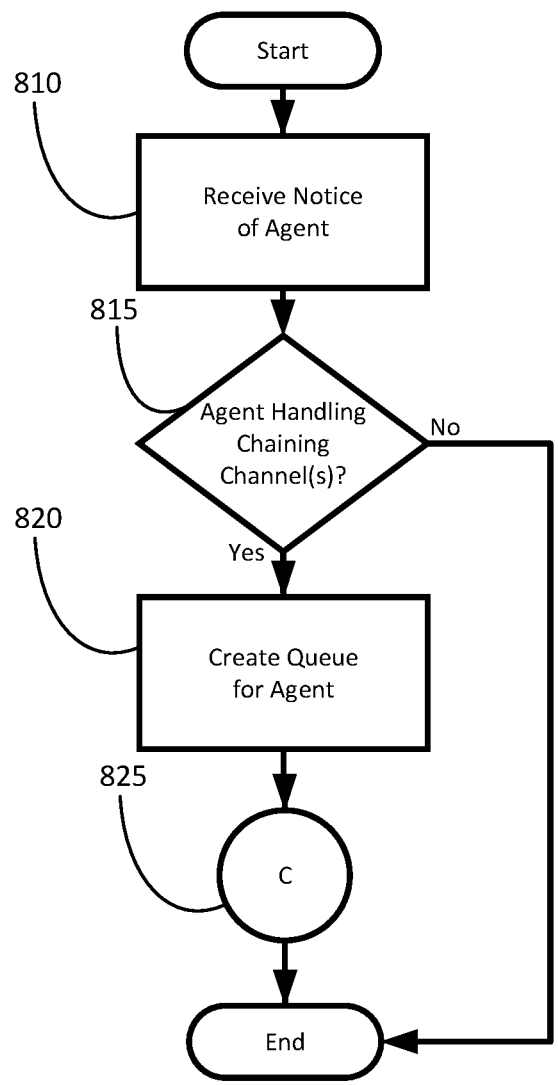
FIG. 8 illustrates a process flow for starting up a new agent who has come online and is handling chaining communications for a treatment in accordance with various embodiments of the present invention.

Accordingly, turning now to FIG. 8, additional details are provided regarding a process flow for starting up a new agent who is handling chaining communications for a particular treatment according to various embodiments of the invention. In particular, FIG. 8 is a flow diagram showing a SAQS new agent module for performing such functionality according to various embodiments of the invention. For example, the flow diagram shown in FIG. 8 may correspond to operations carried out by one or more processors in one or more components, such as, for example, the communications handler 150 described above, as it executes the SAQS new agent module stored in the component's volatile and/or nonvolatile memory.

Here, the process begins in various embodiments with the SAQS new agent module receiving a notice of the agent assigned to the treatment coming online for the first time that workday in Operation 810. For instance, in particular embodiments, the agent may log into his or her workstation and the call handler 150 is notified that the agent is now logged in and available to handle communications for the contact center. Accordingly, the call handler 150 may notify the TEF handling a treatment the agent is assigned to. The TEF (or SAQS) may respond by invoking the SAQS new agent module and providing the module with a notice of the agent becoming available for the treatment.

The SAQS new agent module responds to the notice by determining whether the agent handles one or more chaining channels for the treatment in Operation 815. If so, then the SAQS new agent module creates a queue for the agent in Operation 820. At this point, the new agent needs to be assigned to a value interval for each of the chaining channels the agent handles for the treatment. Therefore, in particular embodiments, the SAQS new agent module invokes the SAQS agent mapping module (FIG. 7) to have the agents handling chaining communications for the treatment, including the new agent who has come online, assigned to value intervals for each of the chaining channels handled by the treatment in Operation 825. As a result, the new agent has now been integrated into the other online agents who are assigned to the treatment and handling chaining communications for the treatment.

SAQS Offline Agent Module

Just as there may be occurrences after a treatment has been started at the beginning of a workday when a new agent may come online who was not online at startup, there may be occurrences after a treatment has been started when an agent may go offline and is no longer available for handling chaining communications for the treatment. For example, an agent may become ill during a work shift and may decide to go home for the day, or an agent may complete their shift normally and leave for the day.

Figure 9:
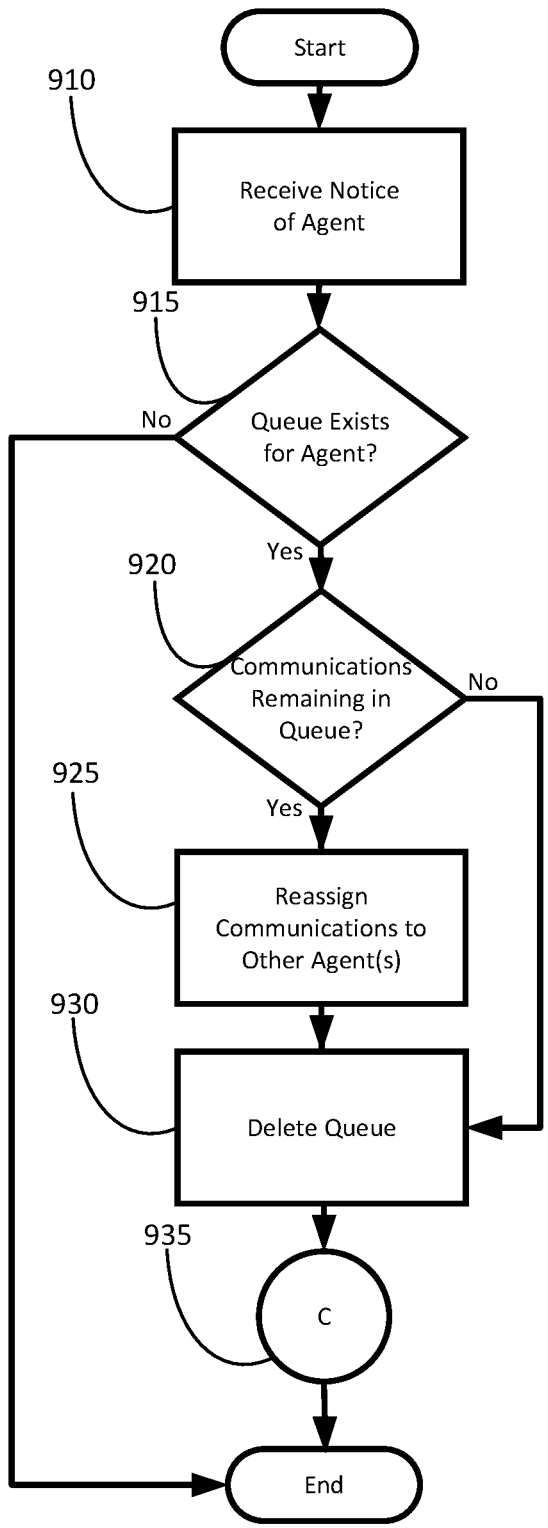
FIG. 9 illustrates a process flow for removing an agent who is handling chaining communications for a treatment and has gone offline in accordance with various embodiments of the present invention.

Therefore, turning now to FIG. 9, additional details are provided regarding a process flow for removing an agent who is handling chaining communications for a particular treatment and has gone offline according to various embodiments of the invention. In particular, FIG. 9 is a flow diagram showing a SAQS offline agent module for performing such functionality according to various embodiments of the invention. For example, the flow diagram shown in FIG. 9 may correspond to operations carried out by one or more processors in one or more components, such as, for example, the communications handler 150 described above, as it executes the SAQS offline agent module stored in the component's volatile and/or nonvolatile memory.

Similar to the SAQS new agent module, the process begins in various embodiments with the SAQS offline agent module receiving a notice of the agent assigned to the treatment who has gone offline in Operation 910. For instance, in particular embodiments, the agent may log out of his or her workstation and the call handler 150 is notified that the agent is now offline and is unavailable to handle communications for the contact center. Accordingly, the call handler 150 may notify the TEF handling the treatment the agent has gone offline. The TEF (or SAQS) responds by invoking the SAQS offline agent module and providing the module with a notice of the agent becoming unavailable for the treatment.

The SAQS offline agent module initially determines whether a chaining queue exists for the agent who is now offline for the treatment in Operation 915. If so, then the SAQS offline agent module determines whether any communications that have been assigned to the agent's queue remain in the queue in Operation 920. The reason for this check is that if any communications do remain in the queue, these communications need to be reassigned to other agents so that when the queue is deleted, they are not simply lost and never handled by an agent.

Therefore, if communications do remain in the agent's queue, the SAQS offline agent module reassigns these communications to one or more other agents' queues in Operation 925. As further detailed herein, the SAQS offline agent module performs this particular operation in various embodiments by attempting to reassign the communications to the most appropriate agents based on the values of the communications, the value range intervals assigned to the agents who are handling the corresponding chaining channels, and the availability of these agents.

Once any remaining communications have been reassigned, then the SAQS offline module can delete the agent's queue in Operation 930. At this point, the remaining agents who are still online for the treatment need to be reassigned to value intervals for each of the chaining channels handled by the treatment. Therefore, in Operation 935, the SAQS offline agent module invokes the SAQS agent mapping module (FIG. 7) in various embodiments to have the remaining agents handling chaining communications for the treatment assigned to value intervals for each of the chaining channels handled by the treatment.

IQUS Startup Module

As previously discussed, the IQUS handles all the communications of the non-chaining channels for a given treatment. The different forms (configurations) of the IQUS manage a single queue or an ordered ensemble of queues to handle all the non-chaining communications of the treatment. However, unlike the SAQS, none of the IQUS queues are associated with a specific agent. Rather, each IQUS queue is assigned a designated subset of the agents in the treatment pool who handle one or more non-chaining channels.

In various embodiments, when multitasking is used but multichanneling is not used then each IQUS queue uses the virtual agents available from its specifically assigned sub-pool of the treatment potential virtual agent pool. If multi-tasking and multichanneling are both used, then there is a separate such sub-pool for each non-chaining channel. In addition, in various embodiments, when the minimal form of the IQUS configuration is used then the wait time threshold, the total volume percentage, and the applicable percentage are set for the single IQUS queue and remain constant, while for each non-chaining channel the communication value threshold for the queue is recomputed on an ongoing basis based on the total volume percentage so that it continues to produce the total volume percentage set for the queue. In addition, in various embodiments, when the basic or general form of the IQUS configuration is used then the wait time threshold and total volume percentage are set for each IQUS queue and remain constant, while for each non-chaining channel the communication value threshold for each queue is recomputed on an ongoing basis based on its total volume percentage so that it continues to produce the total volume percentage set for that queue.

Generally speaking, when more than one non-chaining channel is handled by a treatment then a separate service level requirement may be defined for each channel and queue. For example, the wait time threshold set for a telephone call channel is normally less than the wait time threshold set for a Web chat channel. In this instance, communications using both channels are handled in the queue, but their service level requirements are different.

Figure 10:
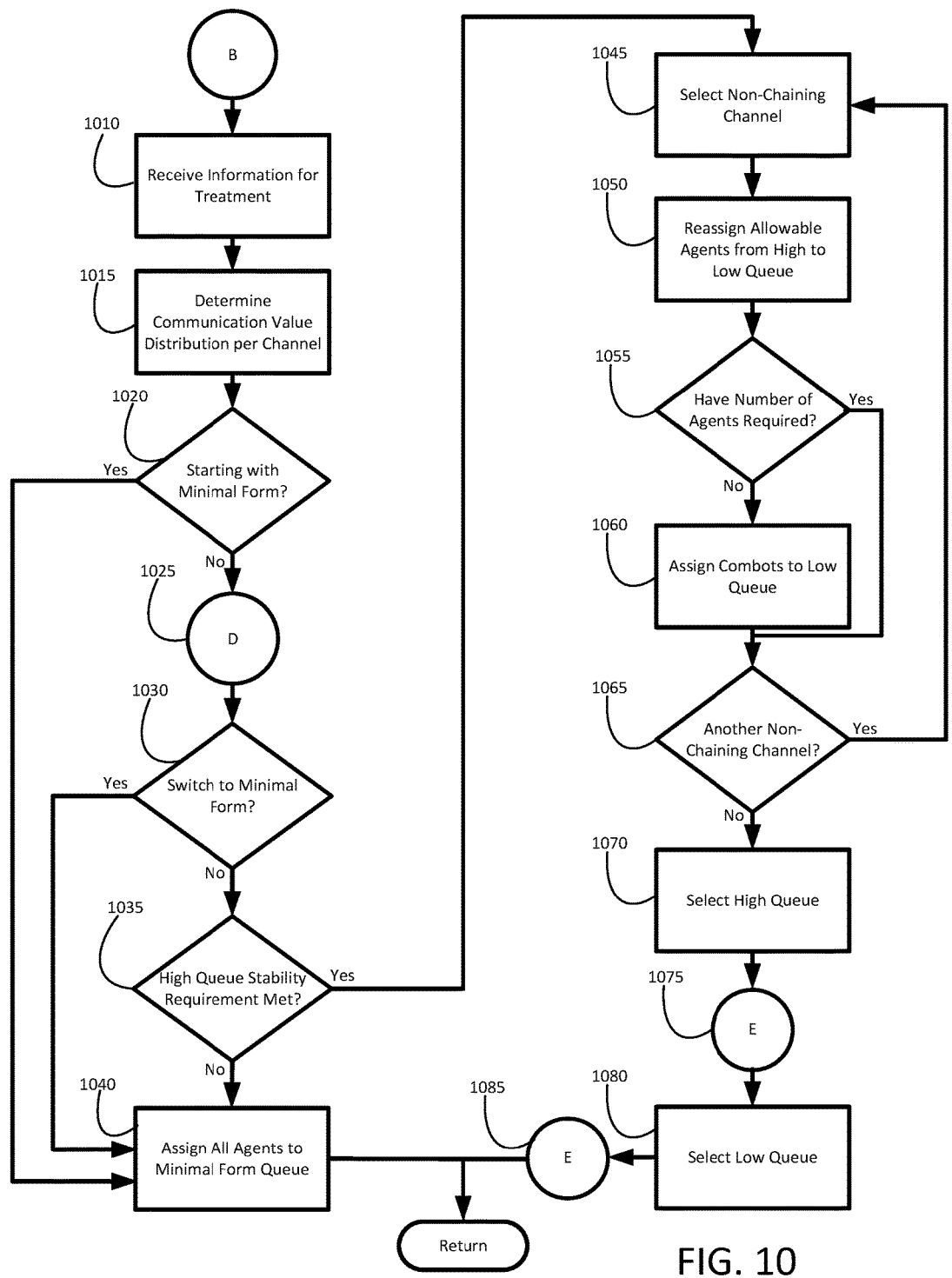
FIG. 10 illustrates a process flow for starting up the non-chaining queue for a treatment in accordance with various embodiments of the present invention.

Turning now to FIG. 10, additional details are provided regarding a process flow for starting up the non-chaining queues for a treatment according to various embodiments of the invention. In particular, FIG. 10 is a flow diagram showing an IQUS startup module for performing such functionality according to various embodiments of the invention. For example, the flow diagram shown in FIG. 10 may correspond to operations carried out by one or more processors in one or more components, such as, for example, the communications handler 150 described above, as it executes the IQUS startup module stored in the component's volatile and/or nonvolatile memory.

As already mentioned, the IQUS startup module is invoked by the treatment initialization module in various embodiments to startup the IQUS queues for the treatment for the purpose of handling non-chaining communications assigned to the treatment. However, in other embodiments, the IQUS startup module may not be invoked by the treatment initialization module, but may instead be invoked by a different module or independently as a stand-alone module.

Accordingly, the process flow begins with the IQUS startup module retrieving information for the treatment in Operation 1010. Depending on the embodiment, this information may include data on such items as the current queue architecture of the treatment, the form of the IQUS configuration designated for use in IQUS startup, the percentage of communication volume to be handled by each queue for each non-chaining channel handled by the treatment, the service level requirement for each queue and non-chaining channel, and/or a set of communications (e.g., a moving window of time) for each non-chaining channel that were applied the treatment. Depending on the embodiment, this information may be retrieved by the IQUS startup module from some type of storage media within or outside of the contact center (e.g., the data store 175 shown in FIG. 1) or provided by some other module such as the TEF treatment initialization module.

Next, the IQUS startup module determines a communication value distribution for each non-chaining channel handled by the treatment from each set of communications for the non-chaining channels in Operation 1015. Here, the IQUS module performs this task in particular embodiments by first reading (or computing) a communication value for each communication found in the set of communications for a particular non-chaining channel and then deriving a communication value distribution from the communication values.

At the beginning of a workday, the set of communications for a particular non-chaining channel typically includes historical records of communications made using the particular non-chaining channel that the treatment was applied to over a past time period such as, for example, a set of communications from the previous workday. In these instances, the derived communication value distribution for the particular non-chaining channel may be referred to as a start of the day communication value distribution. However, as the workday progresses and the TCOS, SAQS, and/or IQUS are re-establishing the properties of the treatment because some condition may have changed that may affect the performance of the treatment, then each set of communications for the different non-chaining channels typically includes records of more recent communications that may have been applied the treatment during the current workday. In these instances, the derived communication value distribution for each of the non-chaining channels may be referred to as a real-time communication value distribution for the non-chaining channel.

In particular embodiments of the invention, the IQUS startup module starts up each treatment with respect to non-chaining communications in a basic form having a two queue architecture or in a minimal form having a single queue architecture. Accordingly, if the IQUS configuration is started up in the minimal form, then all non-chaining communications are placed in the single queue of that form. Thus, the IQUS startup module determines if the minimal form is selected in Operation 1020. If the minimal form is selected, then the IQUS startup module assigns all the agents for all non-chaining channels to the single queue of the minimal form in Operation 1040. At that point, the IQUS startup module completes and the single non-chaining queue for the treatment have now been started up and is ready to field communications.

However, if the IQUS configuration is started up in a basic form, then the communication value distribution for each non-chaining channel is initially split based on a chosen communication value cutoff. The range of values above the cutoff is called the high interval and the range of communication values below the cutoff is called the low interval. IQUS communications with values in the high interval are placed in a high queue for the treatment. All the remaining communications are placed in the low queue for the treatment.

Therefore, if the basic form is selected, then the process continues in various embodiments with the IQUS startup module determining per non-chaining channel the number of agents required to support the high queue service level requirement of the channel by invoking a basic form channel support module (FIG. 11) in Operation 1025. The basic form channel support module also assigns all agents who handle a non-chaining channel to the high queue for all channels, determines per channel if the number of agents channel-assigned to the high queue is large enough to satisfy the high queue service level requirement of the channel, and indicates when failure to satisfy one of those requirements dictates that the minimal form should be started up instead of the basic form.

At this point, the IQUS startup module determines if the minimal form should be used to startup the IQUS in Operation 1030. If so, then all agents that handle a non-chaining channel are assigned to the single queue of the minimal form in Operation 1040 and the IQUS startup module completes. However, if use of the minimal form does not need to be used, then the IQUS startup module ascertains if the stability requirement for the high queue is met in Operation 1035. If the stability requirement is not met, then all agents which handle a non-chaining channel are assigned to the single queue of the minimal form in Operation 1040 and the IQUS startup module completes.

If the stability requirement for the high queue is met, then the IQUS startup module selects an initial non-chaining channel in Operation 1045. For the selected channel, the number of agents the high queue can spare while still meeting the channel's service level requirement is reassigned to low queue in Operation 1050. As these agents are transferred, the stability requirement for the high queue is continuously assessed, and if at some point the transfer of additional agents would cause the stability requirement for the high queue to be violated, then the transfer of agents is halted for that channel and no further agent transfers are considered for the remaining non-chaining channels (not shown in FIG. 10).

After transfer of the allowable agents to the low queue is completed, the IQUS startup module determines if the number of agents required to satisfy the channel's service level goal for the low queue is satisfied in Operation 1055. If not, then in particular embodiments, a number of combots are channel-assigned to the low queue to make up for the deficiency of available human agents in Operation 1060. The IQUS startup module then determines if there are any additional non-chaining channels in Operation 1065. If so, then the IQUS startup module returns to Operation 1045, selects the next non-chaining channel, and repeats the process for the newly selected non-chaining channel.

Figure 12:
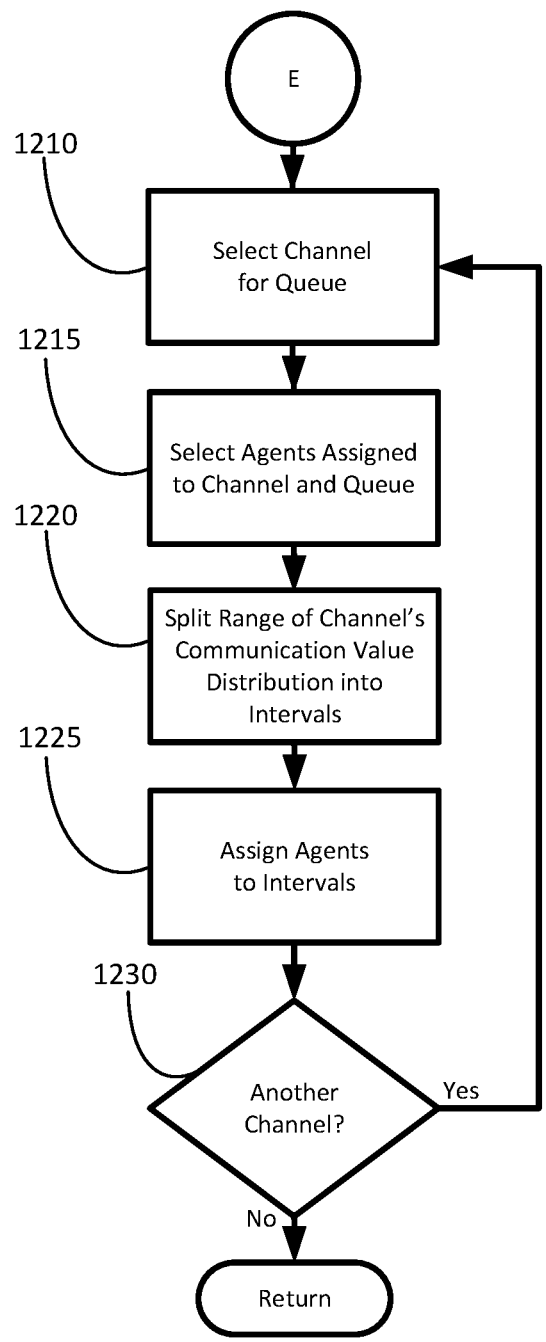
FIG. 12 illustrates a process flow for mapping agents for each non-chaining channel who handle that channel to communication value intervals based on the agents' rankings for that channel in accordance with various embodiments of the present invention.

Once the IQUS startup module has processed all of the non-chaining channels for the purpose of transferring agents from the high queue to the low queue, then the IQUS startup module selects the high queue in Operation 1070 and assigns the agents handling the high queue to communication value distribution intervals for the high queue and each of the channels in Operation 1075. For instance, in particular embodiments, the IQUS startup module accomplishes this task by invoking an IQUS agent mapping module (FIG. 12). As discussed in further detail herein, the IQUS agent mapping module assigns the agents to these communication value distribution intervals for each of the non-chaining channels based on the agents' rankings for the different channels. This assignment of the agents to communication value distribution intervals allows for a communication placed in the high queue of the treatment to be assigned to an appropriate agent based on the value of the communication and the ranking of the agent.

Next the IQUS startup module selects the low queue in Operation 1080 and assigns the agents handling the low queue to communication value distribution intervals for the low queue and each of the channels in Operation 1085. Again, in particular embodiments, the IQUS startup module accomplishes this task by invoking the IQUS agent mapping module (FIG. 12). At this point the IQUS startup module completes.

Note that combots are contact center artificial intelligence ("AI") entities used by the contact center in place of human agents in various embodiments. For example, in particular instances, a combot may be software with interactive capabilities to recognize speech (e.g., via speech analytics) and/or dual-tone multi-frequency signaling ("DTMF") entered by a party and interact with the party by providing audio information, much like an interactive voice response system. In these instances, the combots are configured to field any communications placed in the low queue for any of the non-chaining channels employed by the treatment. The combots are allowed to handle the communications placed in the low queue since these communications are generally considered lesser value communications than the communications assigned to the high queue. As discussed further herein, agents may begin to be reassigned from the high queue to the low queue as the day progresses and fewer agents are needed to service the communications placed in the high queue or when the agent pool of a non-chaining channel is enlarged.

In other embodiments the IQUS startup module for a treatment may immediately configure and deploy the minimal form, independent of the prior designation of the minimal form or basic form for use in IQUS startup. If the basic form was designated, then the functional processes overviewed in FIGS. 10 and 11 are still similar but are modified slightly to adjust for the fact that all currently arriving IQUS communications are being processed by the single queue of the minimal form.

Basic Form Channels Support Module

Figure 11:
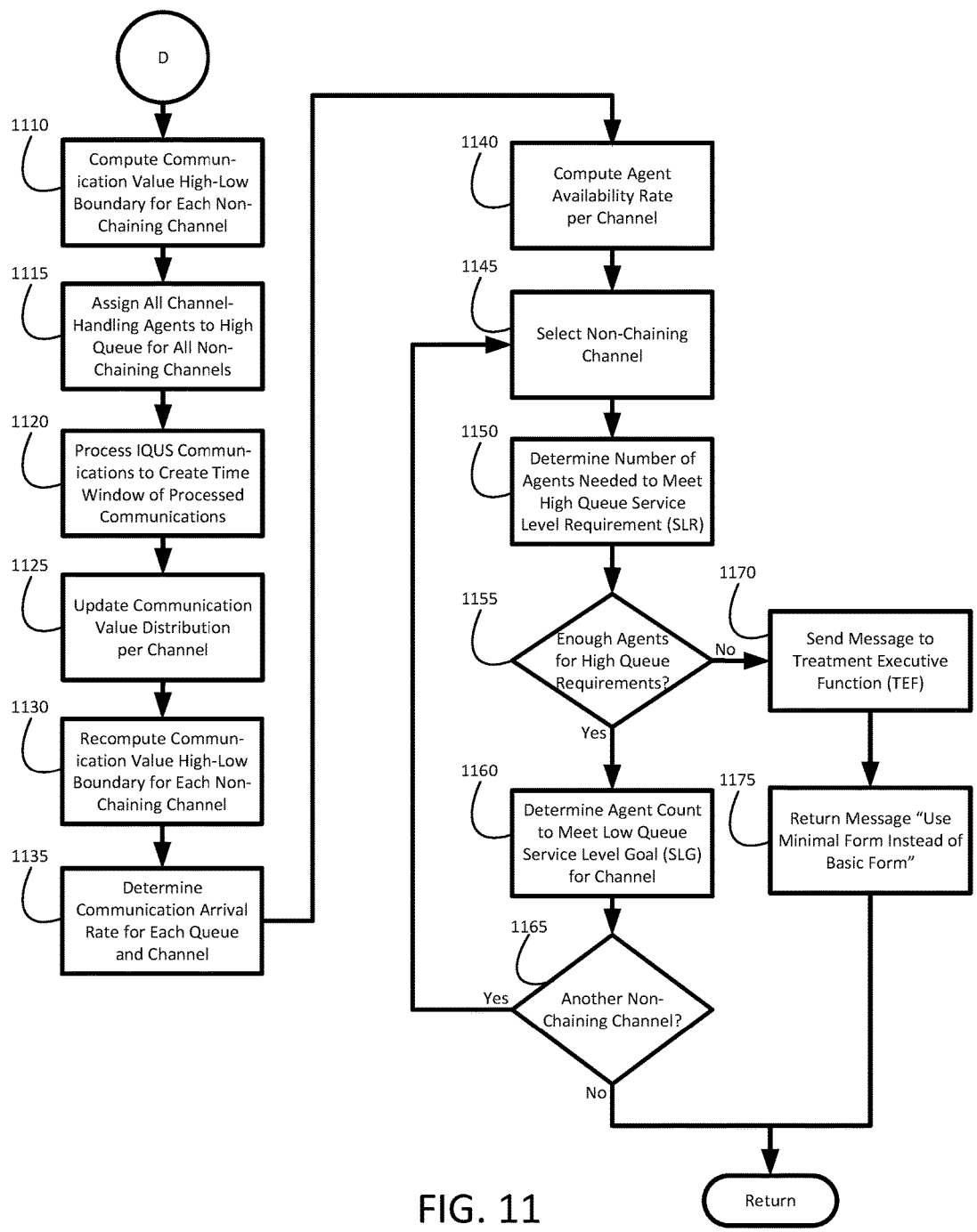
FIG. 11 illustrates a process flow for determining the minimum number of agents required for each interlinking queues subsystem ("IQUS") basic form queue of a treatment and each non-chaining channel to meet the service level requirement/goal of the queue and channel in accordance with various embodiments of the present invention.

Turning now to FIG. 11, additional details are provided regarding a process flow for determining the minimum number of agents required for each IQUS basic form queue and each non-chaining channel to meet the service level requirement/goal of the queue and channel according to various embodiments of the invention. In particular, FIG. 11 is a flow diagram showing a basic form channels support module for performing such functionality according to various embodiments of the invention. For example, the flow diagram shown in FIG. 11 may correspond to operations carried out by one or more processors in one or more components, such as, for example, the communications handler 150 described above, as it executes the basic form channels support module stored in the component's volatile and/or nonvolatile memory.

As previously mentioned, the IQUS startup module may invoke the basic form channels support module in various embodiments to identify the minimum number of agents required to be assigned to each of the two basic form queues and each non-chaining channel of a treatment to meet the service level requirement set for the queue and channel. However, in other embodiments, the IQUS support channel module may not be invoked by the IQUS startup module, but may instead be invoked by a different module or independently as a stand-alone module.

Accordingly, in particular embodiments, the IQUS startup module invokes the basic form channels support module and the basic form channels support module determines for each non-chaining channel a communication value high-low boundary based on the channel's communication value distribution and the selected high queue total volume percentage in Operation 1110. For each channel, if a non-chaining communication has a communication value above the high-low boundary for that channel, then it is placed in the high queue, otherwise it is placed in the low queue.

Next the basic form channels support module assigns all the agents who handle one or more non-chaining channels to the high queue for all channels in Operation 1115. The basic form channels support module then processes communications arriving in the IQUS for the treatment in order to create a current window of data in Operation 1120. During this processing period, all communications placed in the low queue simply wait in the queue, since no agents are initially assigned to the low queue. Once IQUS startup is completed, the low queue is assigned agents and can begin routing communications to agents.

After a sufficiently large data window has been created (e.g., the number of communication records in the window is equal to or greater than a threshold), the basic form channels support module updates the communication value distribution for each non-chaining channel in Operation 1125, and then re-computes the high-low boundary in Operation 1130. These two computations may be needed because the currently active communication value distribution may differ substantially from the reference communication value distribution used previously.

At this point, the basic form channels support module uses the data time window to determine the communication arrival rate for each channel in each of the two queues in Operation 1135. The communication arrival rate for each basic form queue and channel is computed in particular embodiments as the ratio of the number of communications of that channel that arrived in the IQUS and were placed in the selected queue during the chosen data time window over the length of the time window.

Next, the basic form channels support module determines the IQUS agent availability rate for each channel in Operation 1140. Note that in this particular instance, the IQUS agent availability rate for a given channel is based entirely on the high queue in this current setting because all agents for the channel are assigned to the high queue. While in more general settings, the agent availability rate is determined for each queue and channel separately.

In particular embodiments, the agent availability rate per channel is computed as the ratio of the number of communications of that channel that were connected to agents during the data time window over the length of the time window. This approach may be utilized to help avoid the unnecessary and potentially error-prone intermediate steps needed for some alternate approaches, such as collecting more detailed event duration information including the duration of agent connections to communications and the duration of post-connection agent activities that must be completed prior to the agent becoming available to start a new connection. The agent availability rate per channel is then transformed to an average agent availability rate for the channel by dividing it by the number of online agents who handle the channel (not shown in FIG. 11).

At this point, the basic form channels support module selects a non-chaining channel in Operation 1145. The choice of the order of selecting the non-chaining channels is generally not important since each channel is handled independently. Next, the basic form channels support module determines the minimum number of agents that need to be channel-assigned to the high queue to meet its service level requirement in Operation 1150. Here, the basic form channels support module may employ the previously computed high queue communication arrival rate and the single agent average availability rate to determine the needed agents count.

The basic form channels support module then determines if the number of agents assigned to the high queue for the selected channel is large enough to satisfy the high queue service level requirement for that channel in Operation 1155. If the number of agents assigned to the high queue for the selected channel is at least as large as the required minimum number of agents, then the requirement is satisfied, otherwise it is not satisfied. If the requirement is not satisfied, then the basic form channels support module sends a message to the TEF advising the TEF that the basic form cannot be used due to this channel in Operation 1170. The basic form channels support module then creates a return message that the minimal form must be used instead of the basic form in Operation 1175. However, if the high queue requirement for the selected channel is satisfied, then the basic form channels support module determines the minimum number of agents needed to obtain the service level goal for the low queue for the selected channel in Operation 1160.

At this point, the basic form channels support module determines whether there is another non-chaining channel for the treatment in Operation 1165. If so, then the basic form channels support module returns to Operation 1145, selects the next non-chaining channel, and repeats the process for the newly selected non-chaining channel. This process of selecting and processing a next non-chaining channel continues until a channel is encountered whose service level requirement for the high queue is not satisfied or until all the non-chaining channels have been processed. At that point, the basic form channels support module completes.

IQUS Agent Mapping Module

Turning now to FIG. 12, additional details are provided regarding a process flow for mapping the treatment agents for each non-chaining channel who handle that channel to communication value intervals based on the agents' rankings for that channel according to various embodiments of the invention. In particular, FIG. 12 is a flow diagram showing an IQUS agent mapping module for performing such functionality according to various embodiments of the invention. For example, the flow diagram shown in FIG. 12 may correspond to operations carried out by one or more processors in one or more components, such as, for example, the communications handler 150 described above, as it executes the IQUS agent mapping module stored in the component's volatile and/or nonvolatile memory.

As already mentioned, the IQUS agent mapping module may be invoked by the IQUS startup module in various embodiments to assign per non-chaining channel the agents who handle non-chaining communications for an IQUS queue of a treatment to communication intervals for the different non-chaining channels. However, the IQUS agent mapping module in other embodiments may not be invoked by the IQUS startup module, but may instead be invoked by a different module or independently as a stand-alone module.

The IQUS agent mapping module begins the process in various embodiments by selecting a non-chaining channel utilized by an IQUS queue of the treatment in Operation 1210. Here, depending on the embodiment, the IQUS agent mapping module may retrieve information identifying the non-chaining channels utilized by the queue of the treatment or the IQUS startup module may provide the IQUS agent mapping module with such information.

At this point, the IQUS agent mapping module selects the agents who are online and fielding communications for the queue of the treatment and are utilizing the selected non-chaining channel in Operation 1215. In turn, the IQUS agent mapping module splits the range of the channel's communication value distribution for the queue into intervals in Operation 1220 based on the communication values found in the value distribution for the communications utilizing the queue and the selected non-chaining channel. Note that in particular embodiments, the IQUS agent mapping module splits the channel's communication value distribution for the queue into intervals in which each of the intervals is approximately the same percentage of total communication volume for the channel and queue.

Once the value distribution has been split into ranges, the IQUS agent mapping module assigns the agents who are online and handling the selected channel for the queue of the treatment to the range intervals in Operation 1225. Specifically, the IQUS agent mapping module performs this operation in particular embodiments by associating the highest ranking agent for the selected channel and queue to the highest value range interval, associating the next highest ranking agent for the selected channel and queue to the next highest value range interval, and so forth.

Upon completion of Operation 1225, the IQUS agent mapping module determines whether the queue of the treatment is handling another non-chaining channel in Operation 1230. If so, then the IQUS agent mapping module returns to Operation 1210 and selects the next non-chaining channel. However, if the IQUS agent mapping module determines the queue of the treatment is not handling any additional chaining channels, then the process ends.

At this point, each agent who is handling a particular non-chaining channel for an IQUS queue of a treatment has been assigned to a value interval for the particular non-chaining channel of the queue. Therefore, as discussed in further detail herein, when a non-chaining communication is assigned to that queue of the treatment and reaches the top of the queue, that communication is connected to a particular agent to handle based on the value of the non-chaining communication and the value range of the interval the agent has been assigned to.

TEF Communication Arrival Module

Figure 13:
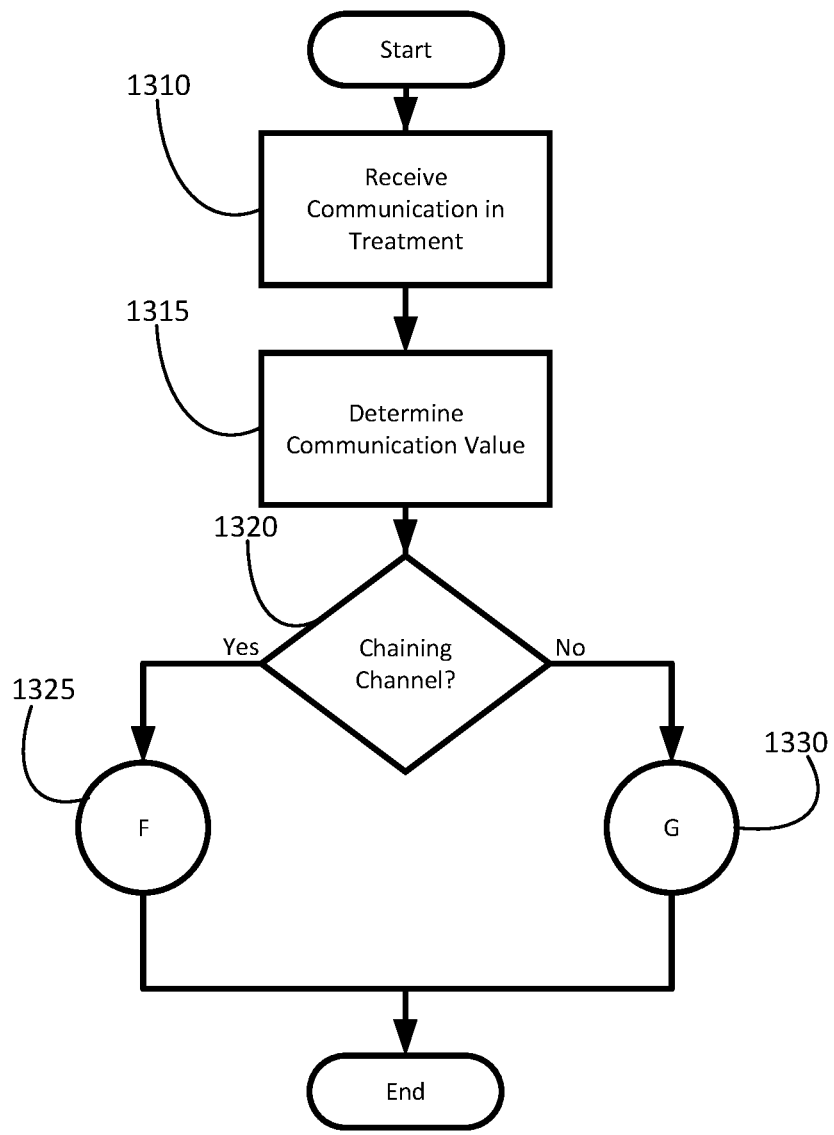
FIG. 13 illustrates a process flow for handling a communication that is received by a contact center and routed to a treatment in accordance with various embodiments of the present invention.

Turning now to FIG. 13, additional details are provided regarding a process flow for the TEF handling a communication that is received by a contact center and routed to a treatment according to various embodiments of the invention. A "received" communication is understood to be an inbound communication received by the contact center from a remote party or an outbound communication sent by the contact center to a remote party which requires agent handling. In particular, FIG. 13 is a flow diagram showing a TEF communication arrival module for performing such functionality according to various embodiments of the invention. For example, the flow diagram shown in FIG. 13 may correspond to operations carried out by one or more processors in one or more components, such as, for example, the communications handler 150 described above, as it executes the TEF communication arrival module stored in the component's volatile and/or nonvolatile memory.

The process shown in FIG. 13 begins with the TEF communication handling module receiving a communication routed to its treatment by the communication center in Operation 1310. In various embodiments, this operation entails the TEF communication arrival module being made aware of a communication that the contact center has received that needs to be routed to an agent of the treatment. For example, the received communication may be an outbound call placed by the contact center to a remote party who has answered the call. While in another instance, the received communication may be an inbound text message received by the contact center that needs to be replied to by an agent.

Once the TEF communication arrival module has received a communication, the module determines a value for the communication in Operation 1315. Again, depending on the embodiment, the TEF communication arrival module may make use of some algorithm and/or model that may be specific for the treatment in calculating a value for the communication.

Figure 14:
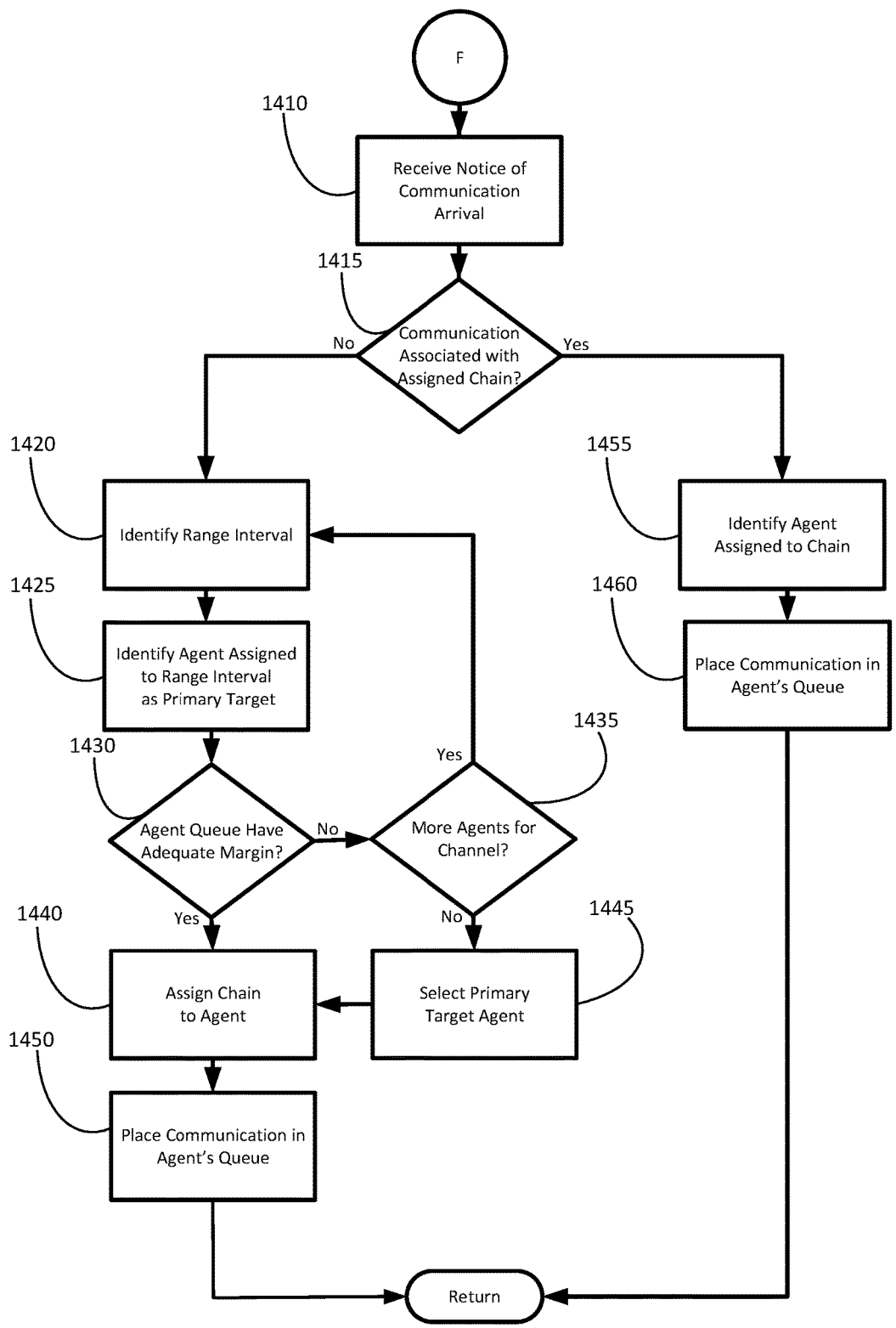
FIG. 14 illustrates a process flow for handling the arrival of a chaining communication for a treatment in accordance with various embodiments of the present invention.

At this point, the TEF communication arrival module determines whether the communication is using a chaining channel in Operation 1320. If the TEF communication handling module determines the communication is using a chaining channel, then the TEF communication arrival module assigns the communication to a chaining queue for the treatment in Operation 1325. Specifically, in various embodiments, the TEF communication arrival module performs this operation by invoking a SAQS communication arrival module (FIG. 14). As discussed in further detail herein, the SAQS communication arrival module is configured to identify an agent who is handling chaining communications for the treatment and assign the communication to that agent's queue. In some instances, the received communication may be a part of an existing chain of communications between a particular agent and remote party. Therefore, the SAQS communication arrival module assigns the received communication to the agent handling the chain by placing the communication in that agent's queue. While in other instances, the received communication may represent the first communication received for a chain. Therefore, the SAQS communication arrival module assigns the communication to an agent by beginning a new chain for the agent and the remote party involved in the communication and placing the communication in that agent's queue.

Figure 17:
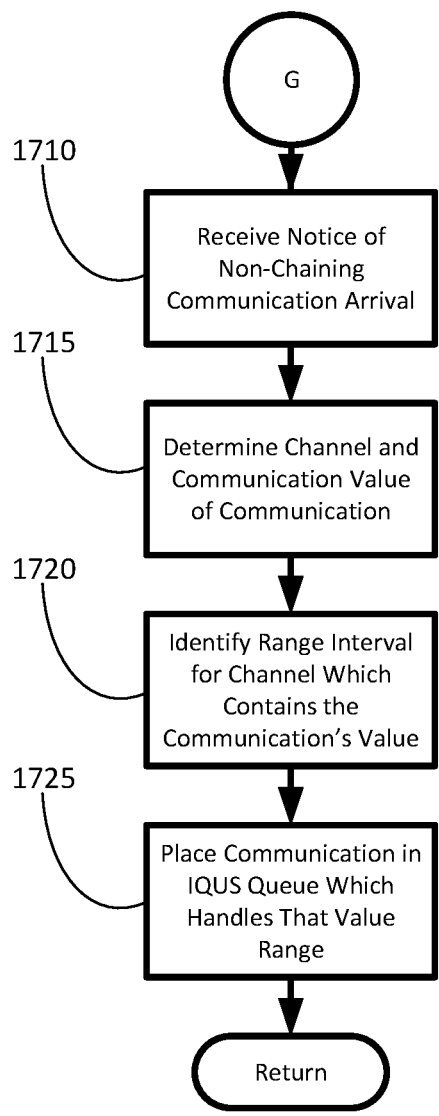
FIG. 17 illustrates a process flow for handling the arrival of a non-chaining communication for a treatment in accordance with various embodiments of the present invention.

However, if the received communication is not making use of a chaining channel, then the TEF communication arrival module assigns the communication to a non-chaining queue for the treatment in Operation 1330. Specifically, in various embodiments, the TEF communication arrival module performs this operation by invoking an IQUS communication arrival module (FIG. 17). As discussed in further detail herein, the IQUS communication arrival module is configured to assign the communication to a non-chaining queue of the selected treatment based on the communication value determined for the communication. Once placed in a queue, the communication stays in the queue until the communication is connected with an agent who is assigned to that queue.

SAQS Communication Arrival Module

Turning now to FIG. 14, additional details are provided regarding a process flow for handling the arrival of a chaining communication for a particular treatment according to various embodiments of the invention. In particular, FIG. 14 is a flow diagram showing a SAQS communication arrival module for performing such functionality according to various embodiments of the invention. For example, the flow diagram shown in FIG. 14 may correspond to operations carried out by one or more processors in one or more components, such as, for example, the communications handler 150 described above, as it executes the SAQS communication arrival module stored in the component's volatile and/or nonvolatile memory.

As already mentioned, the SAQS communication arrival module may be invoked by the TEF communication arrival module in various embodiments to assign a chaining communication to an agent's queue. However, the SAQS communication arrival module in other embodiments may not be invoked by the TEF communication arrival module, but may instead be invoked by a different module or independently as a stand-alone module.

The process begins in FIG. 14 with the SAQS communication arrival module receiving a notice of the chaining communication in Operation 1410. For instance, in particular embodiments, the notice of the chaining communication may be provided by the TEF communication arrival module upon the TEF communication arrival module determining the communication involves a chaining channel.

Next, the SAQS communication arrival module determines whether the communication is a part of an existing chain that has already been assigned to an agent in Operation 1415. For instance, in particular embodiments, the SAQS communication arrival module may consider information associated with the communication such as the address associated with the source of the communication and/or the address associated with the target of the communication. The SAQS communication arrival module may then use this information to query the existing chains that are currently active. If a match is found for an existing chain that is currently active, then the SAQS communication arrival module identifies the agent assigned to the existing chain in Operation 1455 and places the communication in the agent's queue in Operation 1460.

However, if a match is not found for an existing chain that is currently active, then the SAQS communication arrival module identifies a range interval for the communication in Operation 1420. That is to say, the SAQS communication arrival module determines which communication value range interval contains the communication value of the unassigned communication. At this point, the SAQS communication arrival module identifies the agent assigned to the range interval as the primary target in Operation 1425. The identified agent is the ideal agent to handle the communication based on the agent's ranking and the value assigned to the communication.

Once the primary target agent has been identified, the SAQS communication arrival module determines whether the primary target agent's queue has adequate margin in meeting its service level requirement and, based on the current depth of the queue, is projected to continue having adequate margin in the near future in Operation 1430. For example, the primary target agent's queue does not currently have a number of communications in his queue above a threshold value. If the primary target agent's queue does have adequate margin, then the SAQS communication arrival module assigns the communication and corresponding chain to the agent in Operation 1440 and places the communication in the primary target agent's queue in Operation 1450.

However, if the primary target agent's queue does not have adequate margin, then the SAQS communication arrival module determines whether more agents are available who handle the channel of the communication for the selected treatment in Operation 1435. If so, then the SAQS communication arrival module returns to Operation 1420 and identifies a new range interval for the communication. For instance, in particular embodiments, the SAQS communication arrival module identifies a range interval that is the next closest to the range interval of the primary target as the new range interval. The SAQS communication arrival module then repeats the operations described above in determining whether the new range interval's single agent queue has adequate margin and if so, then the communication and corresponding chain are assigned to the agent. However, if no more agents are available who handle the channel of communication for the selected treatment, then the SAQS communication arrival module selects the primary target agent in Operation 1445 and places the communication in the primary target agent's queue. At this point the SAQS communication arrival module completes.

SAQS Communication Connect Module

Generally speaking, a communication of a specific chaining channel in an agent's queue is connected to the agent when the communication has the highest priority in that queue and the agent is currently eligible to accept a new communication of that specific channel. The agent's eligibility is determined based on the set of communications currently being handled concurrently by the agent, together with the agent's virtualization discipline.

Figure 15:
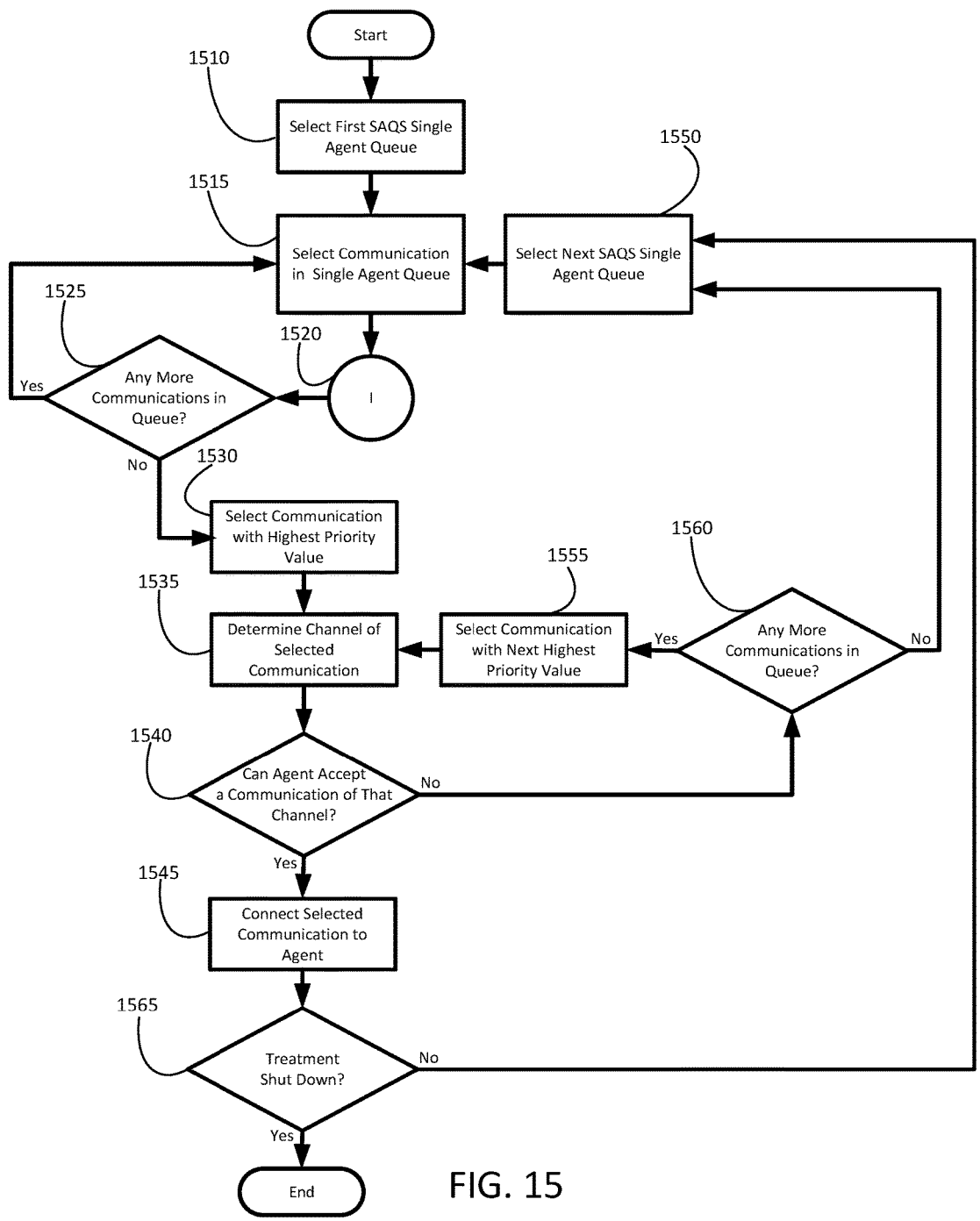
FIG. 15 illustrates a process flow for connecting a chaining communication in an agent's queue to the agent in accordance with various embodiments of the present invention.

Turning now to FIG. 15, additional details are provided regarding a process flow for connecting a chaining communication in an agent's queue to the agent according to various embodiments of the invention. In particular, FIG. 15 is a flow diagram showing a SAQS communication connect module for performing such functionality according to various embodiments of the invention. For example, the flow diagram shown in FIG. 15 may correspond to operations carried out by one or more processors in one or more components, such as, for example, the communications handler 150 described above, as it executes the SAQS communication connect module stored in the component's volatile and/or nonvolatile memory.

The SAQS communication connect module, in particular embodiments, is executed to cycle continuously through the entire set of currently active SAQS single agent queues and connect communications to agents for each in turn. The SAQS communication connect module is started by the TEF or the SAQS after the SAQS single agent queues are set up during startup of a treatment, after which the SAQS communication connect module executes continuously until the treatment is shut down. This approach ensures that each SAQS agent handles as many communications as their virtualization discipline permits at all times and also ensures that all communications placed in one of the SAQS queues are connected to that queue's agent as quickly as possible.

In this instance, when the SAQS communication connect module is started by the SAQS, the process begins with the SAQS communication connect module selecting a first SAQS single agent queue in Operation 1510. Depending on the embodiment, the SAQS single agent queues can be selected in any chosen order, provided that order includes all the SAQS single agent queues, and provided that order is used persistently and only adjusted when one of the SAQS single agent queues is shut down or is started up.

Next the SAQS communication connect module selects a chaining communication in the chosen single agent queue in Operation 1515. The SAQS communication connect module then invokes a normalize module (FIG. 16) in particular embodiments that is configured to normalize the priority value for the selected chaining communication in Operation 1520. In turn, the normalize module returns the normalized priority value for the communication to the SAQS communication connect module. More detail is provided herein on the normalize module and why normalization is needed. In particular embodiments, the normalized priority value is saved for use in later comparisons to other normalized priority values (not shown in FIG. 15).

Next, the SAQS communication connect module determines if there are any remaining chaining communications in the queue in Operation 1525. If one or more communications still remain, then a new chaining communication is selected in Operation 1515 and the process applied to the previous communication is repeated. If no additional communications are available in the queue, then the SAQS communication connect module choses the communication in the queue which has the highest priority value in Operation 1530. The SAQS communication connect module then determines the channel of the chosen communication in Operation 1535 and tests to see if an agent is currently eligible to accept a communication of that channel in Operation 1540. In particular embodiments, the agent's current eligibility for a communication of that channel is determined based on the set of communications currently being handled by the agent and the virtualization discipline of the agent.

If the agent can accept the communication then the communication is connected to the agent in Operation 1545. The agent may then address the communication in an appropriate manner such as sending a reply to the communication to the remote party involved in the chain of communications. At that point, the SAQS communication connect module determines if the treatment has been shut down in Operation 1565. If not, then the SAQS communication connection module selects the next SAQS single agent queue in Operation 1550 and process applied for the previous queue is applied again to the new queue.

However, if the agent cannot accept the communication, then the SAQS communication connect module determines if there is another communication in the current queue in Operation 1560. If there are one or more communications in the queue whose eligibility to connect to the agent has not been determined, then the SAQS communication connect module selects the communication out of that set of communications with the next highest priority in Operation 1555. Then the process applied to the initially selected communication is repeated for the current communication.

For this particular process flow, the overall process for the current single agent queue in various embodiments terminates with either the connection of a communication to the agent (Operation 1545) or the completion of consideration of all the communications in the queue (Operation 1560) for the agent. After the current queue is dealt with, the SAQS communication connect module moves on to the next SAQS single agent queue (Operation 1550) and applies the queue process again. Accordingly, in various embodiments, the SAQS communication connect module cycles through the SAQS single agent queues in this manner until the treatment is shut down.

Normalize Module

Figure 16:
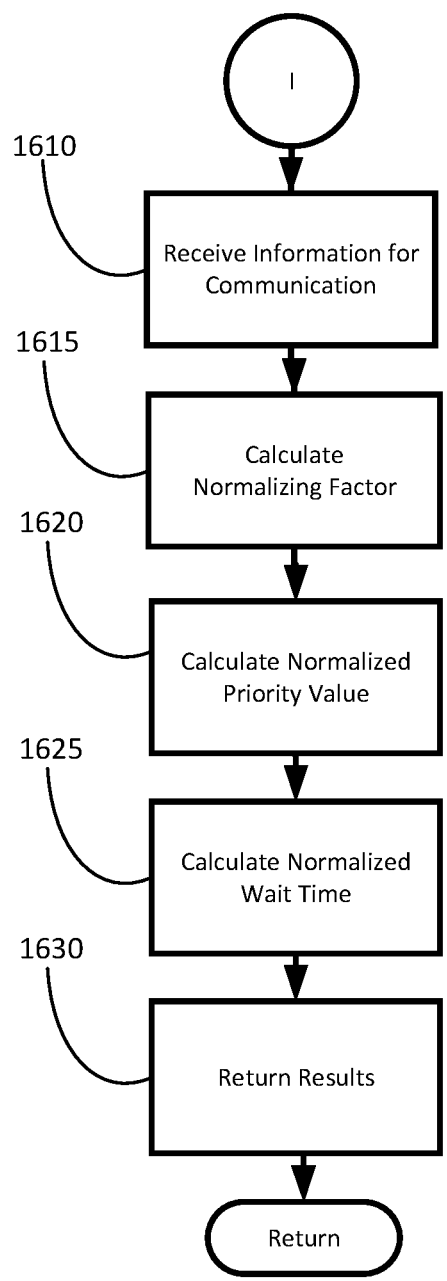
FIG. 16 illustrates a process flow for normalizing a priority value and/or wait time for a communication in accordance with various embodiments of the present invention.

Turning now to FIG. 16, additional details are provided regarding a process flow for normalizing a priority value and/or wait time for a communication according to various embodiments of the invention. In particular, FIG. 16 is a flow diagram showing a normalize module for performing such functionality according to various embodiments of the invention. For example, the flow diagram shown in FIG. 16 may correspond to operations carried out by one or more processors in one or more components, such as, for example, the communications handler 150 described above, as it executes the normalize module stored in the component's volatile and/or nonvolatile memory.

As previously mentioned, the normalize module may be invoked by the SAQS communication connect module in various embodiments to provide a normalized priority value for a communication. However, the normalize module in other embodiments may not be invoked by the SAQS communication connect module, but may instead be invoked by a different module or independently as a stand-alone module and/or to normalize a different parameter besides a priority value, such as wait time.

For instance, when a given agent handles two or more chaining channels then a conflict can arise in meeting service level requirements for that agent's queue if different service level requirements are used for different chaining channels. For example, consider the queue of an agent who handles both SMS and MMS chains. The average agent handling time for SMS is relatively short, such as 45 seconds for example. While due to the more substantial content capability of MMS, its average agent handling time may be more like 120 seconds. If the criterion is applied of setting the average wait time upper limit to be 25% of average handling time, then the SMS and MMS service level requirements are set that the average wait time should not exceed 11.25 seconds and 30 seconds respectfully. Using a criterion such as 25% is reasonable for chaining communications because there is not an external party waiting to be connected to an agent while that type of communication is waiting in a queue. Only some forms of service level requirements employ an average wait time upper limit, but average wait time is chosen as a convenient example and because average wait time is used as the criterion for normalizing service level requirements for all forms of service level requirements.

Therefore, since the service level requirement (average wait time upper limit requirement) set for SMS is more stringent than the service level requirement set for MMS, then the service level requirement set for MMS is a factor F times the service level requirement set for SMS. Here, the SMS channel is considered the reference channel. Thus, the factor F needed to normalize the MMS requirement to the same scale as the SMS requirement is determined to be 2.667 (30/11.25). The different between the service level requirements set for the two channels is adjusted for by applying 1/F to the MMS service level requirement.

Similarly, the difference between the priority values calculated for the two channels is adjusted by applying 1/F to the priority value of each MMS communication, that is, replacing the standard priority value of [communication value] *[wait time] with [communication value] *[wait time]/F for each MMS communication. Since SMS is the reference channel, the priority values of the communications using this channel are not modified. Applying this adjustment causes the communications using the MMS channel to move through the queue more slowly on average than the communications using the SMS channel, thus allowing both channel's service level requirements to be correctly handled. The same adjustment can be applied to the wait times of communications of a queue using different channels, with separate adjustment factors used for each channel, in instances where the overall performance of the queue is being evaluated.

Any preferred channel may be chosen as the reference channel depending on the embodiment, such as the channel with the most stringent requirement (e.g., the lowest wait time threshold) or the channel with the largest percentage of communications for the queue. The standard definition of priority value is to be used for the communications of the reference channel. A separate adjustment of priority value is made for all the other channels. Such an adjustment allows support of the service level requirements of all the channels in various embodiments by focusing on a single requirement, such as the channel with the most stringent service level requirement.

Thus, turning now to FIG. 16, the process begins with the normalize module receiving information on the communication in Operation 1610. Depending on the embodiment, the normalize module may receive the information as provided by a module (e.g., the SAQS communication connect module) that has invoked the normalize module or the normalize module may retrieve the information on the communication from some type of storage media.

Here, the information may include the service level requirement set for the reference channel along with the service level requirement, channel, communication value, and current value of wait time (length of time the communication has waited in the queue) for the communication. Therefore, in Operation 1615, the normalize module calculates the normalizing factor that is applicable to the communication. For instance, returning to the example above, the service level requirement for SMS and MMS is 11.25 and 30 seconds respectfully. The communication is a MMS message and the SMS channel is the reference channel. Therefore, the normalize module calculates the normalizing factor to be 2.667 by dividing the service level requirement for MMS by the service level requirement for SMS (i.e., 30/11.25).

Next, the normalize module calculates the normalized priority value for the communication in Operation 1620. In some embodiments, the original priority value is calculated as [communication value]*[wait time], and the normalized priority value is calculated as [original priority value]/[adjustment factor F]. Since communication value is normally required to be a positive number in particular embodiments, the wait time is always a non-negative number, and the adjustment factor is always a positive number, these calculations always produce a non-negative numeric outcome.

The priority values for communications are used in various embodiments in determining which communication in an agent's queue should be connected to the agent next. Ideally, the communication with the highest priority value should be the next communication connected to the agent. However, in some instances, the agent may not have the capacity necessary to handle a new communication whose channel is that of the highest priority communication at the present moment. For example, the agent may be currently handling a first MMS message and the communication with the highest normalized priority value may be another MMS message. Here, the agent's virtualization discipline may only allow the agent to be connected to one MMS message at any given time. Therefore, although the MMS message has the highest priority value, the MMS message cannot currently be connected to the agent because to do so would violate the agent's virtualization discipline.

Once the normalize module has calculated the normalized priority value for the communication, the normalize module then calculates a normalized wait time in Operation 1625. Again, in particular embodiments, the normalize module makes use of the normalizing factor in calculating the normalized wait time for the communication. Once the normalized priority value and the normalized wait time are calculated for the communication, the normalize module returns the calculated results in Operation 1630. For instance, in particular embodiments, the normalize module returns the results to the SAQS communication connect module.

IQUS Communication Arrival Module

FIG. 17 provides additional details regarding a process flow for handling the arrival of a non-chaining communication for a particular treatment according to various embodiments of the invention. In particular, FIG. 17 is a flow diagram showing an IQUS communication arrival module for performing such functionality according to various embodiments of the invention. For example, the flow diagram shown in FIG. 17 may correspond to operations carried out by one or more processors in one or more components, such as, for example, the communications handler 150 described above, as it executes the IQUS communication arrival module stored in the component's volatile and/or nonvolatile memory.

As already mentioned, the IQUS communication arrival module may be invoked by the TEF communication arrival module in various embodiments to assign a non-chaining communication to a queue of a treatment. However, the IQUS communication arrival module in other embodiments may not be invoked by the TEF communication arrival module, but may instead be invoked by a different module or independently as a stand-alone module.

The process begins in FIG. 17 with the IQUS communication arrival module receiving a notice of the non-chaining communication in Operation 1710. For instance, in particular embodiments, the notice of the non-chaining communication may be provided by the TEF communication arrival module upon the TEF communication arrival module determining the communication involves a non-chaining channel.

Next, the IQUS communication arrival module determines the communication value and the channel of the non-chaining communication in Operation 1715. This information is needed to determine the IQUS queue where the communication should be placed. As the reader may recall, a treatment used for non-chaining channels may contain one or more queues that are serviced by a group of agents assigned to the treatment. Accordingly, for each of the channels these queues are associated with communication value intervals that are sequentially separated based on a sequence of communication value thresholds. For example, a treatment may include a first queue and a second queue that supports a non-chaining channel such as telephone calls. Here, the two queues may be separated by a boundary defined as a threshold value of 500. Therefore, in this example, telephone calls assigned to the treatment and having a value less than 500 are placed in the first (lower) queue and telephone calls assigned to the treatment having a value greater than or equal to 500 are placed in the second (higher) queue. Accordingly, the IQUS communication arrival module determines placement of the communication in the appropriate queue of the treatment based on the value of the communication and its channel.

At this point, the IQUS communication arrival module determines which of the communication value range intervals of the channel contains the communication's value in Operation 1720. In some embodiments, each non-chaining channel has a separate communication value distribution, and potentially a different number of channel-assigned agents than other non-chaining channels. The range of the communication value distribution of a channel is divided into intervals and each channel-assigned agent is associated with one of those intervals, as further detailed herein in the IQUS agent mapping module (FIG. 12).

Next the IQUS communication arrival module selects the IQUS queue assigned to handle non-chaining communications in the identified range interval and places the communication in that queue in Operation 1735. At this point, the IQUS communication arrival module ends the process.

IQUS Communication Connect Module

Similar to communications using a chaining channel, a communication of a specific non-chaining channel in a queue of a treatment is connected to an agent when the communication has the highest priority in that queue and there is an agent that is channel-assigned to that queue and is currently eligible to accept a new communication of that specific channel. The agent's eligibility is determined based on the set of communications currently being handled concurrently by the agent, together with the agent's virtualization discipline.

Figure 18:
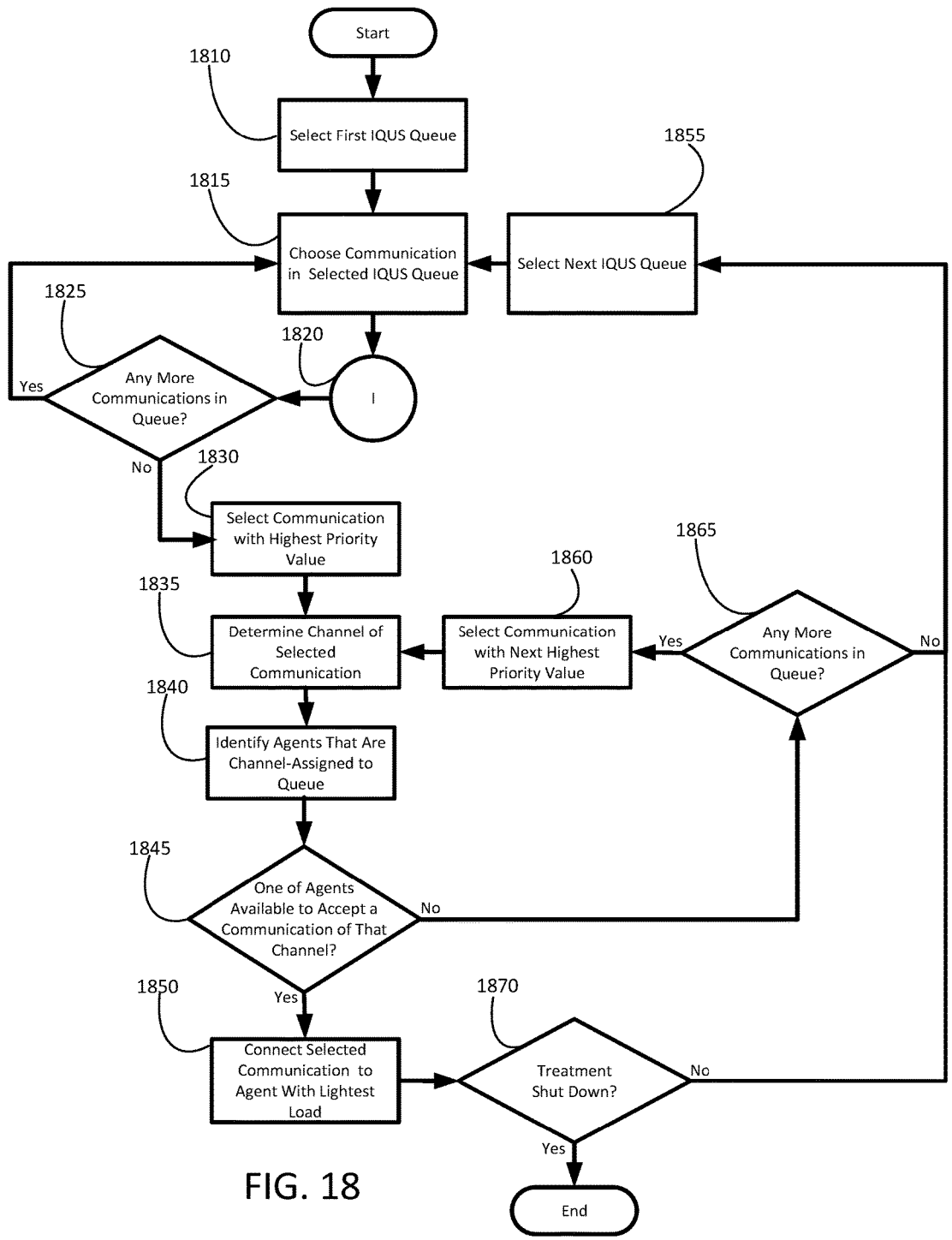
FIG. 18 illustrates a process flow for connecting a non-chaining communication in a queue of a treatment to an agent in accordance with various embodiments of the present invention.

Turning now to FIG. 18, additional details are provided regarding a process flow for connecting a non-chaining communication in a queue of a treatment to an agent according to various embodiments of the invention. In particular, FIG. 18 is a flow diagram showing an IQUS communication connect module for performing such functionality according to various embodiments of the invention. For example, the flow diagram shown in FIG. 18 may correspond to operations carried out by one or more processors in one or more components, such as, for example, the communications handler 150 described above, as it executes the IQUS communication connect module stored in the component's volatile and/or nonvolatile memory.

The IQUS communication connect module, in particular embodiments, is executed to cycle continuously through the entire currently active set of IQUS queues and connect communications to agents for each in turn. The IQUS communication connect module is started by the TEF or the IQUS after the IQUS queues are set up during startup of a treatment, after which the IQUS communication connect module executes continuously until the treatment is shut down. This approach ensures that each IQUS queue agent handles as many communications as their virtualization discipline permits at all times and also ensures that all communications placed in one of the IQUS queues are connected to one of the IQUS agents channel-assigned to that queue as quickly as possible.

When the IQUS communication connect module is started by the IQUS, the process begins with the IQUS communication connect module selecting a first IQUS queue in Operation 1810. Depending on the embodiment, the IQUS queues can be selected in any chosen order, provided that order includes all the IQUS queues, and provided that order is used persistently and only adjusted when the set of IQUS queues is changed by increasing or decreasing the number of IQUS queues.

The next part of the process flow involves determining which of the communications in the queue has the highest priority value. Thus, the process continues with the IQUS communication connect module selecting a communication from the queue in Operation 1815. The order in which the communications are selected is immaterial as long as each of the communications is eventually selected, since the priority value of each will be determined before the next part of the process begins.

Next, the IQUS communication connect module computes and normalizes the priority value for the selected communication in Operation 1820. Similar to the SAQS communication connect module, the IQUS communication connect module in particular embodiments invokes the normalize module (FIG. 16) to obtain the normalized priority value for the communication. The IQUS communication connect module saves the normalized priority value for use in the next phase of the process once the value has been obtained (not shown in FIG. 18).

The IQUS communication connect module then determines whether another communication is in the queue in Operation 1825. If so, then the IQUS communication module returns to Operation 1815 and selects the next communication from the queue so that the priority value for the selected communication can be normalized. Accordingly, the IQUS communication connect module repeats the above operations until a normalized priority value has been obtained for each communication in the queue.

Once all the priority values for the communications in the queue have been normalized, the IQUS communication connect module selects a communication to connect to an agent based on its priority value in Operation 1830. That is to say, the IQUS communication connect module in particular embodiments selects the communication with the highest priority value. Then the IQUS communication connect module determines the channel of the selected communication in Operation 1835.

Next, the IQUS communication connect module determines which agents are assigned to the queue for the channel of the communication in Operation 1840. As the reader may recall, the agents in the queue are ranked in various embodiments with respect to each of the non-chaining channels handled by the queue and then assigned to communication value range intervals for each channel based on the agents' rankings for the channel. The IQUS communication connect module identifies the agents which have been assigned to the queue based on prior use of the IQUS agent mapping module to channel-assign agents to the range intervals and their corresponding IQUS queues.

The IQUS communication connect module then determines if any of the agents channel-assigned to the queue are available to accept a communication of that channel Operation 1845. This is determined by review of the set of communications currently being handled by an agent and comparing that to the agent's virtualization discipline. If there is an agent available then the IQUS communication connect module connects the communication to the agent who is currently handling the lightest load of communications in Operation 1850. The IQUS communication connect module then determines whether the treatment has been shut down in Operation 1870. If so, then the IQUS communication connect module ends the process. However, if the treatment has not been shut down, then this completes consideration of this queue for now, and the IQUS communication connect module selects the next IQUS queue in Operation 1855.

Returning to Operation 1845, if the determination is no such agent is available to handle the communication, then the IQUS communication connect module determines if there are any additional communications in the queue in Operation 1865. If there is one or more additional communications in the queue that have not been considered, then the communication with the next highest priority is selected out of the remaining set of communications in Operation 1860 and the process to attempt to connect the newly selected communication to an agent is repeated starting with Operation 1835. However, if there are no remaining communications in the queue then this completes consideration of this queue for now, and the IQUS communication connect module selects the next IQUS queue in Operation 1855.

The IQUS communication connect module continues with the treatment to select a next IQUS queue and attempt to connect a communication of that queue to an agent. Upon startup of the IQUS communication connect module and once the module finishes considering all of the IQUS queues, the module starts again at the top of the selected order of the IQUS queues and repeats consideration of each IQUS queue in turn, repeating this cycle until the treatment is shut down.

TEF Overload Module

As previously discussed, the TCOS executive function (TEF) in various embodiments has oversight of the SAQS and IQUS, and makes use of certain techniques to reduce or eliminate local bottlenecks. Typically, the main control functions for managing all the treatment queues reside in the SAQS and IQUS and the TEF normally allows these two systems to operation independently, and considers making limited adjustments when it receives error messages (e.g., overload messages) from the SAQS and IQUS. The TEF in various embodiments also serves as the interface between a treatment and the contact center. When a stressing situation (overload condition) arises that strongly affects the effectiveness of the SAQS or IQUS, then the TEF may apply limited measures to correct the situation by making adjustments within the treatment. In addition, when a stressing situation arises that strongly affects the effectiveness of the entire treatment, then the TEF may send a request to the management of the contact center for temporary loan of agents who handle the channels of the treatment.

In particular embodiments, how the TEF responds to overload conditions depends in part on the relative priorities of the channels. These priorities may be defined when the treatment is created. For example, if a telephone call channel has a higher priority than a SMS channel, then any resource usage conflicts between the two channels will favor the telephone call channel.

Various embodiments of the invention employ levels of overload severity. With respect to overload, the IQUS can be thought of as equivalent to a single queue, with several agents in the virtual agent pool for each of the non-chaining channels of the treatment. The SAQS has multiple single agent queues that may experience overload independently. Accordingly, the TEF has a separate response for each type of overload.

For a single queue the overload levels are: (Q1) one or more channels handled by the queue do not meet their service level requirements, but the queue passes its test of overall service level performance; and (Q2) the queue fails its test of overall service level performance. Note that there is no distinction between (Q1) and (Q2) for a queue that only handles a single channel. Since the IQUS can be considered a single queue when considering overload, (Q1) and (Q2) cover all overload scenarios for the IQUS. In addition, in particular embodiments, the IQUS never reports an overload to the TEF unless it has already reduced its deployed configuration to either its basic form, involving two queues, or it minimal form, involving one queue.

As for the SAQS, like the IQUS, the SAQS can experience (Q1) or (Q2). Here, the likelihood of the SAQS queues experiencing these overload levels is typically higher than for the IQUS queues since each SAQS queue has only a single agent and each IQUS queue has a pool of agents. In addition, the SAQS has additional levels of overload severity that include: (S1) one or more SAQS queues fail their test of overall service level performance, but the majority of the SAQS queues pass; (S2) the majority of SAQS queues fail their test of overall service level performance, but one or more SAQS queues pass; and (S3) all of the SAQS queues fail their test of overall service level performance.

Finally, there are also levels of severity for the total treatment. Some examples of the levels include these combinations: (T1)=(Q1) for IQUS and (S1) for SAQS; (T2)=(Q2) for IQUS and (S1) for SAQS; (T3)=(Q1) for IQUS and (S2) for SAQS; (T4)=(Q1) for IQUS and (S2) for SAQS; (T5)=(Q1) for IQUS and (S3) for SAQS; and (T6)=(Q2) for IQUS and (S3) for SAQS.

Depending on the embodiment, a variety of responses can be made to address an overload condition based on their nature and severity. For instance, the TEF may request temporary loan of agent resources from the contact center management. However, this request is only made in particular embodiments when a total treatment overload occurs, severity level (T6). Normally, the TEF make changes within the treatment to alleviate or lessen the overload conditions.

Figure 19:
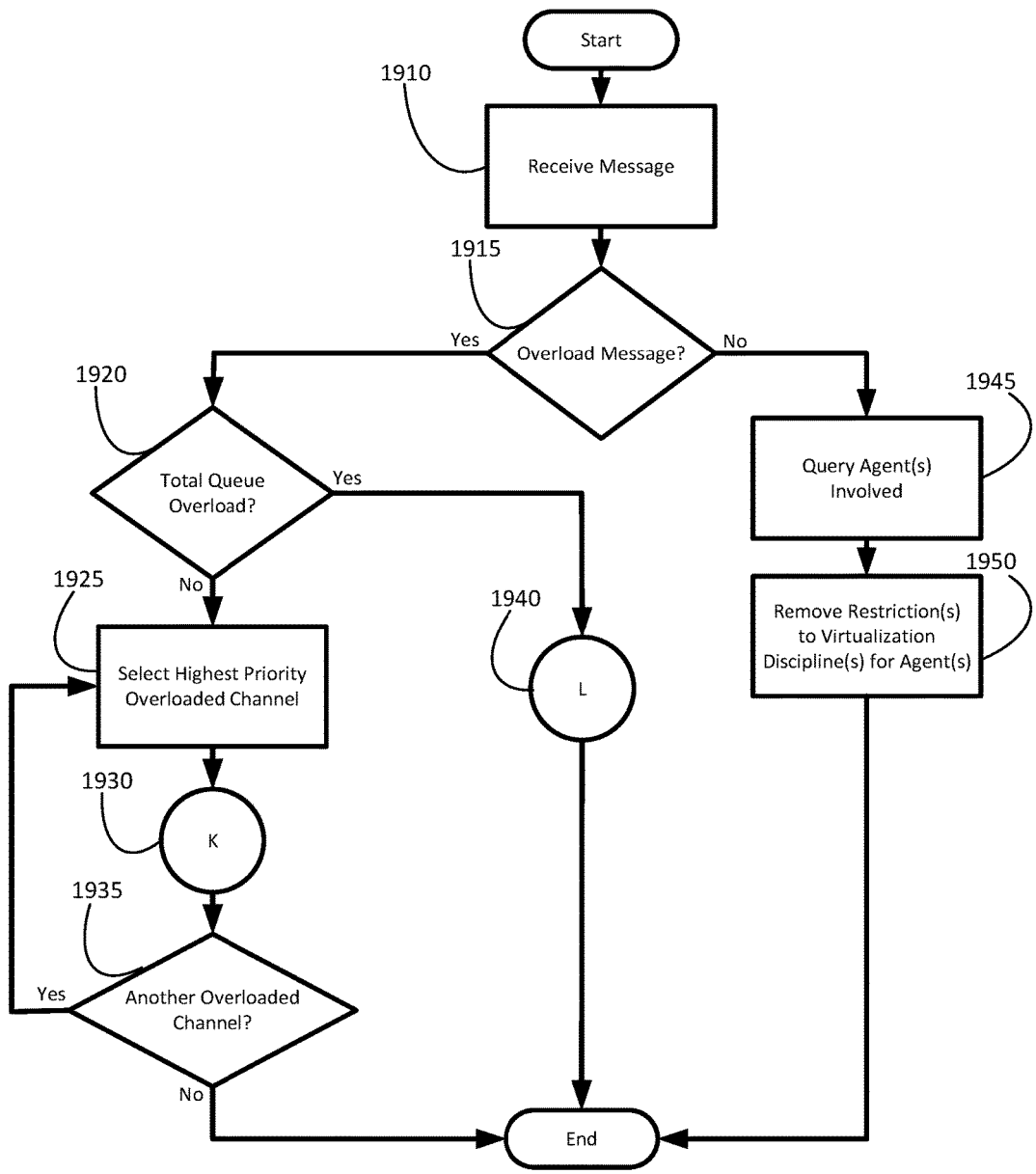
FIG. 19 illustrates a process flow for handling an overload message received from the IQUS or the Single Agent Queues Subsystem ("SAQS") for a treatment in accordance with various embodiments of the present invention.

Turning now to FIG. 19, additional details are provided regarding a process flow for the TEF handling an overload message received from the IQUS or SAQS according to various embodiments of the invention. In particular, FIG. 19 is a flow diagram showing a TEF overload module for performing such functionality according to various embodiments of the invention. For example, the flow diagram shown in FIG. 19 may correspond to operations carried out by one or more processors in one or more components, such as, for example, the communications handler 150 described above, as it executes the TEF overload module stored in the component's volatile and/or nonvolatile memory.

In various embodiments, the IQUS and SAQS send the TEF various messages when an overload condition occurs. Accordingly, the process begins with the TEF overload module receiving a message from the IQUS or SAQS in Operation 1910. Here, the message may indicate different information depending on the embodiment. For instance, in particular embodiments, the IQUS and SAQS may be configured to send messages to the TEF when an overload condition occurs and also when an overload condition has been resolved.

Therefore, the TEF overload module in this particular instance determines whether the received message is reporting the occurrence of an overload condition or the resolution of an overload condition in Operation 1915. If the message is reporting the resolution of an overload condition then the TEF overload module may perform certain operations as a result. For instance, the TEF overload module shown in FIG. 19 first queries the agent(s) who were involve in the overload condition that has been resolved in Operation 1945. The reason for performing this operation in particular embodiments is because the agents who are involved in an overload condition will typically have restrictions placed on their virtualization discipline to attempt to address the overload condition. Therefore, once the condition has been resolved, the agents' virtualization disciplines may be restored. Thus, the TEF overload module removes any restrictions placed on the virtualization disciplines for any of the agents involved in the overload condition that has been resolved in Operation 1950.

However, if instead the message is reporting an overload condition for a queue, then the TEF overload module determines if the overload effects the totality of the queue or an overload of one or more particular channels in Operation 1920. If the overload only involves some particular channels and the total queue is not overloaded, then the TEF overload module selects the highest priority channel handled by the queue that is overloaded in Operation 1925, after which the TEF overload module addresses the overload in particular embodiments by invoking a TEF channel overload module (FIG. 20) in Operation 1930. Here, in these particular embodiments, the TEF channel overload module addresses the overloading of the channel by instituting changes that may involve restricting the virtualization discipline of one or more agents with respect to the channel experiencing overload.

The TEF overload module then determines if there are any additional channels that are experiencing an overload condition for the queue in Operation 1935. If there are any additional channels, then the TEF overload module selects from those the channel of highest priority in Operation 1925 and repeats the process applied for the first channel selected. The process of selecting and addressing the next overloaded channel continues until all the overloaded channels have been process, at which point the TEF overload module ends.

If instead the TEF overload module determines in Operation 1920 that the overload condition involves a total overload of the queue, then the TEF overload module addresses such an overload in particular embodiments by invoking a TEF queue overload module (FIG. 21) in Operation 1940. As discussed in further detail herein, the TEF queue overload module is configured to institute changes with respect to the overloaded queue to attempt to resolve the overload condition. For instance, these changes may involve restricting the virtualization discipline for one or more agents and/or restricting the assignment of new communications to the queue. Following completion of Operation 1940 the TEF overload module ends.

TEF Channel Overload Module

Figure 20:
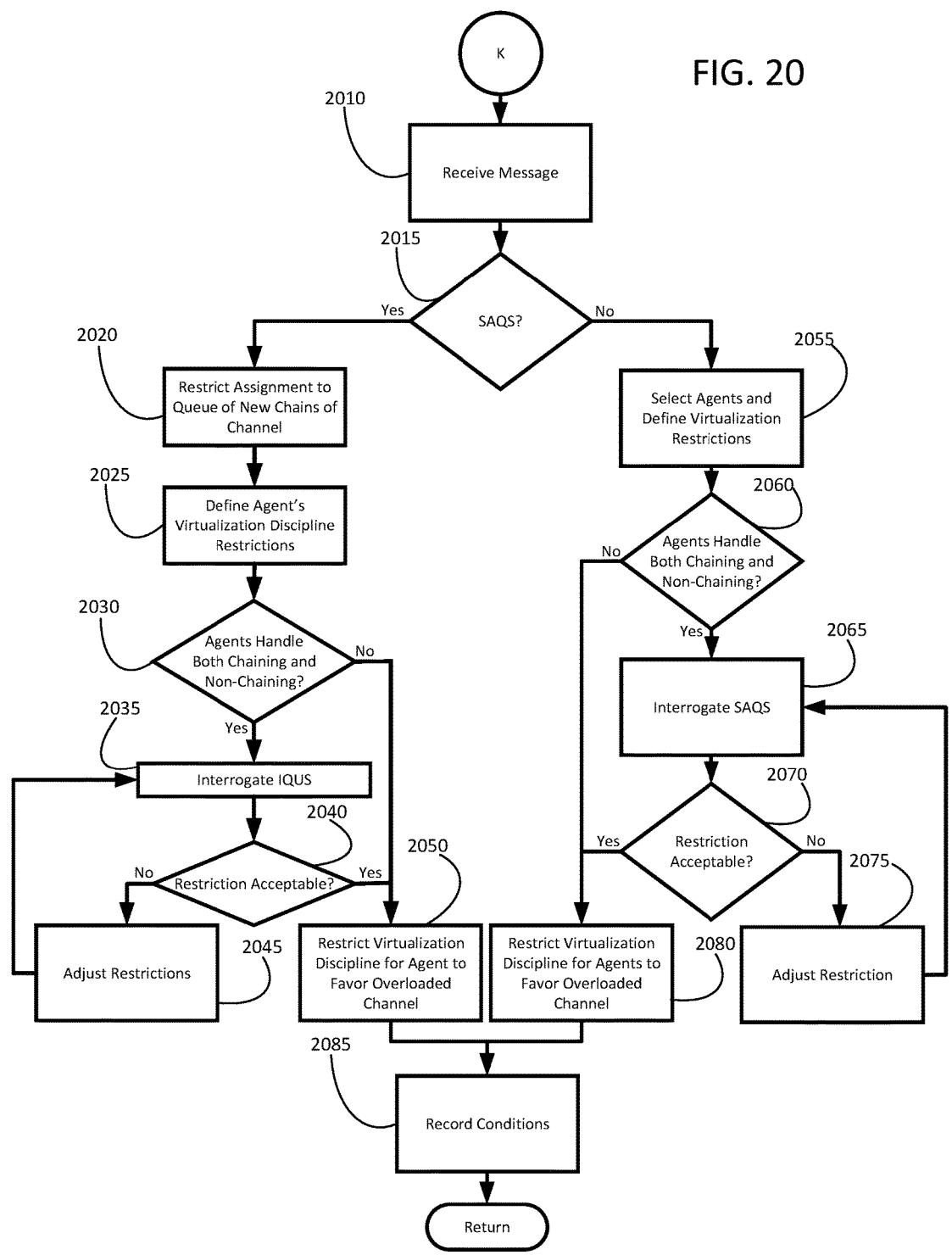
FIG. 20 illustrates a process flow for handling a channel overload for a particular queue of a treatment in accordance with various embodiments of the present invention.

FIG. 20 provides additional details regarding a process flow for the TEF handling a channel overload for a particular queue of a treatment according to various embodiments of the invention. In particular, FIG. 20 is a flow diagram showing a TEF channel overload module for performing such functionality according to various embodiments of the invention. For example, the flow diagram shown in FIG. 20 may correspond to operations carried out by one or more processors in one or more components, such as, for example, the communications handler 150 described above, as it executes the TEF channel overload module stored in the component's volatile and/or nonvolatile memory.

As already mentioned, the TEF channel overload module may be invoked by the TEF overload module in various embodiments to address a channel overload for a particular queue of a treatment. However, the TEF channel overload module in other embodiments may not be invoked by the TEF overload module, but may instead be invoked by a different module or independently as a stand-alone module.

The process begins with the TEF channel overload module receiving a message indicating the channel that is experiencing an overload in Operation 2010. Here, the message may provide different information depending on the embodiment. For instance, the message may identify the channel experiencing the overload and the queue associated with the channel. In addition, the message may indicate whether the queue is part of a SAQS or an IQUS configuration.

Accordingly, the TEF channel overload module determines whether the message involves a SAQS or an IQUS queue in Operation 2015. If the message does involve a SAQS queue, then the TEF channel overload module restricts assigning any new chains to the queue of the channel that is currently experiencing the overload for that SAQS queue to attempt to alleviate the overload of the channel in Operation 2020.

In addition, the TEF channel overload module in various embodiments may consider restricting the agent's virtualization discipline who is associated with the queue to further attempt to alleviate the overload of the channel. Thus, a preferred approach for restricting the agent's virtualization discipline is identified in Operation 2025.

At this point, in particular embodiments, the TEF channel overload module determines whether the agent associated with the queue handles both chaining and non-chaining communications in Operation 2030. Here, depending on the embodiment, the TEF channel overload module may consider the agent's virtualization discipline to determine whether the agent handles both chaining and non-chaining communications and/or the TEF channel overload module may query some type of component within the contact center, such as the communications handler 150, to ascertain whether the agent is currently handling both chaining and non-chaining communications.

If the agent is handling both chaining and non-chaining communications, then the TEF channel overload module interrogates the IQUS in Operation 2035 to determine any possible detrimental impact of restricting the agent's virtualization discipline may have on IQUS performance. For example, an agent may handle two channels, chat and SMS, and the SMS channel has the overload. Assuming the virtualization discipline for the agent allows concurrent handling of two chats and one SMS message, the TEF channel overload module may propose restricting the agent's virtualization discipline to allow the agent to handle no chats and only one SMS message. Although implementing such a restriction on the agent's virtualization discipline may allow the agent to work through his SMS backlog more quickly, the restriction to eliminate the agent's ability to handle chats may have a negative impact on an IQUS queue that the agent has been assigned to for the purpose of handling chats. If the effected IQUS queue is currently operating at a level of just maintaining its service level requirement for chats, then restricting the agent's ability to handle chats for the IQUS queue may have a detrimental effect on the performance of the queue.

Therefore, the TEF channel overload module determines whether the restriction is acceptable to the IQUS in Operation 2040. If not, then the TEF channel overload module adjusts the proposed restriction in Operation 2045 and re-interrogates the IQUS in Operation 2035. However, if the restriction is acceptable, then the TEF channel overload module restricts the virtualization discipline for the agent in Operation 2050. The TEF channel overload module then concludes by recording the conditions of the overloaded channel and action steps taken to elevate the overload in Operation 2085. In particular embodiments, this information may be utilized once the overload condition has been removed so that the agent's virtualization discipline can be restored to its original configuration.

Returning to Operation 2015, if instead the TEF channel overload module determines the received message is not for a SAQS queue, but is for an IQUS queue, then the TEF channel overload module selects one or more agents who have been assigned to the queue for the overloaded channel and defines potential restrictions of their virtualization disciplines in Operation 2055. Here, depending on the embodiment, the TEF channel overload module may be configured to select the number of agents based on the severity of the overload being experienced by the IQUS queue. In addition, the TEF channel overload channel may select the particular agents to restrict based on the current service level performance margins of their single agent (SAQS) queues.

At this point, the TEF channel overload module determines whether any of the selected agents handles both chaining and non-chaining communications in Operation 2060. If so, then the TEF channel module interrogates the SAQS in Operation 2065 to assess whether adjusting the virtualization discipline as proposed will have a detrimental effect on the SAQS's performance in Operation 2070. If the proposed restriction will have a detrimental effect and the proposed restriction is not acceptable, then the TEF channel overload module adjusts the proposed restriction in Operation 2075. However, if proposed restriction will not have a detrimental effect, then the TEF channel overload module restricts the select agents' virtualization disciplines in Operation 2080. Again, The TEF channel overload module then concludes by recording the conditions of the overloaded channel and action steps taken to elevate the overload in Operation 2085.

The SAQS and IQUS then operate with the restrictions in place to attempt to remove the overload condition for the channel. Once the overload condition for the channel has been removed, the restrictions implemented by the TEF channel overload channel are also removed in various embodiments.

TEF Queue Overload Module

Figure 21:
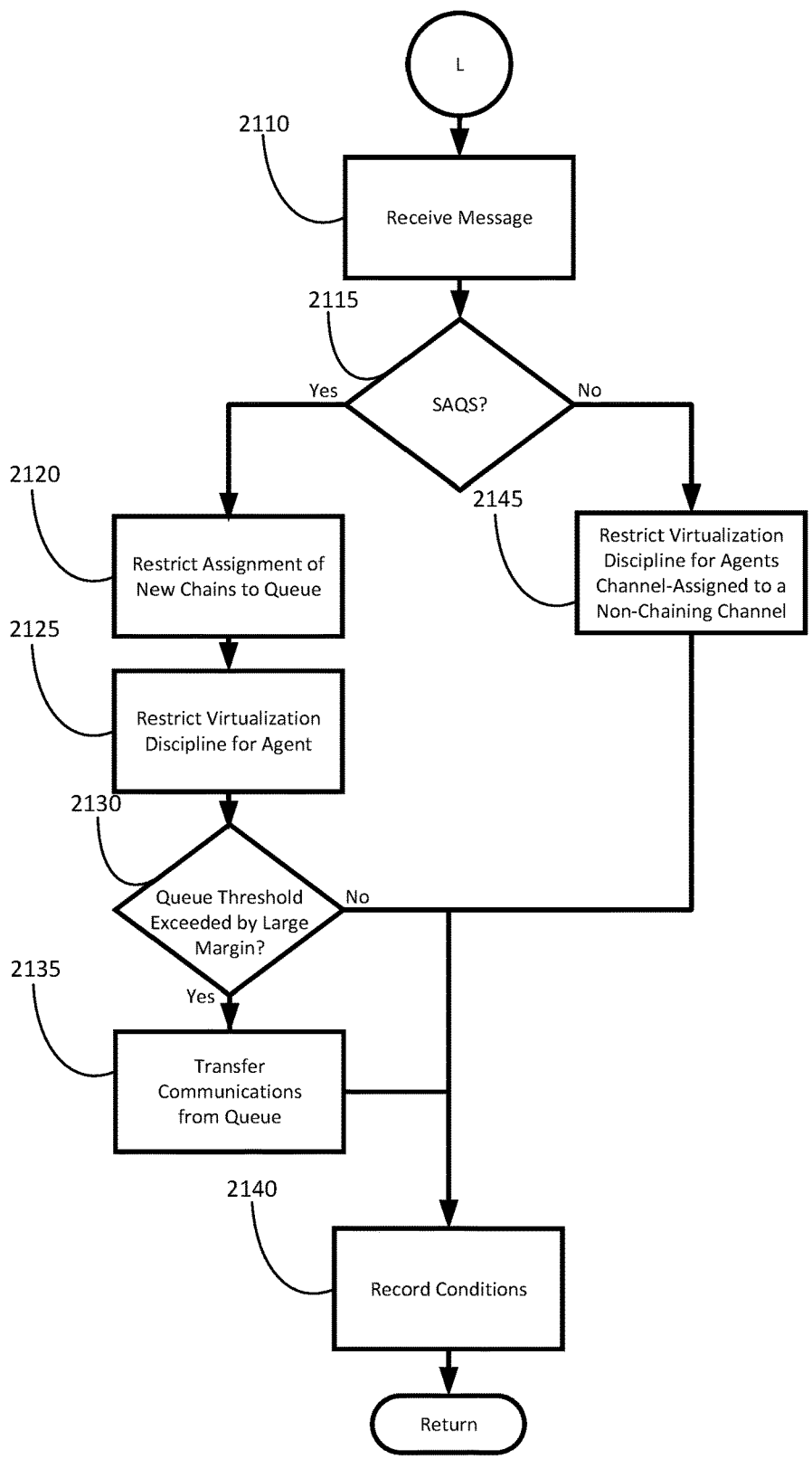
FIG. 21 illustrates a process flow for handling a queue overload for a treatment in accordance with various embodiments of the present invention.

FIG. 21 provides additional details regarding a process flow for the TEF handling a queue overload for a particular treatment according to various embodiments of the invention. In particular, FIG. 21 is a flow diagram showing a TEF queue overload module for performing such functionality according to various embodiments of the invention. For example, the flow diagram shown in FIG. 21 may correspond to operations carried out by one or more processors in one or more components, such as, for example, the communications handler 150 described above, as it executes the TEF queue overload module stored in the component's volatile and/or nonvolatile memory.

Like the TEF channel overload module, the TEF queue overload module may also be invoked by the TEF overload module in various embodiments to address a queue overload for a particular treatment. However, the TEF queue overload module in other embodiments may not be invoked by the TEF overload module, but may instead be invoked by a different module or independently as a stand-alone module.

The beginning of the process is identical to the process performed by the TEF channel overload module in that the TEF queue overload module receives a message informing the module of the overload (except in this instance, the overload involves a queue and not just a channel) in Operation 2110 and the TEF queue overload module determines whether the overload involves a SAQS queue or IQUS queue in Operation 2115.

If the overload involves a SAQS queue, then the TEF queue overload module restricts the assignment of any new chains of any chaining channel to the overloaded queue in Operation 2120. Further, the TEF queue overload module restricts the virtualization discipline for the agent who is associated with the overloaded SAQS queue in Operation 2125.

If the margin by which the overall service level requirement for the queue is exceeded is large, then it may become necessary to transfer some of the communications from the agent's SAQS queue to a different agent's SAQS queue. Therefore, in particular embodiments, the TEF queue overload module determines whether overall service level requirement for the overloaded queue is exceeded by a large margin (e.g., a preset threshold/margin) in Operation 2130. If so, then the TEF queue overload module transfers communications from the agent's SAQS queue to one or more other agents' SAQS queues in Operation 2135. At that point, the TES queue overload module records the conditions for the overloaded queue in Operation 2140.

Returning to Operation 2115, if the overloaded queue is not a SAQS queue but instead is an IQUS queue, then the TEF queue overload module restricts the virtualization discipline for one or more agents assigned to the queue for one or more non-chaining channels based on the nature and severity of the overload condition in Operation 2145. The TEF queue overload module then records the conditions for the overloaded queue in Operation 2140.

In particular embodiments, the TEF queue overload module may be configured to determine whether an overload condition has resolved or not in a timely manner. In these particular embodiments, the TEF queue overload module may keep track of the number of messages received for a particular queue over an established time period. Here, if the TEF queue overload module receives a threshold number of messages with regard to the particular queue, then the TEF may request additional agent resources from contact center management by sending the management some type of communication such as an email and/or text message.

SAQS Performance Module

Figure 22:
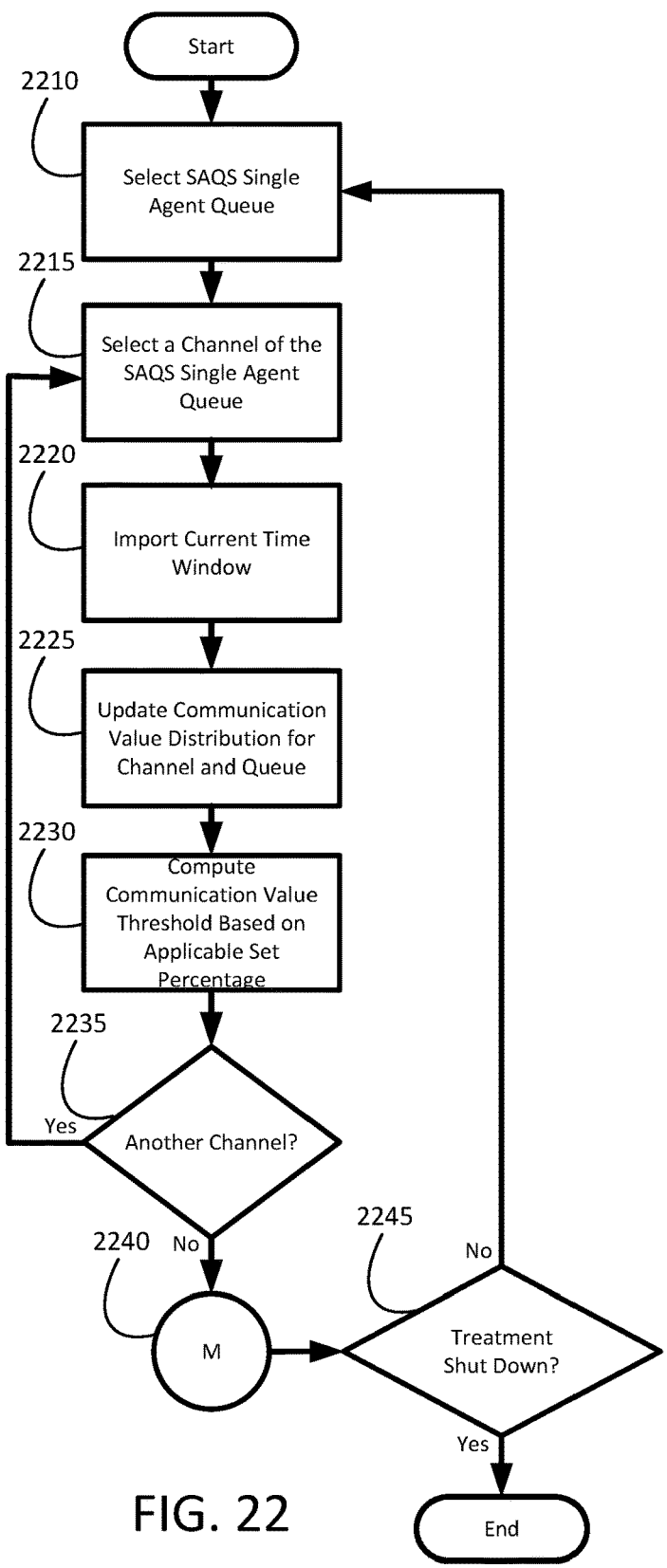
FIG. 22 illustrates a process flow for evaluating the performance of each of the SAQS single agent queues of a treatment in accordance with various embodiments of the present invention.

FIG. 22 provides additional details regarding a process flow for evaluating the performance of each of the SAQS single agent queues of a treatment according to various embodiments of the invention. In particular, FIG. 22 is a flow diagram showing a SAQS performance module for performing such functionality according to various embodiments of the invention. For example, the flow diagram shown in FIG. 22 may correspond to operations carried out by one or more processors in one or more components, such as, for example, the communications handler 150 described above, as it executes the SAQS performance module stored in the component's volatile and/or nonvolatile memory.

In various embodiments the SAQS performance module is started by the TEF or by the SAQS following completion of SAQS startup, meaning after the SAQS startup module has completed execution. Once started, the SAQS performance module continues to execute continuously and independently until the treatment is shut down. However, the SAQS performance module in other embodiments may not be invoked by the TEF or SAQS, but may instead be invoked by a different module or independently as a stand-alone module.

Here, the process begins with the SAQS performance module selecting the first SAQS single agent queue in Operation 2210. Depending on the embodiment, any order of selection of the SAQS single agent queues may be used, as long as the same order is used consistently and all of the SAQS single agent queues are considered in turn. This ordering, once chosen, is not modified unless one of the SAQS single agent queues is deleted or a new SAQS single agent queue is started. Once the first SAQS single agent queue is selected the process of evaluating the performance of each of the channels used by that queue begins.

At this point, the SAQS performance module selects the first of the chaining channels used by the selected queue in Operation 2215. As with the ordering of the SAQS single agent queues, the order used for selecting the chaining channels used by the selected queue is arbitrary, provided all the chaining channels used by the queue are selected in turn and the same order is used consistently. Next the SAQS performance module imports the set of communications values in the current time window of communication values for the channel that is used to determine the communication value distribution for the queue and channel in Operation 2220, and uses that data to update the communication value distribution for the queue and channel in Operation 2225. At this point, the SAQS performance module computes a new value for the communication value threshold based on the updated communication value distribution for the queue and channel and based on the chosen applicable set percentage used for the queue and channel in Operation 2230.

Having completed the current channel for the selected queue, the SAQS performance module next determines if there are any chaining channels used by the queue that have not been considered in Operation 2235. If there are any additional channels, then the SAQS performance module returns to Operation 2215 to select the next channel and repeat the process to update the communication value threshold for that channel.

When no chaining channels used by the selected queue remain, then the SAQS performance module determines whether each channel used by the queue is meeting its service level requirement in Operation 2240. In various embodiments, the SAQS performance module also determines if the queue as a whole is meeting its overall service level requirement as part of Operation 2240.

Figure 23:
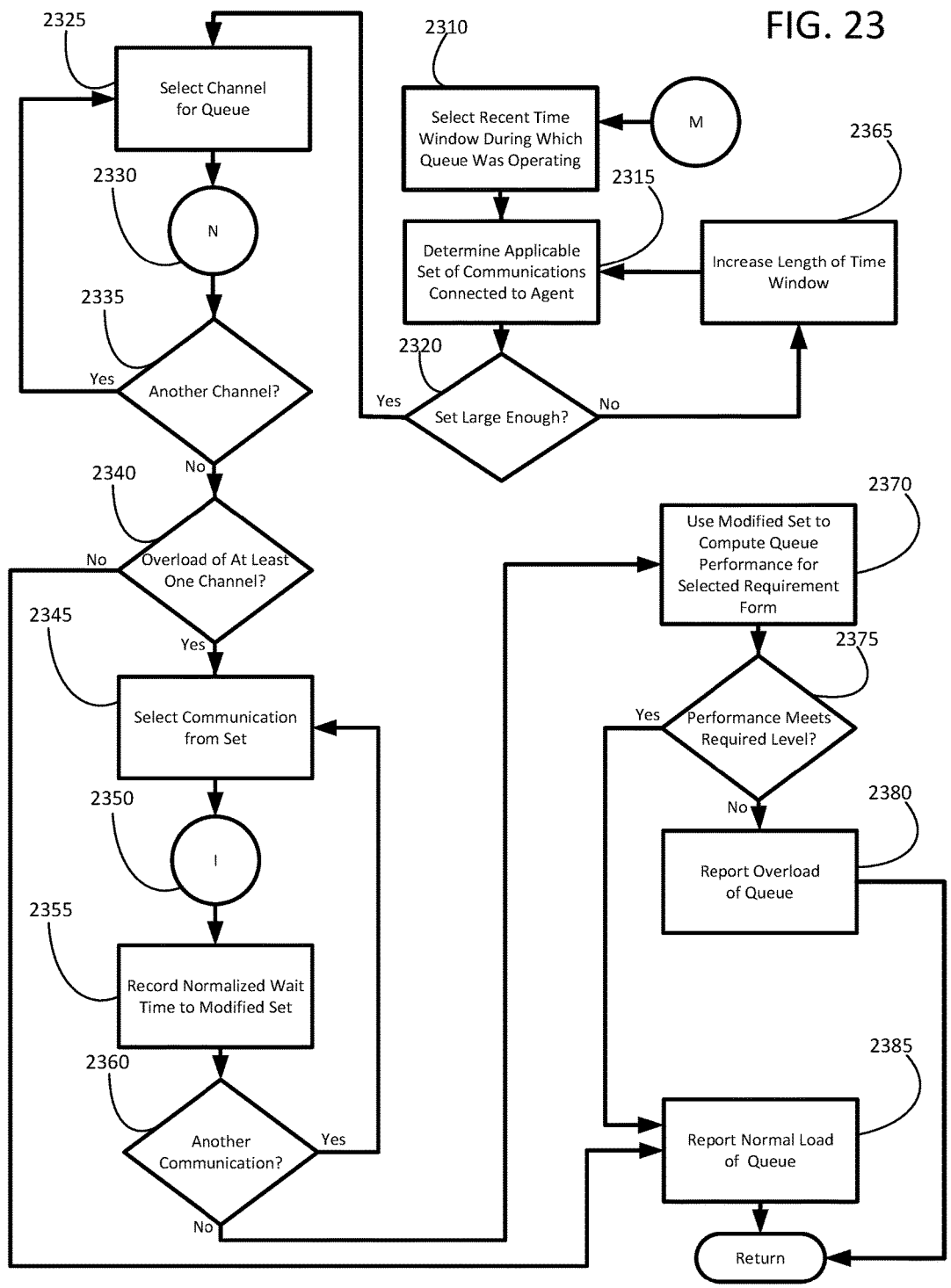
FIG. 23 illustrates a process flow for evaluating the performance of a queue of a treatment in accordance with various embodiments of the present invention.

In particular embodiments, the SAQS performance module performs this operation by invoking a queue performance module (FIG. 23). The queue performance module evaluates each of the individual channels and issues messages to the TEF overload module to express whether the individual channels are meeting their requirements or are in an overload condition, as well as to express whether the queue as a whole is meeting its requirement or is in an overload condition. As a result, the TEF may then take one or more actions to attempt to elevate the overload(s), if any exist.

After the performance of the queue and its channels has been evaluated, the SAQS performance module determines whether the treatment has shut down in Operation 2245. If not, then the SAQS performance module returns to Operation 2210 to select the next SAQS single agent queue and the same operations are performed to evaluate the performance of the newly selected queue.

In various embodiments, the SAQS performance module continues to cycle continuously through the set of SAQS single agent queues, and halts when the treatment is shut down. This keeps the performance information for each single agent queue up-to-date and informs the TEF overload module of overloads or the cessation of overloads in a timely manner.

Queue Performance Module

The overall performance of a queue is based on the queue meeting its service level requirement set for each of the channels handled by the queue. However, the service level requirements for the individual channels are likely to be different and this difference can lead to a conflict in meeting service level requirements for the queue. Therefore, the services level requirements are normalized in various embodiments when evaluating the overall performance of a queue. Such practice allows for all the communications handled by the queue to determine if the service level requirements (e.g., the wait time requirements) for all channels are being met in an overall sense.

With this in mind, FIG. 23 provides additional details regarding a process flow for evaluating the performance of a queue of a treatment according to various embodiments of the invention. In particular, FIG. 23 is a flow diagram showing a queue performance module for performing such functionality according to various embodiments of the invention. For example, the flow diagram shown in FIG. 23 may correspond to operations carried out by one or more processors in one or more components, such as, for example, the communications handler 150 described above, as it executes the queue performance module stored in the component's volatile and/or nonvolatile memory.

As already discussed, the queue performance module may also be invoked by the SAQS performance module in various embodiments to evaluate the overall performance of a queue for a particular treatment. However, the queue performance module in other embodiments may not be invoked by the SAQS performance module, but may instead be invoked by a different module or independently as a stand-alone module.

Accordingly, the process begins with the queue performance module selecting a recent time window during which the queue was operating in Operation 2310. The queue performance module then determines an applicable set of communications connected to agent(s) that occurred during the time window, meaning those whose communication values were above a current communication value threshold of the queue for a selected total volume percentage in Operation 2315. For each channel handled by the queue, the channel's communication value threshold in various embodiments is based on the selected total volume percentage and that channel's communication value distribution for the queue.

Next the queue performance module determines whether the set of communications is large enough (e.g., the set of communications contains a number of communications above a threshold) in Operation 2320. The set must be large enough for an accurate assessment of performance for the service level requirement to be made. If the set is too small then the assessment will be noisy and unreliable. In particular embodiments, this operation may entail the queue performance module determining whether records exist in the applicable set of communications for each of the channels handled by the queue. If the applicable set of communications is not large enough then, in order to increase the size of the applicable set, the queue performance module extends the length of the time window selected in Operation 2365, returns to Operation 2315 to identify the enlarged applicable set, and once again tests to see if the enlarged applicable set is large enough yet in Operation 2320. This process continues until the applicable set is large enough, and then the queue performance module proceeds with evaluating the performance of each channel utilized by the queue.

Accordingly, the queue performance module begins by selecting one of the channels for the queue in Operation 2325. The queue performance module then selects the communications that involved the selected channel from the set of communications and evaluates these communications as to whether they met the service level performance set for the channel in Operation 2230. Thus, the queue performance module performs this operation in particular embodiments by invoking a channel performance module (FIG. 24) to perform this particular task for each channel. Once the evaluation has been completed, the queue performance module determines whether the queue supports another channel in Operation 2335. If so, then the queue performance module returns to Operation 2325 and selects the next channel for the queue to be evaluated.

Once all of the channels of the queue have been evaluated, the queue performance module determines whether an overload condition exists for at least one of the channels of the queue in Operation 2340. If no overload condition exists for at least one of the channels, then the queue is not currently experiencing any overload condition. Therefore, the queue performance module reports the normal loads for the channels of the queue in Operation 2385.

However, if at least one overload condition exists for a channel, then the queue performance module evaluates the overall performance of the queue. To accomplish this task, wait times for each of the communications in the set must first be normalized. Therefore, the queue performance module selects a communication from the set in Operation 2345. In this particular embodiment, the queue performance module invokes the normalize module (FIG. 16) for the selected communication in Operation 2350 and the normalize module returns the normalized wait time to the queue performance module. The queue performance module then records the normalized wait time for the selected communication in a modified set of communications in Operation 2355.

The queue performance module then determines if another communication exists in the set of communications in Operation 2360. If so, the queue performance module returns to Operation 2345 and selects the next communication from the set to have the wait time for the communication normalized and added to the modified set. The queue performance module repeats these operations until all of the communications in the set have been processed.

At this point, the queue performance module computes the overall queue performance level for the chosen form of the service level requirement based on the communications in the modified set in Operation 2370. The queue performance module then determines whether the computed queue performance level meets the overall queue service level requirement in Operation 2375. Here, the overall queue service level requirement is the service level requirement set for the reference channel that was used in the normalizing process. The service level requirement for the reference channel is used since the wait time for all of the communications have been adjusted based on the reference channel.

If the overall queue performance level for the chosen form of the service level requirement based on the communications in the modified set does not met the service level requirement, then the queue is experiencing an overall overload. In this instance, the queue performance module reports the overload in Operation 2380. As a result, the TEF (TEF overload module) receives one or more messages in various embodiments identifying the overload condition(s) and takes appropriate measures to attempt to address these condition(s).

Channel Performance Module

Figure 24:
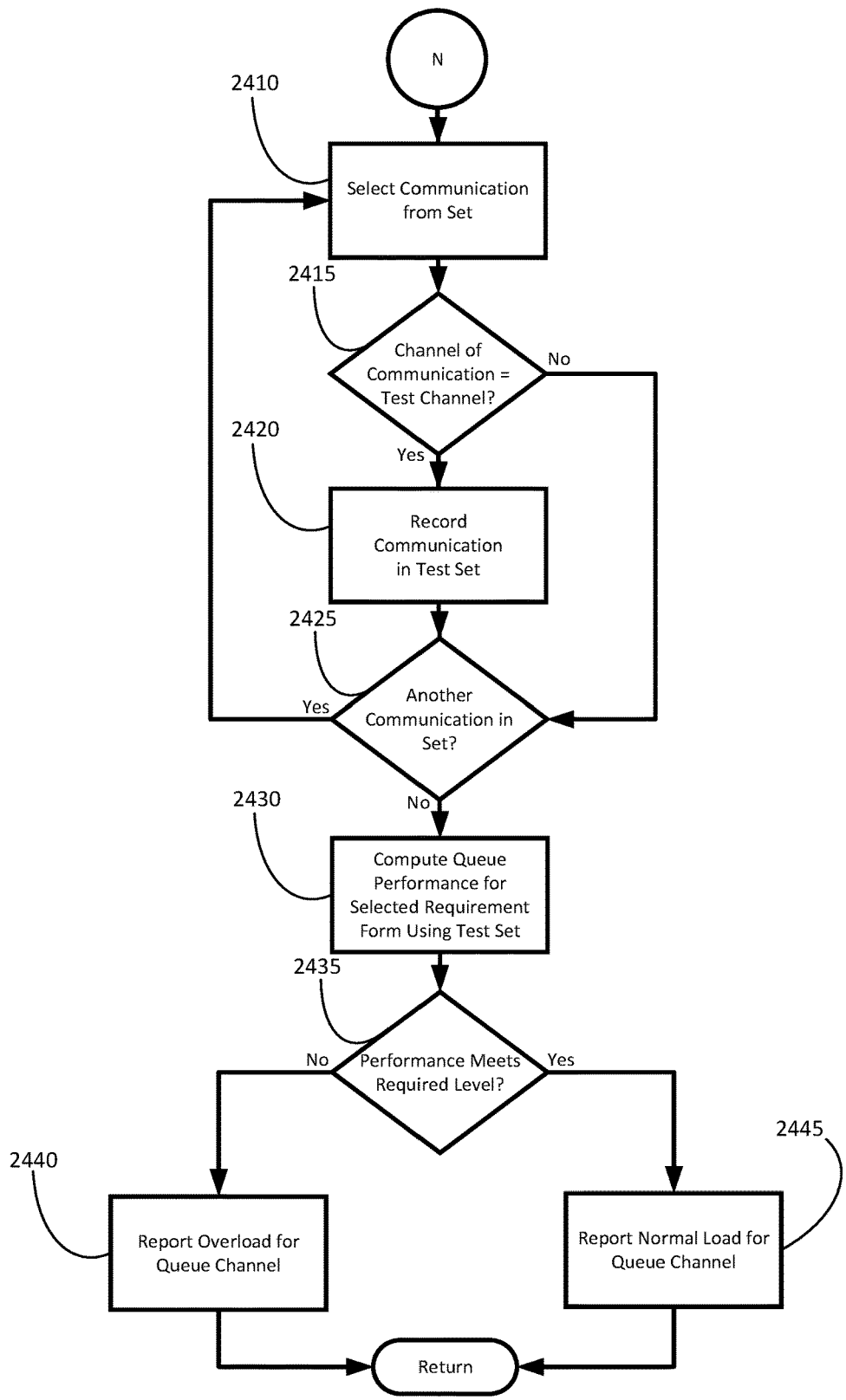
FIG. 24 illustrates a process flow for evaluating the performance of a channel for a queue of a treatment in accordance with various embodiments of the present invention.

FIG. 24 provides additional details regarding a process flow for evaluating the performance of a channel for a queue of a treatment according to various embodiments of the invention. In particular, FIG. 24 is a flow diagram showing a channel performance module for performing such functionality according to various embodiments of the invention. For example, the flow diagram shown in FIG. 24 may correspond to operations carried out by one or more processors in one or more components, such as, for example, the communications handler 150 described above, as it executes the channel performance module stored in the component's volatile and/or nonvolatile memory.

As mentioned above, the channel performance module may be invoked by the queue performance module in various embodiments to evaluate the performance of a particular channel for a queue of a treatment. However, the channel performance module in other embodiments may not be invoked by the queue performance module, but may instead be invoked by a different module or independently as a stand-alone module.

Here, the process starts with the channel performance module selecting a communication from a set of communications that were connected to agents over a recent time window in Operation 2410. Here, in particular embodiments, the set of communications is the set selected by the queue performance module from the recent time window during which the queue being evaluated was operating. Next, the channel performance module determines whether the channel used for the selected communication is the same as the channel being evaluated (test channel) in Operation 2415. If so, then the channel performance module records the communication in a test set in operation 2420. The channel performance module then determines whether another communication is present in the set of communications in Operation 2425. If so, then the channel performance module returns to Operation 2410, selects the next communication from the set, and repeats the operations discussed above for the newly selected communication. The channel performance module repeats this process until all of the communications in the set of communications have been considered.

At that point, the channel performance module has constructed a test set of communications that used the channel being evaluated. Next, the channel performance module computes the queue performance level for the channel for the chosen form of the service level requirement based on the communications found in the test set in Operation 2430. The channel performance module then determines whether the computed queue performance level for the channel meets the service level requirement set for the channel in Operation 2435. If not, then the particular channel of the queue is experiencing an overload. Therefore, the channel performance module reports the overload for the queue channel in Operation 2440. For instance, in particular embodiments, the channel performance module reports the overload of the queue channel to the TEF overload module. However, if the computed queue performance level for the channel does meet the service level requirement, then the channel performance module reports the queue channel is experiencing a normal load in Operation 2445.

IQUS Configuration Control Module

As previously mentioned, the IQUS configuration for a treatment may launch in a startup mode at the beginning of a workday and may transition into a steady state mode once the IQUS startup process is completed. Following completion of IQUS startup, the IQUS configuration of the treatment initially operates in a minimal or basic form, but may transition to a general form later. The IQUS configuration may transition from one form to another when operational conditions indicate a need or opportunity to do so. To make such a transition, the IQUS first enters update mode, constructs a new IQUS configuration in an appropriate form, and then places that new configuration into operation and returns to steady state. In steady state mode, the IQUS continuously monitors the behavior and performance of its queues, and transitions to update mode to construct and deploy a new configuration when operational conditions warrantee that transition. Some examples of operational conditions that indicate that performing a configuration update is appropriate include having one or more IQUS queues fail to meet critical requirements or having excess agent capacity in some queue or queues with the currently operating configuration.

Figure 25:
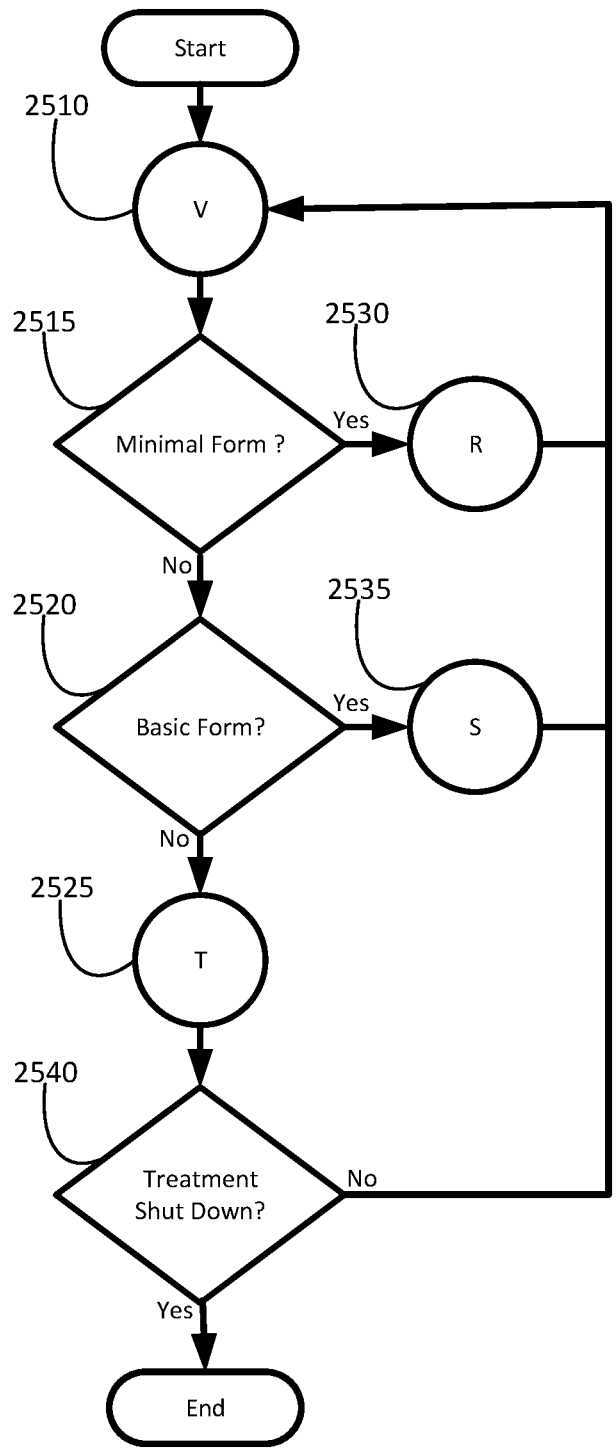
FIG. 25 illustrates a process flow for updating the communication value distribution, the locations of the communication value breakpoints defining the boundaries between adjacent IQUS queues, the assignment of agents to the IQUS queues, and the mapping of agents to specific communication value intervals within the communication value range of each IQUS queue in accordance with various embodiments of the present invention.

Accordingly, FIG. 25 provides additional details regarding a process flow for evaluating the performance of a treatment in a steady state mode with respect to its non-chaining channels and updating the currently operating IQUS configuration according to various embodiments of the invention. In particular, FIG. 25 is a flow diagram showing an IQUS configuration control module for performing such functionality according to various embodiments of the invention. For example, the flow diagram shown in FIG. 25 may correspond to operations carried out by one or more processors in one or more components, such as, for example, the communications handler 150 described above, as it executes the IQUS configuration control module stored in the component's volatile and/or nonvolatile memory.

The IQUS configuration control module may be started by the TEF or IQUS after completion of IQUS startup in various embodiments to continuously evaluate the performance of all the IQUS queues and update the IQUS configuration when needed. However, the IQUS configuration control module in other embodiments may not be invoked by the TEF or IQUS, but may instead be invoked by a different module or independently as a stand-alone module. In particular embodiments, once started the IQUS configuration update module executes continuously and independently until the treatment is shut down.

Figure 26:
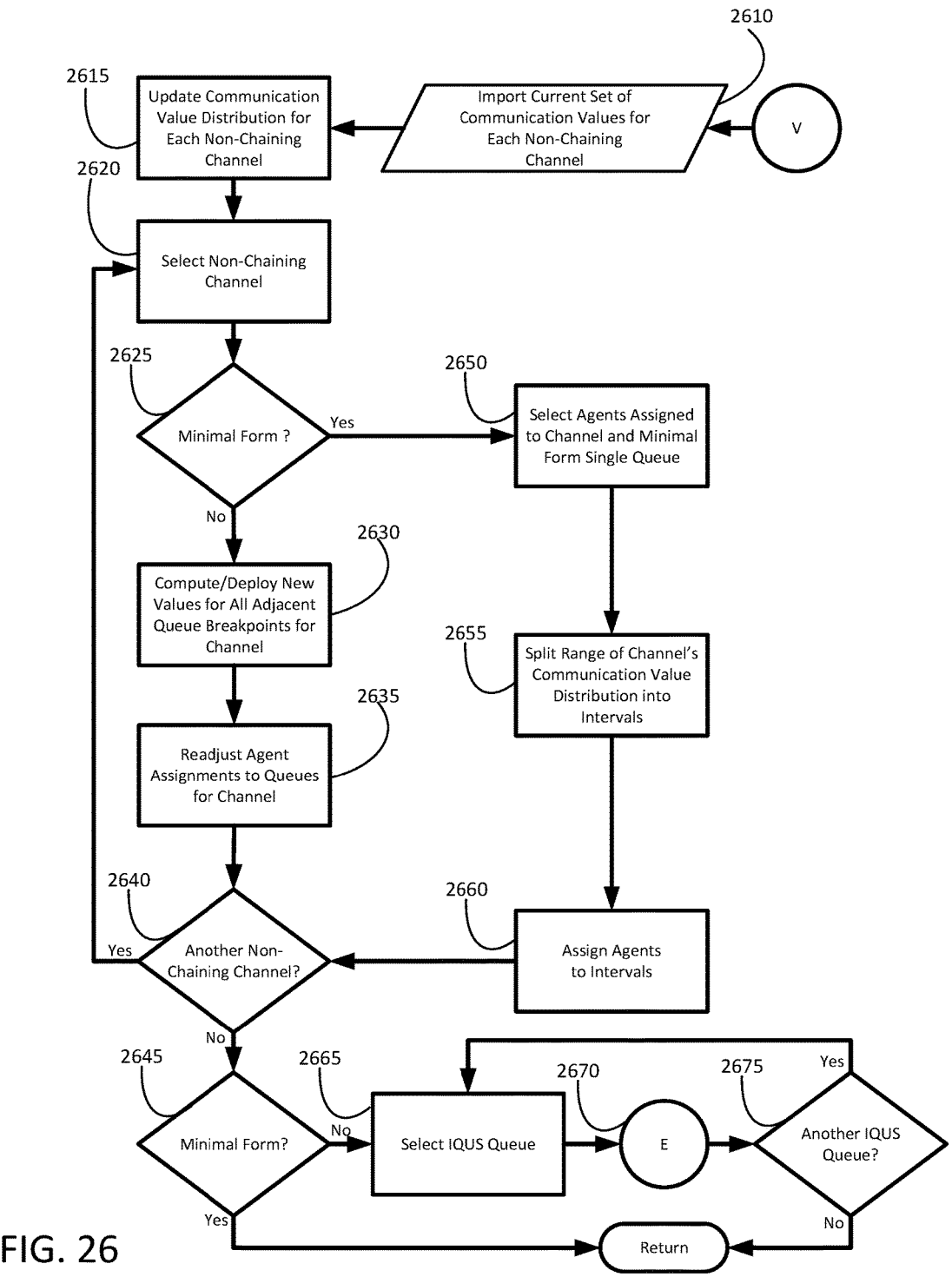
FIG. 26 illustrates a process flow for controlling the configuration of a treatment in a minimal form with respect to non-chaining channels in accordance with various embodiments of the present invention.

In various embodiments, after its activation by the TEF or IQUS, the IQUS configuration control module proceeds to systematically execute a series of operations, and continues to execute this series of operations repeatedly without interruption until it is terminated during shut down of the treatment. Upon activation, the process begins with the IQUS configuration control module updating the communication value distribution of each non-chaining channel based on current conditions in Operation 2510. In particular embodiments, the IQUS configuration control module carries out this updating process by invoking an IQUS distributions update module (FIG. 26). Here, the IQUS distributions update module updates, per non-chaining channel, the locations of the communication value breakpoints defining the boundaries between adjacent queues, the assignments of agents to each IQUS queue, and the mapping of agents to specific communication value intervals within the communication value range of each IQUS queue. In some embodiments, some of the tasks performed in Operation 2510 may be simplified or eliminated when the minimal form of the IQUS configuration is in operation.

As previously mentioned, changes can occur during a workday that may affect the performance of a treatment. For instance, the makeup of a treatment's online agent pool, or a temporary modification of one or more agents' virtualization discipline, may be adjusted as needed and may affect the performance of the treatment. Likewise, changes may occur in the arrival rates of communications for various non-chaining channels, as well as changes in a particular channel's communication value distribution that results in a re-computed communication value threshold and a change in which communications get placed in which of the queues. Thus, in particular embodiments, these changes are observed and adjusted for by the IQUS configuration control module as it executes.

Figure 27:
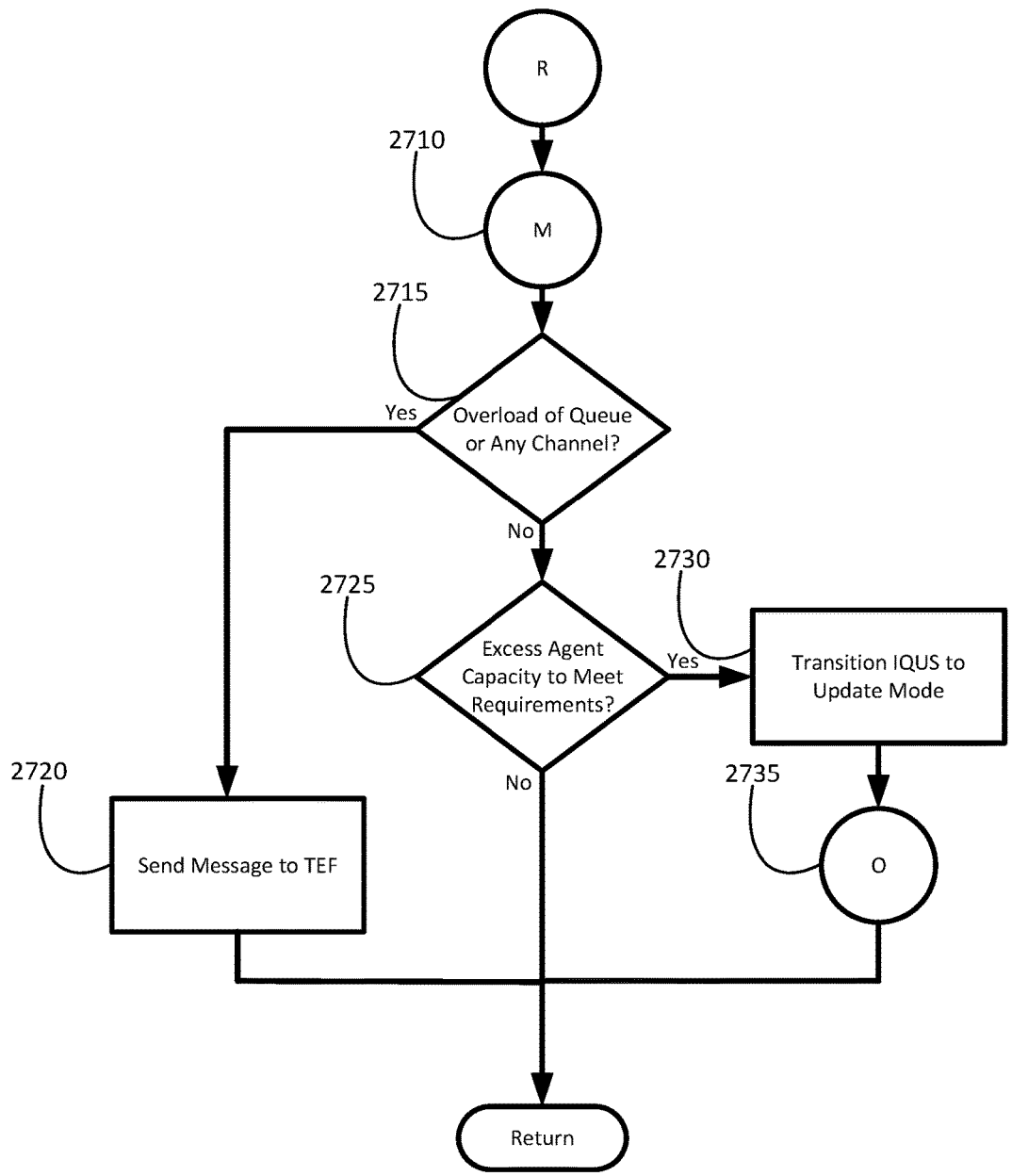
FIG. 27 illustrates a process flow for updating a treatment with respect to its non-chaining channels in accordance with various embodiments of the present invention.

Following completion of Operation 2510, the IQUS configuration control module then determines which form of the IQUS configuration is currently deployed. This begins with determining if the IQUS configuration is operating in its minimal form in Operation 2515. If the IQUS configuration is operating its minimal form, then the IQUS configuration control module assesses the overall performance with respect to the total service level requirement of the single IQUS queue and assesses the performance with respect to the service level requirement of each channel separately for each non-chaining channel employed by the treatment in Operation 2530. Specifically, the IQUS configuration control module performs this operation in particular embodiments by invoking an IQUS minimal configuration control module (FIG. 27). Based on those assessments, a message may be sent to the TEF advising of the existence of various overload conditions. On the other hand, if there are no overload conditions and more non-chaining channel agents are online than are needed to support the requirements, then the IQUS minimal configuration control module may transition to update mode to create and deploy a new IQUS configuration.

Figure 28:
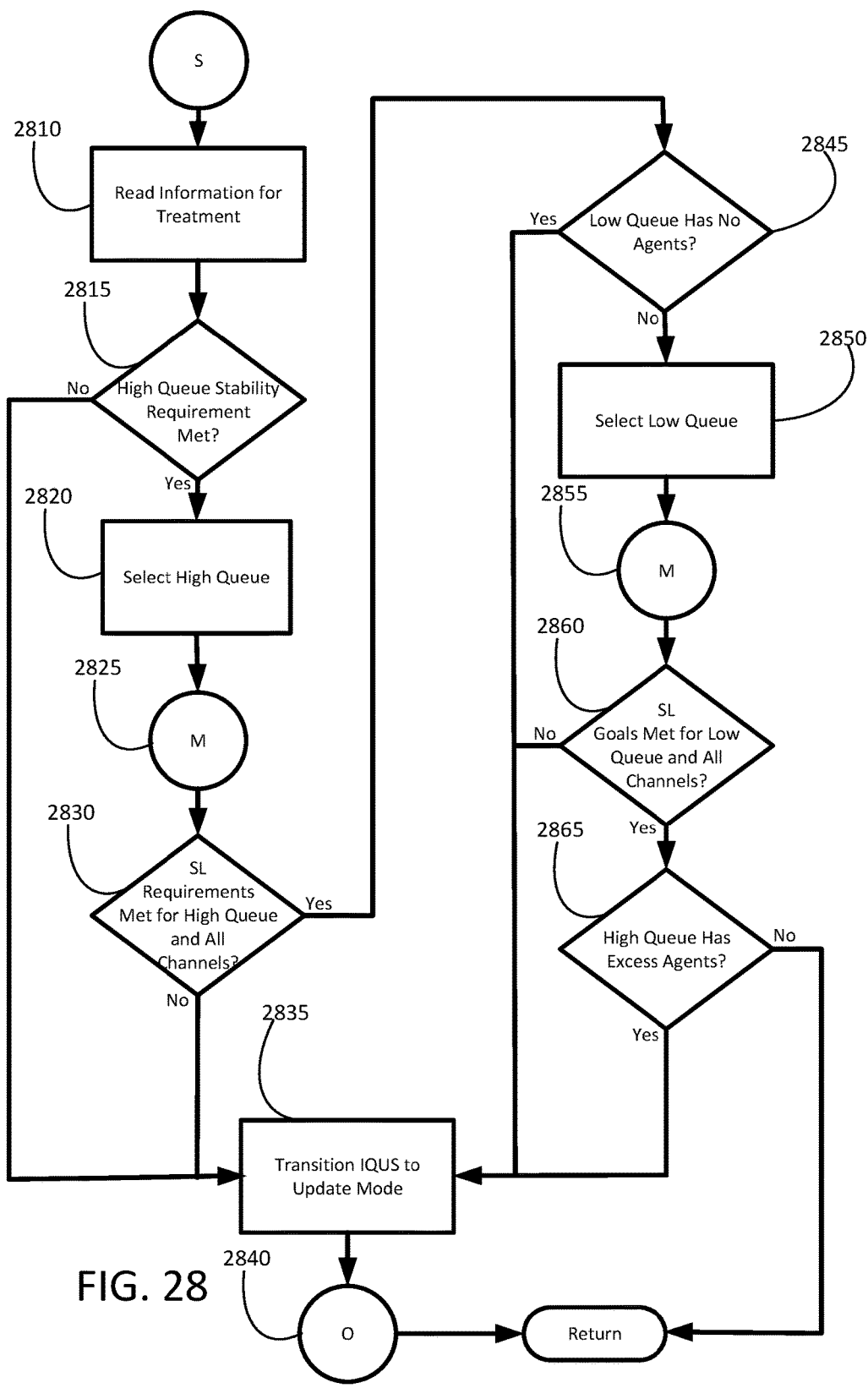
FIG. 28 illustrates a process flow for controlling the configuration of a treatment in a basic form with respect to non-chaining channels in accordance with various embodiments of the present invention.

Returning now to Operation 2515, if instead the IQUS configuration control module determined the IQUS configuration is not operating in its minimal form, then the IQUS configuration control module determines if the IQUS configuration is operating in its basic form in Operation 2520. If the IQUS configuration is operating in its basic form, then the IQUS configuration control module assesses the performance with respect to the stability requirement and overall service level requirement of the basic form high queue and the performance of the high queue with respect to the service level requirement of each channel separately for each non-chaining channel employed by the treatment in Operation 2535. Accordingly, in particular embodiments, the IQUS configuration control module executes this operation by invoking an IQUS basic form configuration control module (FIG. 28).

If it is determined that the high queue fails to satisfy any of these requirements, then the IQUS basic configuration control module may transition to update mode to create and deploy a new IQUS configuration. In some embodiments, the approach taken when some requirements are not met may be relaxed to some degree. For example, such an approach may be appropriate if there are one or more non-chaining channels with high communication arrival rates while at the same time there are one or more non-chaining channels with much lower communication arrival rates. In this case it may be more effective to permit the failure of the lower communication arrival rate channels to meet their service level requirements for the high queue without penalty. This will allow considerably greater flexibility to increase the number of IQUS queues and will avoid allowing a relatively small volume of non-chaining communications to restrict use of an optimal approach for the vast majority of non-chaining communications. Generally, increasing the number of IQUS queues improves the effectiveness of the IQUS in matching agents to communications based on communication value and agent ranking, and also decreases the queue wait times for higher value communications.

If all requirements for the high queue are met, then the IQUS basic form configuration control module may determine if the low queue has no agents assigned or fails to meet its overall service level goal or the service level goals of one or more of the non-chaining channels. If the low queue has no agents assigned or fails one of its service level goals, then the IQUS configuration control module may transition to update mode to create and deploy a new IQUS configuration. As mentioned before, in some embodiments, the approach taken when some requirements are not met may be relaxed to some degree due to having some non-chaining channels with widely different communication arrival rates.

Finally, if the low queue meets all service level goals, then the IQUS basic form configuration control module may determine if the number of agents assigned to the high queue is in excess of the number needed to support the high queue's requirements. If so, then the IQUS configuration control module may transition to update mode to create and deploy a new IQUS configuration.

Figure 29:
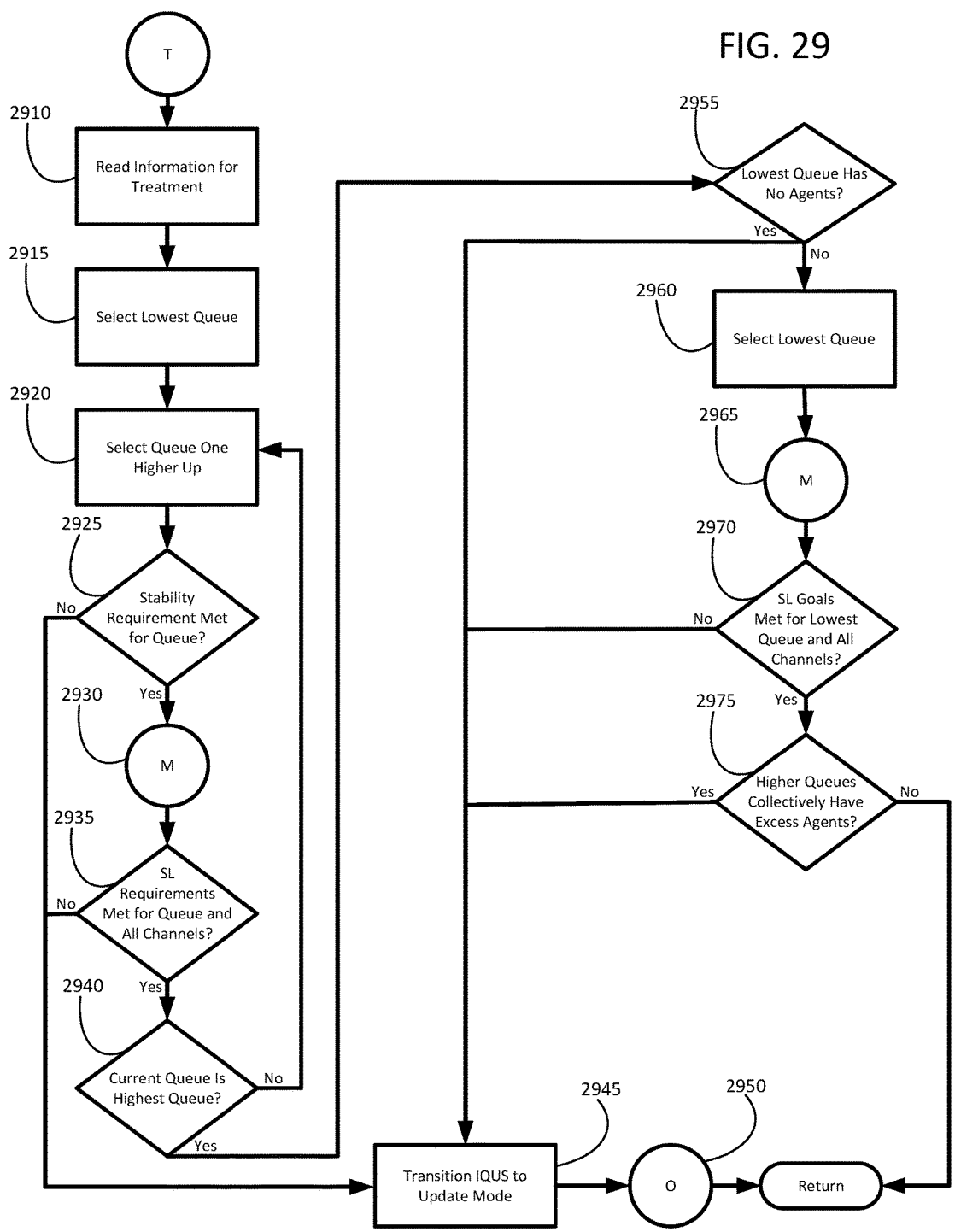
FIG. 29 illustrates a process flow for evaluating the performance of a general form configuration of the IQUS for a treatment with respect to its non-chaining channels in accordance with various embodiments of the present invention.

Returning now to Operation 2520, if the IQUS configuration control module determines the IQUS configuration is not operating in its basic form, then the IQUS configuration must necessarily be operating in its general form, with three or more queues. In that case there are two or more higher queues and one lowest queue, and the IQUS configuration control module assesses the performance with respect to the stability requirement and overall service level requirement of each of the general form higher queues, and assesses the performance for each of the higher queues with respect to the service level requirement of each non-chaining channel in Operation 2525. Here, the IQUS configuration control module may perform this operation in particular embodiments by invoking an IQUS general configuration control module (FIG. 29). If it is determined that any of the higher queues fails to satisfy any of these requirements, then the IQUS configuration control module may transition to update mode to create and deploy a new IQUS configuration.

As with the high queue of the basic form, in some embodiments the approach taken when some requirements are not met may be relaxed to some degree. For example, such an approach may be appropriate if there are one or more non-chaining channels with high communication arrival rates while at the same time there are one or more non-chaining channels with much lower communication arrival rates. In this case it may be more effective to permit the failure of the lower communication arrival rate channels to meet their service level requirements for the higher queues and the lowest queue without penalty. This will allow considerably greater flexibility to increase the number of IQUS queues and will avoid allowing a relatively small volume of non-chaining communications to restrict use of an optimal approach for the vast majority of non-chaining communications. Increasing the number of IQUS queues improves the effectiveness of the IQUS in matching agents to communications based on communication value and agent ranking, and also decreases the queue wait times for higher value communications.

If all requirements tested for the higher queues are met, then in particular embodiments the IQUS general configuration control module determines if the lowest queue has no agents assigned or fails to meet its overall service level goal or the service level goals of one or more of the non-chaining channels. If the lowest queue has no agents assigned or fails one of its service level goals then the IQUS general configuration control module may transition to update mode to create and deploy a new IQUS configuration. If all requirements are met for the lowest queue, then in particular embodiments the IQUS general configuration control module determines if the higher queues collectively have agents assigned in excess of the number of agents needed to satisfy all higher queue requirements. If an excess of agents is present, then the IQUS general configuration control module may transition to update mode to create and deploy a new IQUS configuration.

At this point, the IQUS configuration control module determines whether the treatment has been shut down in Operation 2540. If not, then the IQUS configuration control module returns to Operation 2510 to start its series of operations again. Accordingly, in various embodiments, this process of repeating the series of operations continues without interruption until the treatment is shut down.

IQUS Distributions Update Module

In various embodiments, it may be necessary to keep the underlying communication value distributions of the non-chaining channels fully up-to-date with current conditions to be responsive to operational conditions and to be able to change the configuration of the IQUS set of queues for a treatment promptly when needed. In addition, it may also be essential to keep up-to-date, for each non-chaining channel, the locations of the communication value breakpoints defining the boundaries between adjacent queues, the assignments of agents to the IQUS queues, and the mapping of agents to specific communication value intervals within the communication value range of each IQUS queue.

Accordingly, FIG. 26 provides additional details regarding a process flow for updating the communication value distribution, the locations of the communication value breakpoints defining the boundaries between adjacent IQUS queues, the assignments of agents to the IQUS queues, and the mapping of agents to specific communication value intervals within the communication value range of each IQUS queue according to various embodiments of the invention. In particular, FIG. 26 is a flow diagram showing an IQUS distributions update module for performing such functionality according to various embodiments of the invention. The flow diagram shown in FIG. 26 may correspond to operations carried out by one or more processors in one or more components, such as, for example, the communications handler 150 described above, as it executes the IQUS distributions update module stored in the component's volatile and/or nonvolatile memory.

In various embodiments, the IQUS distributions update module may be invoked by the IQUS configuration control module. However, the IQUS distributions update module in other embodiments may not be invoked by the IQUS configuration control module, but may instead be invoked by a different module or independently as a stand-alone module.

The IQUS distributions update module begins the process in various embodiments by accessing the current set of communication values for each non-chaining channel in Operation 2610. As the reader may recall, a set of communication values are maintained for each non-chaining channel for the purpose of determining the current communication distribution of that channel. There is a pre-defined number of communication values in each channel's set, and each time a new communication of a non-chaining channel arrives in the IQUS in particular embodiments, its communication value is placed in that channel's set and the communication value that has been in the set the longest is deleted from the set. This approach maintains a set of communication values for each non-chaining channel that is as recent as possible and is large enough to adequately characterize that channel's communication value distribution. Based on the identification of each non-chaining channel's communication value distribution and based on a chosen set of breakpoint communication values that define the boundaries between adjacent IQUS queues, a separate communication value distribution can be determined for each IQUS queue and non-chaining channel.

Following completion of Operation 2610, the IQUS distributions update module in particular embodiments updates the communication value distribution of each non-chaining channel in Operation 2615. For each non-chaining channel this operation may involve a number of bookkeeping operations, such as sorting the set of communication values into non-decreasing order, identifying the lowest and highest communication values in the set, identifying the number of unique values in the set, and identifying how often each unique value is repeated. This type of information may be used for correctly defining for each non-chaining channel the communication value intervals to which agents will be assigned.

Next, the IQUS distributions update module selects one of the non-chaining channels in Operation 2620. The order in which the channels are select is unimportant so long as each of the channels is included in the order chosen. At this point, the IQUS distributions update module determines if the IQUS configuration of the treatment is currently operating in its minimal form in Operation 2625.

If the IQUS configuration is currently operating in its minimal form, then the IQUS distributions update module determines the group of agents currently assigned to the non-chaining channel in Operation 2650. This operation is performed in various embodiments primarily so that the ranking for the channel of each agent can be accessed and the number of agents, H, can be established (not shown in FIG. 26). Once that is accomplished, the IQUS distributions update module divides the total range of the channel's communication value distribution into H non-overlapping intervals, each of which contains approximately the same percentage of total communication volume for the channel in Operation 2655. Next, the IQUS distributions update module assigns each agent allocated to the channel to one of the H intervals in Operation 2660. This operation is accomplished, in particular embodiments, by assigning the highest ranking agent to the highest interval, the second highest ranking agent to the second highest interval, and so forth.

When the number of agents is large (e.g., above a threshold), an alternate approach may be taken in particular embodiments of defining fewer communication value intervals than agents. When such an approach is taken, then more than one agent may be assigned to each interval in a manner that all the agents assigned to a given interval will have higher rankings than all the agents assigned to any interval below that given interval. Upon completion of Operation 2660, the IQUS distributions update module determines if there is another non-chaining channel that has not been processed yet in Operation 2640. If so, then the IQUS distributions update module returns to Operation 2615 to select the next channel and repeats the operations already discussed for the newly selected channel.

Returning to Operation 2625, if the IQUS distributions update module instead determines the IQUS configuration is currently not operating in its minimal form, then the IQUS configuration is operating either in the basic form or general form. This indicates, in particular, that there are at least two IQUS queues currently. In this case the IQUS distributions update module partitions the range of the communication value distribution for each non-chaining channel into a set of non-overlapping intervals, one for each IQUS queue, in Operation 2630. In particular embodiments, the IQUS distributions update module performs this operation by selecting the breakpoints defining the boundaries between adjacent IQUS queues for each non-chaining channel in a manner that causes the pre-defined percentage of communication volume for each IQUS queue to be captured by the communication value range that queue is associated with. For each non-chaining channel, the IQUS distributions update module associates the highest queue with the highest communication value interval, the second highest queue with the second highest communication value interval, and so forth.

Figure 31:
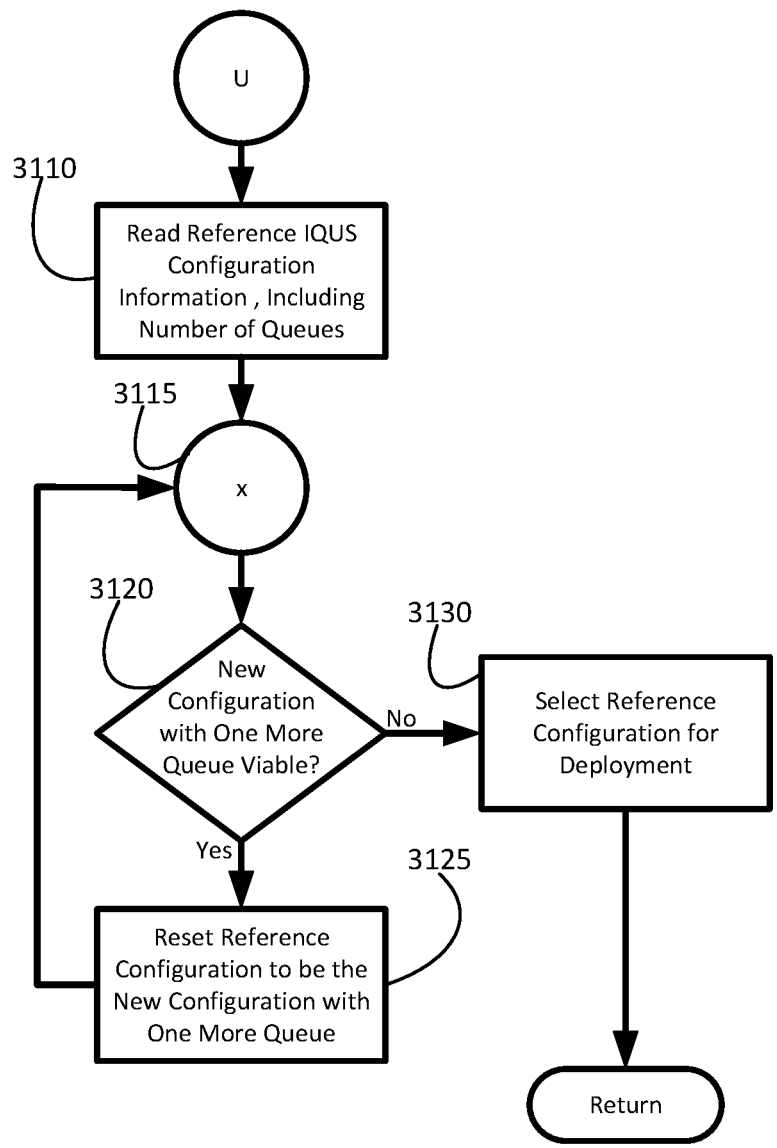
FIG. 31 illustrates a process flow for constructing a new IQUS general form configuration for a treatment that has the largest number of queues possible for a viable general form configuration in accordance with various embodiments of the present invention.

Following Operation 2630, the IQUS distributions update module in particular embodiments adjusts the assignment of agents for each non-chaining channel to each of the IQUS queues in Operation 2635 based on the current form of the IQUS configuration. If the IQUS configuration is currently in a basic form, then the IQUS distributions update module performs the reassignment in the same manner as the basic form channels support module previously discussed (FIG. 11). However, if the IQUS configuration is currently in a general form (at least 3 queues), then the IQUS distributions update module performs the reassignment by using a more complex procedure that is later discussed with respect to an IQUS general max queues module (FIG. 31).

Next the IQUS distributions update module determines if there is another non-chaining channel that has not been processed yet in Operation 2640. If there is, then the IQUS distributions update module returns to Operation 2615 to select the next channel and repeats the operations just discussed with respect to the newly selected channel.

At some point the IQUS distributions update module determines all the non-chaining channel have been processed. At that point, the IQUS distributions update module proceeds to Operation 2645 to determine if the IQUS configuration is now in the minimal form. If the IQUS configuration is now in the minimal form, then the IQUS distributions update module completes its execution and returns.

On the other hand, if the IQUS distributions update module determines the IQUS configuration is not currently in the minimal form, then additional operations are performed. Since the minimal form is not currently in use, then the IQUS configuration is made up of at least two IQUS queues. Therefore, the IQUS distributions update module selects the first IQUS queue in Operation 2665. Generally, the order in which the IQUS queues are selected is immaterial for this selection process, provided each IQUS queue is eventually selected in turn.

Following selection of an IQUS queue, the IQUS distributions update module determines the number of agents currently assigned to that queue for each non-chaining channel and the ranking of those agents, partitions the communication value interval currently used for that queue into a set of sub-intervals, and assigns each of those agents to one of those sub-intervals based on their ranking in Operation 2670. The IQUS distributions update module performs this operation in particular embodiments by invoking the IQUS agent mapping module previously discussed (FIG. 12). In particular instances, the process of assigning agents to sub-intervals for a non-chaining channel may be modified when the number of agents assigned to the queue for the given non-chaining channel is large (e.g., over a threshold). For example, the number of defined sub-intervals may be less than the number of agents and therefore, more than one agent may need to be assigned to each sub-interval.

At this point, the IQUS distributions update module determines if there is another IQUS queue that has not been processed yet in Operation 2675. If so, then the IQUS distributions update module returns to Operation 2665 to select the next IQUS queue and repeats the operations already discussed for the newly selected IQUS queue. Once all the IQUS queues have been processed, the IQUS distributions update module completes it execution.

IQUS Minimal Configuration Control Module

FIG. 27 provides additional details regarding a process flow for controlling the configuration of a treatment in a minimal form with respect to non-chaining channels according to various embodiments of the invention. In particular, FIG. 27 is a flow diagram showing an IQUS minimal configuration control module for performing such functionality according to various embodiments of the invention. For example, the flow diagram shown in FIG. 27 may correspond to operations carried out by one or more processors in one or more components, such as, for example, the communications handler 150 described above, as it executes the IQUS minimal configuration control module stored in the component's volatile and/or nonvolatile memory.

As mentioned above, the IQUS minimal configuration control module may be invoked by the IQUS configuration control module in various embodiments to evaluate the performance of the IQUS configuration in the minimal form for a treatment and to update that configuration if needed. However, the IQUS minimal configuration control module in other embodiments may not be invoked by the IQUS configuration control module, but may instead be invoked by a different module or independently as a stand-alone module.

Here, the process begins with the IQUS minimal configuration control module assessing the performance of the single minimal form queue on achieving its overall service level requirement and assessing the performance of the single minimal form queue on achieving the service level requirements for each non-chaining channel in Operation 2710. In particular embodiments, the IQUS minimal configuration control module performs this operation by invoking the queue performance module previously discussed (FIG. 23).

Next the IQUS minimal configuration control module reviews the results of Operation 2710 and determines if either the overall service level requirement for the minimal form queue or if any of the channel service level requirements for the minimal form queue are not satisfied in Operation 2715. If it is determined that one or more of these service level requirements for the minimal form queue is not satisfied, then the IQUS minimal configuration control module reports those overload conditions in Operation 2720 and completes its execution. In particular embodiments, the IQUS minimal configuration control module control reports overload conditions only when the overall service level requirement for the minimal form queue is not satisfied. The reader may recall that this was discussed earlier, and an example of when reporting only total queue overload is appropriate would be when there are one or more non-chaining channels with high communication arrival rates and also one or more non-chaining channels with much lower communication arrival rates.

On the other hand, if all the service level requirements for the minimal form queue are found to be satisfied in Operation 2715, then the IQUS minimal configuration control module determines if the set of agents channel-assigned to the minimal form queue for the non-chaining channels exceeds the number needed to satisfy all the service level requirements for that queue in Operation 2725. If the set of agents channel-assigned to the minimal form queue for the non-chaining channels does not exceed the number needed to satisfy all the service level requirements for that queue, then the IQUS minimal configuration control module completes its execution.

However, if the IQUS minimal configuration control module determines in Operation 2725 that the set of agents channel-assigned to the minimal form queue for the non-chaining channels exceeds the number needed to satisfy all the service level requirements for that queue, then the IQUS minimal configuration control module in particular embodiments may transition the IQUS for the treatment from steady state mode to update mode in Operation 2730. The mode transition is performed in preparation for creating and placing into operation a new IQUS configuration.

Figure 30:
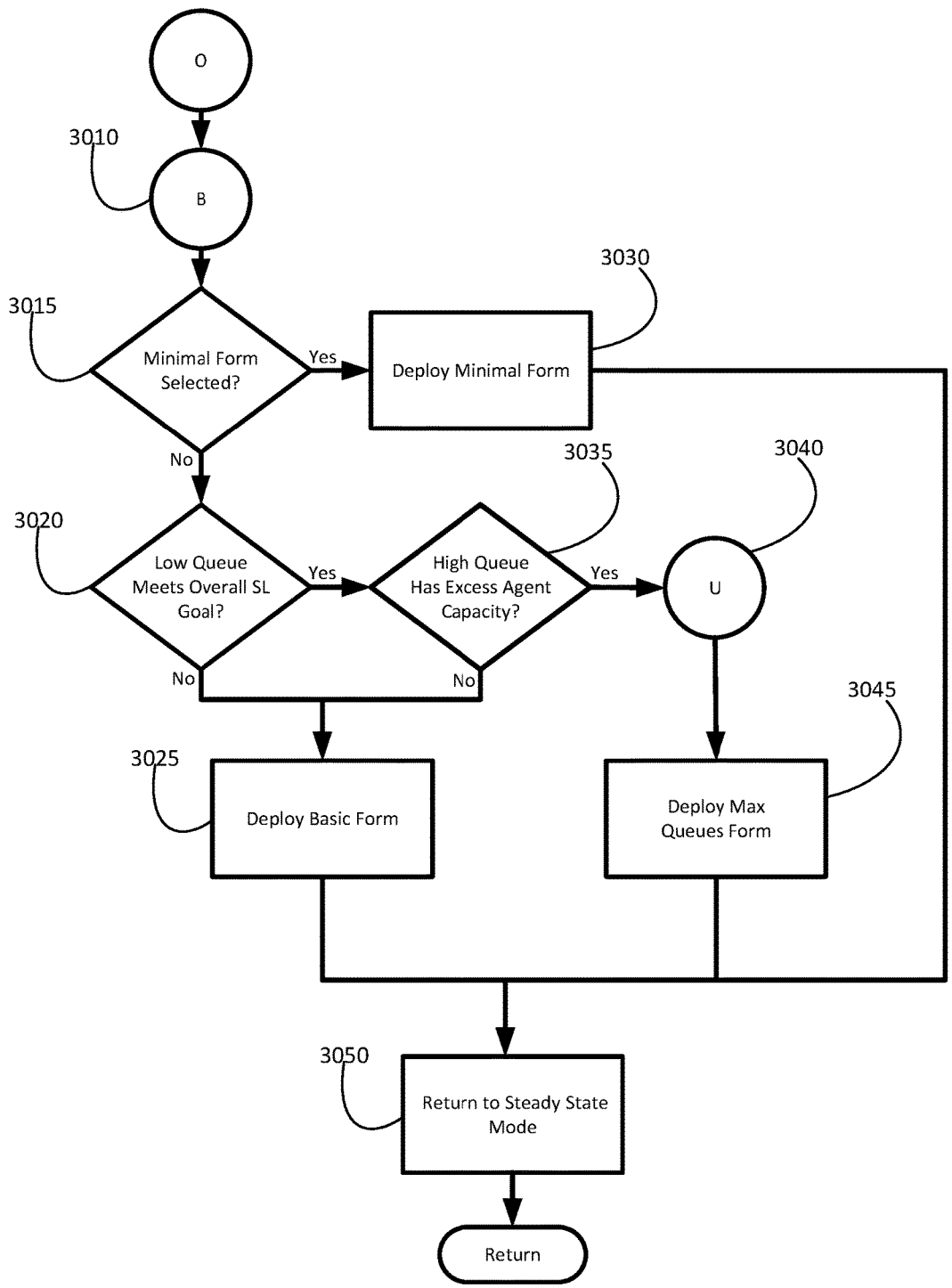
FIG. 30 illustrates a process flow for evaluating the performance of a treatment in a steady state mode with respect to its non-chaining channels and updating the currently operating IQUS configuration in accordance with various embodiments of the present invention.

Following transition of the IQUS to update mode, a new IQUS configuration is defined and deployed in particular embodiments to replace the prior configuration, and the IQUS is transition back to steady state mode in Operation 2735. Specifically, the IQUS minimal configuration control module performs this operation in particular embodiments by invoking an IQUS update module (FIG. 30).

Accordingly, the resulting new configuration of the IQUS may be in the minimal form, the basic form, or the general form. For example, if the new configuration is in the minimal form, this indicates that Operation 2735 determined that the excess number of agents beyond what was needed for the prior minimal form configuration proved to be inadequate to allow use of the IQUS basic form. At this point the IQUS minimal configuration control module completes its execution.

IQUS Basic Configuration Control Module

FIG. 28 provides additional details regarding a process flow for controlling the configuration of a treatment in a basic form with respect to non-chaining channels according to various embodiments of the invention. In particular, FIG. 28 is a flow diagram showing an IQUS basic configuration control module for performing such functionality according to various embodiments of the invention. For example, the flow diagram shown in FIG. 28 may correspond to operations carried out by one or more processors in one or more components, such as, for example, the communications handler 150 described above, as it executes the IQUS basic configuration control module stored in the component's volatile and/or nonvolatile memory.

As mentioned above, the IQUS basic configuration control module may be invoked by the IQUS configuration control module in various embodiments to evaluate the performance of the IQUS configuration in the basic form for a treatment and to update that configuration if needed. However, the IQUS basic configuration control module in other embodiments may not be invoked by the IQUS configuration control module, but may instead be invoked by a different module or independently as a stand-alone module.

The process begins with the IQUS basic configuration control module reading the information for the treatment in Operation 2810. Again, the IQUS configuration control module may provide the information to the IQUS basic configuration control module or the IQUS basic configuration control module may retrieve the information from some storage media.

Next, the IQUS basic configuration control module determines if the high queue of the IQUS configuration for the treatment meets its stability requirement in Operation 2815. The nature of the stability requirement and the determination of when it is satisfied was discussed earlier herein. If it is determined in Operation 2815 that the high queue stability requirement is not satisfied, then the IQUS basic configuration control module may transition the IQUS from steady state mode to update mode in Operation 2835. The mode transition is performed in preparation for creating and placing into operation a new IQUS configuration.

Following transition of the IQUS to update mode, a new IQUS configuration is defined and deployed in particular embodiments to replace the prior configuration, and the IQUS is transitioned back to steady state mode in Operation 2840. The IQUS basic configuration control module performs this operation in particular embodiments by invoking an IQUS update module (FIG. 30). The resulting new configuration of the IQUS may be in the minimal form, the basic form, or the general form. For example, if the new configuration is in the minimal form, this indicates that Operation 2840 determined the requirements for the IQUS basic form could not be satisfied. On the other hand, if the new configuration is in the general form (3 or more queues), this indicates that Operation 2840 determined all the general form requirements could be satisfied. At this point the IQUS basic configuration control module completes its execution.

Returning to Operation 2815, if IQUS basic configuration control module determines that the basic form high queue's stability requirement is satisfied, then the module selects the high queue in Operation 2820. The IQUS basic configuration control module then assesses the performance of the basic form high queue on achieving its overall service level requirement and service level requirement for each non-chaining channel in Operation 2825. In particular embodiments, the IQUS basic configuration control module performs this operation by invoking the queue performance module previously discussed (FIG. 23).

Next, the IQUS basic configuration control module reviews the results of Operation 2825 and determines if either the overall service level requirement for the basic form high queue or any of the channel service level requirements for the basic form high queue are not satisfied in Operation 2830. If any of these service level requirements for the high queue is not satisfied, then the IQUS basic configuration control module may transition the IQUS from steady state mode to update mode in Operation 2835. In particular embodiments, a new IQUS configuration may be defined and deployed to replace the prior configuration, and the IQUS is transitioned back to steady state mode by the IQUS basic configuration control module in Operation 2840. As already mentioned, the IQUS basic configuration control module performs this operation in particular embodiments by invoking an IQUS update module (FIG. 30). At this point the execution of the IQUS basic configuration control module is completed.

The approach taken when some channel service level requirements are not met may be relaxed to some degree in particular embodiments. For example, such an approach may be appropriate if there are one or more non-chaining channels with high communication arrival rates while at the same time there are one or more non-chaining channels with much lower communication arrival rates. In this case it may be more effective to permit the failure of the lower communication arrival rate channels to meet their service level requirements for the high queue without penalty. This will allow considerably greater flexibility to increase the number of IQUS queues and will avoid allowing a relatively small volume of non-chaining communications to restrict use of an optimal approach for the vast majority of non-chaining communications. Increasing the number of IQUS queues improves the effectiveness of the IQUS in various embodiments in matching agents to communications based on communication value and agent ranking, and also decreases the queue wait times for higher value communications.

Returning now to Operation 2830, if the IQUS basic configuration control module instead determines that the overall service level requirement for the high queue and all the channel service level requirements for the high queue are satisfied, then IQUS basic configuration control module determines if the basic form low queue has no agents assigned for any of the non-chaining channels in Operation 2845. If that is the case, then the IQUS basic configuration control module proceeds to transition the IQUS from steady state mode to update mode in Operation 2835. Accordingly, in particular embodiments, a new IQUS configuration is defined and deployed to replace the prior configuration, and the IQUS is transitioned back to steady state mode by the IQUS basic configuration control module in Operation 2840.

Returning to Operation 2845, if instead the IQUS basic configuration control module determines that one or more agents are assigned to the low queue for one or more non-chaining channels, then the IQUS basic configuration control module selects the basic form low queue in Operation 2850. Next, the IQUS basic configuration control module assesses the performance of the basic form low queue on achieving its overall service level goal and the service level goal for each non-chaining channel in Operation 2855. Again, the IQUS basic configuration control module performs this operation in particular embodiments by invoking the queue performance module previously discussed (FIG. 23).

At this point, the IQUS basic configuration control module determines if the overall service level goal and the service goals for all channels are satisfied for the low queue in Operation 2860. If the IQUS basic configuration control module determines that either the overall service level goal or one of the channel service goals is not satisfied, then, as in prior cases, the IQUS basic configuration control module transitions the IQUS to update mode in Operation 2835, and creates and deploys a new configuration and transitions back to steady state mode in Operation 2840.

However, if instead the IQUS basic configuration control module determine the overall service level goal and the service goals for all channels are satisfied for the low queue, then the IQUS basic configuration control module determine if the high queue has more agents assigned than are needed to satisfy its stability requirement, its overall queue service level requirement, and its channel service level requirements in Operation 2865. If it determined that there is an excess of agents in Operation 2865, then, as in prior cases, the IQUS basic configuration control module transitions the IQUS to update mode in Operation 2835, creates and deploys a new configuration and transitions back to steady state mode in Operation 2840.

However, if instead the IQUS basic configuration control module determines the high queue does not have more agents assigned than are needed to satisfy its stability requirement, its overall queue service level requirement, and its channel service level requirements, then the IQUS basic configuration control module completes its execution.

IQUS General Configuration Control Module

As the reader may recall, the IQUS configuration of a treatment that is in the general form includes more than two queues. Here, instead of having only a low queue and a high queue, the general form has a lowest queue and two or more higher queues. In various embodiments, a common lowest queue percentage of total communication volume is assumed for all the non-chaining channels supported by the treatment.

Accordingly, the range of application of the lowest queue, and the collective range of application of the set of higher queues can be defined by: (1) computing a separate high-low boundary for each non-chaining channel, based on the common lowest queue percentage and that channel's communication value distribution; (2) dividing the range of values of a channel's communication value distribution for each channel into two communication value intervals such that those communications whose values are higher than the channel's high-low boundary are in the channel's high interval and those whose communication values not higher than the channel's high-low boundary are in the channel's low interval; and (3) the lowest queue handles each non-chaining communication whose communication value is in the low interval for its channel, and the set of higher queues collectively handle each non-chaining communication whose communication value is in the high interval for its channel.

Thus, the lowest queue for the general form is essentially the same as the low queue for the basic form. Regardless of the number of higher queues, the definition of the range of application of the lowest queue for each non-chaining channel remains the low interval for that channel. While a separate range of application for each channel is defined for each of the higher queues by: (1) denoting the number of higher queues by H; (2) dividing each non-chaining channel's high interval of communication values into H subintervals 1, 2, . . . , H, where subinterval 1 is the lowest, subinterval 2 is the next lowest, and so on until subinterval H is the highest; and (3) handling each communication with a communication value in subinterval 1 by higher queue 1 (the next-to-lowest queue), in subinterval 2 by higher queue 2, and so on until (H) handling each communication with a communication value in subinterval H by higher queue H (the highest queue). Thus, each higher queue handles a combination of subintervals, one for each non-chaining channel supported by the treatment.

In various embodiments, each queue of the general form is a priority queue. The standard priority value of a communication in any of the queues is the product of its communication value and the length of time the communication has waited in the queue. In particular embodiments, an alternate version of the standard priority value is the product of the communication value and the sum of the length of time the communication was in the contact center prior to entering the queue and the length of time the communication has been waiting in the queue.

Generally speaking, in various embodiments, the lowest queue plays the same role as the low queue of the basic form. That is to say, the lowest queue has no stability requirement, a queue-level service level goal rather than a service level requirement, and a service level goal per channel rather than a service level requirement. While each of the higher queues has a stability requirement, a queue-level service level requirement, and a service level requirement per channel. For each channel of the higher queues in particular embodiments, the service level requirement for each channel is always at least as stringent as the corresponding channel service level requirement (or goal) of the queue just below it. In some embodiments, for the IQUS configuration in the general form for a treatment, there will be two primal service level requirements and one service level goal per channel. The service level goal of each channel applies to the lowest queue only. The first primal service level requirement is used for the lowest of the higher queues and the second primal service level requirement is used for the highest of the higher queues. Accordingly, in various embodiments, the service level requirements for the higher queues that lie between the lowest of the higher queues and the highest of the higher queues are obtained by some form of interpolation between the requirements of the lowest and highest queues.

When a treatment supports two or more non-chaining channels, then the standard priority values for each non-chaining channel and for each general form queue must be modified to allow a unified assessment of the overall performance on the service level requirements for that queue. One of the channels is selected as the reference channel from all the non-chaining channels. For instance, the reference channel may be the channel with the highest percentage of communication volume for the treatment, or as the channel with the most stringent service level requirement. For each of the remaining channels, compute the ratio F of the service level requirement (e.g., the wait time threshold) of that channel to the service level requirement of the reference channel, and reset the priority value of each communication of that channel to be the ratio of its standard priority value to F. This approach causes the communications of channels with less stringent service level requirements (e.g., higher wait time thresholds) to move through the queue more slowly than the communications of channels with more stringent requirements.

In various embodiments, each treatment agent has a separate ranking for each non-chaining channel the agent handles. Accordingly, each agent who handles a particular non-chaining channel for the treatment is channel-assigned to one of the general form queues based on their ranking for that channel. This assignment is made in a manner that ensures that, for each channel and each queue other than the lowest queue, agents who are channel-assigned to a queue all are higher in that channel's ranking than the agents who are channel-assigned to the queue immediately below it.

Thus, in particular embodiments, a process is used for each queue and each non-chaining channel to align that queue's channel-assigned agents to a range of communication values based on their ranking. This process involves: (1) determining the number C of agents currently channel-assigned to the queue; (2) splitting the range of the channel's communication value distribution for the queue into C intervals with each of the intervals having approximately the same percentage of total communication volume for the channel (percentage=100/C); and (3) associating each of those C channel-assigned agents with one of the communication value intervals by assigning the highest ranking agent to the highest interval, the second highest ranking agent to the second highest interval, and so forth. This mapping of the channel-assigned agents of a queue per channel to the channel's communication value intervals of the queue based on ranking in particular embodiments is used in part to determine which agent to connect to a communication that reaches the top of the queue.

Accordingly, it becomes necessary in particular embodiments for agent resources to be moved from one queue to another in response to operational conditions. In these particular embodiments, agent resources are moved separately for each channel, and are generally moved between adjacent queues that share a common communication value boundary. Here, when agents are moved between two adjacent queues, they are generally moved in adherence to the rule that agents who are channel-assigned to a queue all are higher in that channel's ranking than the agents who are channel-assigned to the queue immediately below it.

Generally speaking, a treatment is normally started up in the basic form, even though the treatment may have been configured in a general form when it was previously in operation. Here, in particular embodiments, the service level requirement for each channel for the high queue of the basic form is set to the channel's service level requirement for the highest queue and the service level goals for the channels for the low queue are set to the service level goals for the lowest queue. Accordingly, the two-queue configuration of the basic form is constructed during use of the startup mode of the IQUS and is then deployed to operate in steady state mode to handle the IQUS communications for the treatment at the beginning of a workday. Following that deployment, when operational conditions indicate it is needed, the IQUS may be transitioned to update mode and a general form configuration may be constructed to determine the maximum number of queues that can be used for the treatment. If the number of queues is greater than two, then the general form configuration is deployed in place of the basic form configuration, and the IQUS transitions back to a steady state mode.

During steady state, operational conditions may evolve that affect the performance of a treatment and accordingly, warrant changing the queue configuration of the treatment. (Recall FIG. 27.) Thus, in various embodiments, when the queue configuration of a treatment is changed, the treatment enters an update mode and the number of queues for the treatment may be increased or decreased based on the performance of the treatment affected by the current operational conditions of the contact center.

Turning now to FIG. 29, this figure provides additional details regarding a process flow for evaluating the performance of a general form configuration of the IQUS for a treatment with respect to non-chaining channels according to various embodiments of the invention. In particular, FIG. 29 is a flow diagram showing an IQUS general configuration control module for performing such functionality according to various embodiments of the invention. For example, the flow diagram shown in FIG. 29 may correspond to operations carried out by one or more processors in one or more components, such as, for example, the communications handler 150 described above, as it executes the IQUS general configuration control module stored in the component's volatile and/or nonvolatile memory.

As mentioned above, the IQUS general configuration control module may be invoked by the IQUS configuration control module in various embodiments to evaluate the performance of the IQUS configuration in the general form for a treatment and to update that configuration if needed. However, the IQUS general configuration control module in other embodiments may not be invoked by the IQUS configuration control module, but may instead be invoked by a different module or independently as a stand-alone module.

The process begins with the IQUS general configuration control module reading the information for the treatment in Operation 2910. Again, the IQUS configuration control module may provide the information to the IQUS general configuration control module or the IQUS general configuration control module may retrieve the information from some storage media.

Next, the IQUS general configuration control module selects the lowest queue in Operation 2915. This done to set up iterative processing through all the higher queues. Then the IQUS general configuration control module selects the queue adjacent to and higher than the currently selected queue in Operation 2920. Initially, this operation results in selection of the next-to-lowest queue, which is the lowest of the higher queues. Following the queue selection, the IQUS general configuration control module determines if the stability requirement for the selected queue is currently satisfied in Operation 2925. If the IQUS general configuration control module determines the stability requirement is not satisfied, then the IQUS general configuration control module transitions the IQUS to update mode in Operation 2945, in preparation for constructing and deploying a new IQUS configuration.

Following transition of the IQUS to update mode, a new IQUS configuration is defined and deployed in various embodiments to replace the prior configuration, and the IQUS is transitioned back to steady state mode in Operation 2950. The IQUS general configuration control module performs this operation in particular embodiments by invoking an IQUS update module (FIG. 30). The resulting new configuration of the IQUS may be in the minimal form, the basic form, or the general form. For example, if the new configuration is in the minimal form, then a determination was made the requirements for the IQUS basic form could not be satisfied. On the other hand, if the new configuration is in the general form (3 or more queues), then a determination was made all the general form requirements could be satisfied. At this point the IQUS general form configuration control module completes its execution.

Returning to Operation 2925, if instead the IQUS general configuration control module determines that the stability requirement of the selected higher queue is satisfied, then the IQUS general configuration control module assesses the performance of the selected higher queue on achieving its overall service level requirement and service level requirement for each non-chaining channel in Operation 2930. In particular embodiments, the IQUS general configuration control module performs this operation by invoking the queue performance module previously discussed (FIG. 23).

Next, the IQUS general configuration control module reviews the results and determines if either the overall service level requirement or the channel service level requirements for the selected higher queue is not satisfied in Operation 2935. If any of these service level requirements for the selected higher queue is not satisfied, then the IQUS general configuration control module transitions the IQUS from steady state mode to update mode in Operation 2945. At this point, as previously discussed, a new IQUS configuration may be defined and deployed to replace the prior configuration, and the IQUS may transition back to steady state mode.

Depending on the embodiment, the approach taken when one or more channel service level requirements are not met may be relaxed to some degree. For example, such an approach may be appropriate if there are one or more non-chaining channels with high communication arrival rates, while at the same time there are one or more non-chaining channels with much lower communication arrival rates. In this instance, it may be more effective to permit the failure of the lower communication arrival rate channels to meet their service level requirements for the higher queues without penalty. Such an approach can provide considerably greater flexibility to increase the number of IQUS queues and avoid allowing a relatively small volume of non-chaining communications to restrict use of an optimal approach for the vast majority of non-chaining communications. Generally, increasing the number of IQUS queues improves the effectiveness of the IQUS in matching agents to communications based on communication value and agent ranking, and also decreases the queue wait times for higher value communications.

Returning now to Operation 2935, if instead the determination is all the service level requirements for the currently selected higher queue are currently being satisfied, then the IQUS general configuration control module determines if the selected queue is the highest queue in Operation 2940. If the selected queue is not the highest queue, then the IQUS general configuration control module returns to Operation 2920 and selects the next higher queue adjacent to and above the previously selected higher queue and repeats the operations discussed above for the newly selected higher queue. At some point, the currently selected queue is the highest queue, in which case the IQUS general configuration control module proceeds to Operation 2955 to determine if the lowest queue has no agents assigned.

If the IQUS general configuration control module determines the lowest queue has no agents assigned for any of the non-chaining channels, then module proceeds to transition the IQUS from steady state mode to update mode in Operation 2945. Accordingly, as previously discussed, a new IQUS configuration may be defined and deployed to replace the prior configuration, and the IQUS may then transition back to steady state mode.

However, if the IQUS general configuration control module determines one or more agents are assigned to the lowest queue for one or more non-chaining channels, then the module selects the lowest queue in Operation 2960 and assesses the performance of the lowest queue on achieving its overall service level goal and service level goal for each non-chaining channel in Operation 2965. In particular embodiments, the IQUS general configuration control module performs this operation by invoking the queue performance module previously discussed (FIG. 23).

At this point, the IQUS general configuration control module determines if the overall service level goal and service goals for all channels are satisfied for the lowest queue in Operation 2970. If either the overall service level goal or one of the channel service goals is not satisfied then, the IQUS general configuration control module transitions the IQUS to update mode in Operation 2945, creates and deploys a new configuration, and transitions back to steady state mode in Operation 2950.

However, if the overall service level goal and the service goals for all channels are satisfied for the lowest queue, then the IQUS general configuration control module determines if the higher queues collectively have more agents assigned than are needed to satisfy their stability requirements, their overall queue service level requirements, and their channel service level requirements in Operation 2975. If so, then the IQUS general configuration control module transitions the IQUS to update mode in Operation 2945, creates and deploys a new configuration, and transitions back to steady state mode in Operation 2950.

However, if the IQUS general configuration control module determines the higher queues collectively do not have more agents assigned than are needed to satisfy their stability requirements, their overall queue service level requirements, and their channel service level requirements, then the IQUS general form configuration control module completes its execution.

IQUS Update Module

FIG. 30 provides additional details regarding a process flow for updating a treatment with respect to its non-chaining channels according to various embodiments of the invention. In particular, FIG. 30 is a flow diagram showing an IQUS update module for performing such functionality according to various embodiments of the invention. For example, the flow diagram shown in FIG. 30 may correspond to operations carried out by one or more processors in one or more components, such as, for example, the communications handler 150 described above, as it executes the IQUS transition module stored in the component's volatile and/or nonvolatile memory.

As already discussed, the IQUS update module may be invoked by modules such as the IQUS minimal configuration control module, the IQUS basic configuration control module, and the IQUS general configuration control module in various embodiments to update the configuration of the IQUS of a treatment. However, the IQUS update module in other embodiments may not be invoked by these modules, but may instead be invoked by a different module or independently as a stand-alone module.

In various embodiments, all the IQUS queues are configured as priority queues. The standard priority value of a communication in each IQUS queue is the product of its communication value and the length of time the communication has been waiting in the queue. An alternate version of the standard priority value may be used in particular embodiments that is the product of its communication value and the sum of the length of time the communication has been connected to the contact center prior to entering the queue and the length of time the communication has been waiting in the queue.

In addition, in various embodiments, the higher queues has a service level requirement for each channel, and the lowest queue has a service level goal. For example, the service level requirement may be set for a particular channel so that the mean wait time for all communications of that channel placed in that higher queue should not exceed the wait time threshold selected for that channel for the queue. While the service level goal may be set for the same channel so that to the extent possible, the mean wait time for all communications of that channel placed in the lowest queue should be less than or equal to the wait time threshold selected for that channel for the queue.

Further, the wait time threshold selected for each queue other than the highest queue is typically never less than the wait time threshold selected for the queue immediately above (higher than) it. The reason being that higher queues provide service for communications that have communication values greater than the communications values of communications serviced by lower queues, and faster response times are generally desirable for higher queues as a result. When a stressing condition occurs, the service level goal for the lowest queue is sacrificed to support the service level requirements for the higher queues. In addition, in particular embodiments, when the lowest queue is severely under resourced, the queue may be temporarily supplemented with use of combots.

Due to changes in operational conditions for a treatment, the IQUS family of queues may need updating to allow continued support of all requirements. For example, those changes may involve the inability to meet critical requirements with the currently deployed configuration, or may involve having an excess of agent capacity beyond what is needed to meet all requirements. In some embodiments, this updating process can start with the IQUS operating in its minimal, basic, or general form. Turning now to FIG. 30, regardless of which IQUS form is currently deployed, the process begins with the IQUS update module creating a new IQUS configuration in Operation 3010 by invoking the IQUS startup module previously discussed (FIG. 10). The IQUS startup module is directed to create a new IQUS queues configuration of the basic form (two queues). The outcome of Operation 3010 is a new configuration that is either in the basic or minimal form. The minimal form is obtained when critical requirements cannot be met for the basic form.

Next, the IQUS update module determines if the minimal form was selected in Operation 3015. If the minimal form was selected, then the IQUS update module deploys a new minimal form configuration in Operation 3030 and transitions the IQUS to steady state mode in Operation 3050.

If the minimal form was not selected, then the basic form was selected. In that case the IQUS startup module (FIG. 10) has determined that the basic form high queue stability requirement and the basic form high queue channel service level requirements are all satisfied. Therefore, the IQUS update module determines if the overall service level goal of the basic form low queue is satisfied in Operation 3020. If the overall service level goal is not satisfied, then the IQUS update module deploys a new basic form configuration in Operation 3025 and transitions the IQUS to steady state mode in Operation 3050.

However, if the overall service level goal of the basic form low queue is satisfied, then the IQUS update module determines if there are significantly more agents channel-assigned to the high queue than are needed to meet is stability and overall service level requirements in Operation 3035. That is to say, in particular embodiments, the IQUS update module test determines if there are a number of agents greater than a threshold assigned to the high queue than are needed to meet its stability and overall service level requirements. If there are not significantly more agents channel-assigned to the high queue than are needed to meet those requirements, then the IQUS update module deploys a new basic form configuration in Operation 3025 and transitions the IQUS to steady state mode in Operation 3050.

If there are significantly more agents channel-assigned to the high queue than are needed to meet is stability and overall service level requirements, then the IQUS update module creates a new general form configuration in Operation 3040. The IQUS update module performs this operation in particular embodiments by invoking an IQUS general max queues module (FIG. 31). The result of this operation may be a general form configuration of the IQUS that has three or more queues is deployed, or in some cases the two queues basic form configuration may be retained because one or more critical requirements could not be satisfied with a three queue configuration. Accordingly, the IQUS update module deploys the new IQUS configuration produced in Operation 3045 and the IQUS update module transitions the IQUS to steady state mode in Operation 3050. At this point the IQUS update module has completed its execution.

IQUS General Max Queues Module

FIG. 31 provides additional details regarding a process flow for constructing a new IQUS general form configuration for a treatment that has the largest number of queues possible for a viable general form configuration according to various embodiments of the invention. In particular, FIG. 31 is a flow diagram showing an IQUS general max queues module for performing such functionality according to various embodiments of the invention. For example, the flow diagram shown in FIG. 31 may correspond to operations carried out by one or more processors in one or more components, such as, for example, the communications handler 150 described above, as it executes the IQUS general max queues module stored in the component's volatile and/or nonvolatile memory.

As previously mentioned, the IQUS general max queues module may be invoked by the IQUS update module in various embodiments to create a new IQUS configuration for a treatment with the largest number of queues possible for a viable general form configuration under current operating conditions for the treatment. However, the IQUS general max queues module in other embodiments may not be invoked by this module, but may instead be invoked by a different module or independently as a stand-alone module.

The process begins with the IQUS general max queues module reading the pertinent information for the treatment in Operation 3110. Again, a module such as the IQUS update module, for example, may provide the information to the IQUS general max queues module or the IQUS general max queues module may retrieve the information from some storage media.

Generally, the information needed in various embodiments includes the data defining the reference IQUS configuration, including the number of queues in that configuration. In some embodiments, the reference configuration provided to the IQUS general max queues module is in the IQUS basic form (2 queues). As a result, the IQUS general max queues module creates a configuration with at least two queues. In addition, in particular embodiments, the IQUS general max queues module is invoked when the reference basic form configuration meets all requirements for the high queue and the queue service level goal for the low queue, and the number of agents assigned to the high queue exceeds the number needed for the high queue to meet all its requirements. However, the excess of agents assigned to the high queue may not be enough to support the requirements of a three queue configuration and in this case, the reference basic form configuration is retained.

Figure 32:
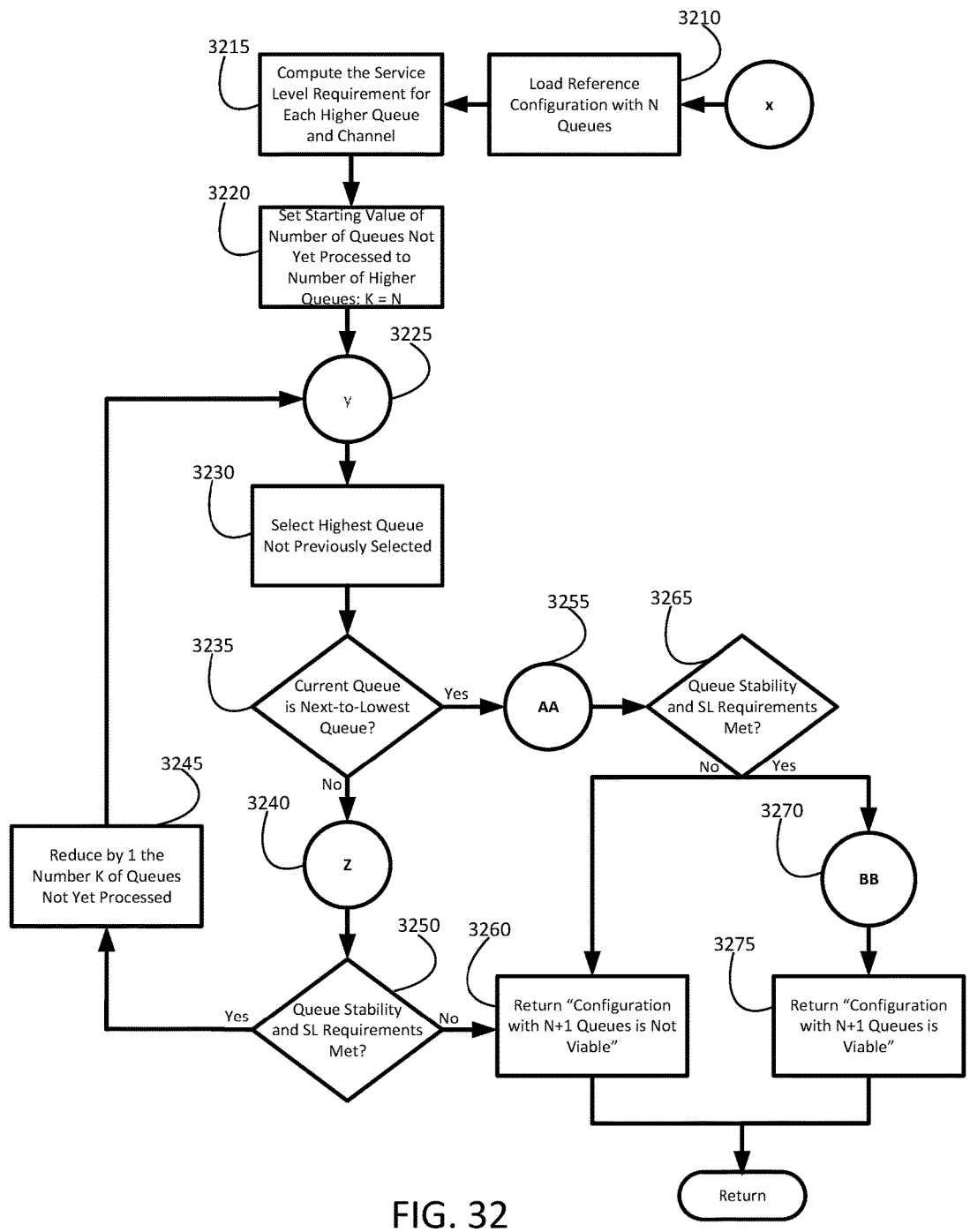
FIG. 32 illustrates a process flow for creating a new IQUS general form configuration with one more queue than a reference IQUS configuration in accordance with various embodiments of the present invention.

Once the IQUS general max queues module has obtained the pertinent information on the treatment, the IQUS general max queues module creates a new IQUS general form configuration with one more queue than the reference IQUS configuration in Operation 3115. In some embodiments, the IQUS general max queues module performs this operation by invoking an IQUS add one queue module (FIG. 32). Since the reference configuration always has at least two queues, adding one queue requires use of the general form of the IQUS (three or more queues).

Next the IQUS general max queues module determines if the new configuration with one more queue than the reference configuration is viable in Operation 3120. If it is not viable, then the module selects the reference configuration for deployment in Operation 3130. At this point the IQUS general max queues module completes its execution.

However, if the new configuration with one more queue than the reference configuration is viable, then the IQUS general max queues module resets the reference configuration to be the new configuration in Operation 3125. At this point, the IQUS general max queues module returns to Operation 3115 and creates a new IQUS general form configuration with one more queue than the newly reset reference IQUS configuration.

The process of resetting the reference configuration, creating a new IQUS configuration with one more queue than the reference configuration, and testing to see if the new configuration is viable (Operations 3125, 3115, and 3120) continues until a new configuration is reached that is not viable in Operation 3120. This results in the reference configuration being selected for deployment in Operation 3130, and the IQUS general max queues module completes its execution.

IQUS Add One Queue Module

FIG. 32 provides additional details regarding a process flow for creating a new IQUS general form configuration with one more queue than a reference IQUS configuration according to various embodiments of the invention. In particular, FIG. 32 is a flow diagram showing an IQUS add one queue module for performing such functionality according to various embodiments of the invention. For example, the flow diagram shown in FIG. 32 may correspond to operations carried out by one or more processors in one or more components, such as, for example, the communications handler 150 described above, as it executes the IQUS add one queue module stored in the component's volatile and/or nonvolatile memory.

As previously mentioned, the IQUS add one queue module may be invoked by the IQUS general max queues module in various embodiments to create a new IQUS configuration with one more queue than a reference configuration. However, the IQUS add one queue module in other embodiments may not be invoked by the IQUS general max queues module, but may instead be invoked by a different module or independently as a stand-alone module.

In some embodiments, the process of constructing a new IQUS configuration does not modify the lowest queue in any way. In particular, the service level goal, the agents channel-assigned, the communication value breakpoint defining the upper boundary of the queue communication value interval, and the percentage of total call volume handled by each channel in the lowest queue remains exactly the same as in the reference configuration. As a result, the higher queues can collectively use only the remaining agents who handle each channel that are not assigned to the lowest queue. The higher queues also collectively handle the percentage of total communication volume for each channel that is not assigned to the lowest queue.

Accordingly, the process begins with the IQUS add one queue module accessing the information defining the reference configuration in Operation 3210. For instance, depending on the embodiment, the IQUS general max queues module may provide the IQUS add one module with the following information on the reference configuration: the number of queues, the percentage of total communication volume assigned to each queue for each channel, the communication value breakpoints used to define the boundaries between adjacent queues for each channel, the identities of all the online IQUS agents channel-assigned to each queue for each non-chaining channel handled by the treatment, the channel ranking of each online IQUS agent for each non-chaining channel handled by the treatment, and the two primal service level requirements for each channel.

At this point, the IQUS add one queue module defines the service level requirement for each non-chaining channel for each of the higher queues in Operation 3215. The reader may recall that this definition process starts with the two primal service level requirements for each channel, where the more stringent primal service level requirement is associated with the highest queue and the less stringent primal service level requirement is associated with the next-to-lowest queue. The service level requirements for each channel for the remaining higher queues, those in between the highest and next-to-lowest queues, are then computed by an appropriate interpolation method between the two primal service level requirements for the channel. This results in each of the higher queues having a service level requirement for each channel which is at least as stringent as the service level requirement (or goal) for the queue directly below it.

Next, the IQUS add one queue module initializes the value of the number of higher queues in the new configuration that have not yet been processed in Operation 3220. Because the new configuration has N+1 queues, the new configuration has N higher queues. Because none of the higher queues of the new configuration have been processed at this point, the number selected in Operation 3220 is K=N.

Figure 33:
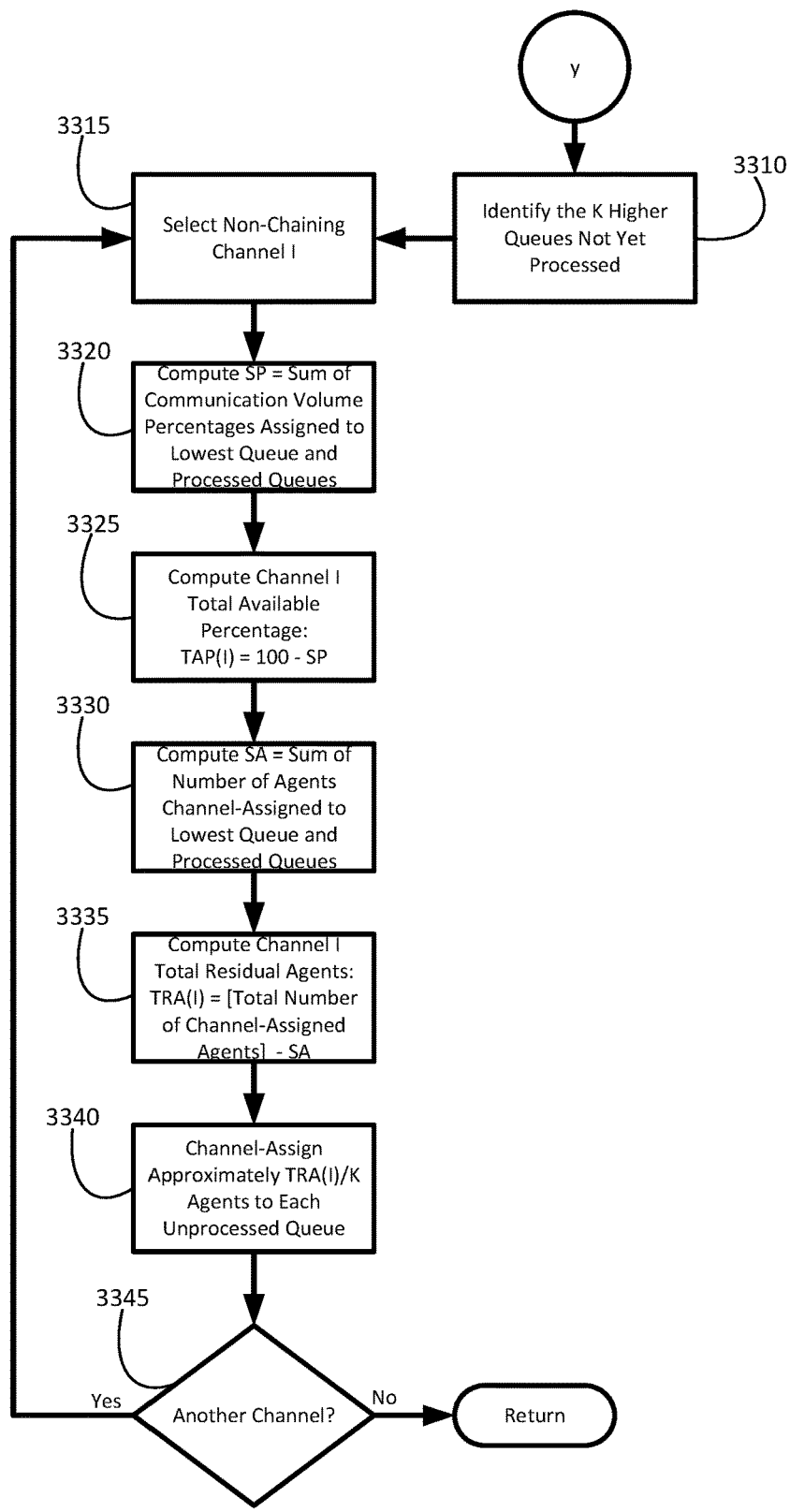
FIG. 33 illustrates a process flow for allocating for each non-chaining channel a percentage of all the remaining available agents who handle that channel to each of the unprocessed higher queues, and identifying for each channel the percentage of total communication volume of that channel that will be jointly handled by a set of unprocessed higher queues in accordance with various embodiments of the present invention.

Following the initialization, the IQUS add one queue module allocations for each channel the same percentage of all the remaining available agents to each of the unprocessed higher queues and also identifies for each channel the percentage of total communication volume that is jointly handled by the set of unprocessed higher queues in Operation 3225. In particular embodiments, this allocation process involves the use of the concepts of total residual agents (TRA) and total available percentage (TAP). For a given non-chaining channel I, TRA(I) is the difference between the total number of IQUS agents online for channel I and the number of IQUS agents online for channel I which are assigned to either the lowest queue or to one of the higher queues that has been processed. For a given non-chaining channel I, TAP(I) is the percentage of the total communication volume for channel I that remains after the sum of the percentages of total communication volume for channel I assigned to the lowest queue or to one of the processed higher queues is subtracted from 100%. The IQUS add one queue module performs this operation in particular embodiments by invoking an IQUS TRA TAP module (FIG. 33).

Next, the IQUS add one queue module selects the highest of the higher queues that has not yet been processed in Operation 3230. Initially, the highest of the higher queues that has not yet been processed is the highest queue, but for subsequent returns to Operation 3230 the highest of the higher queues that has not yet been processed is one of the higher queues below the highest queue.

Figure 34:
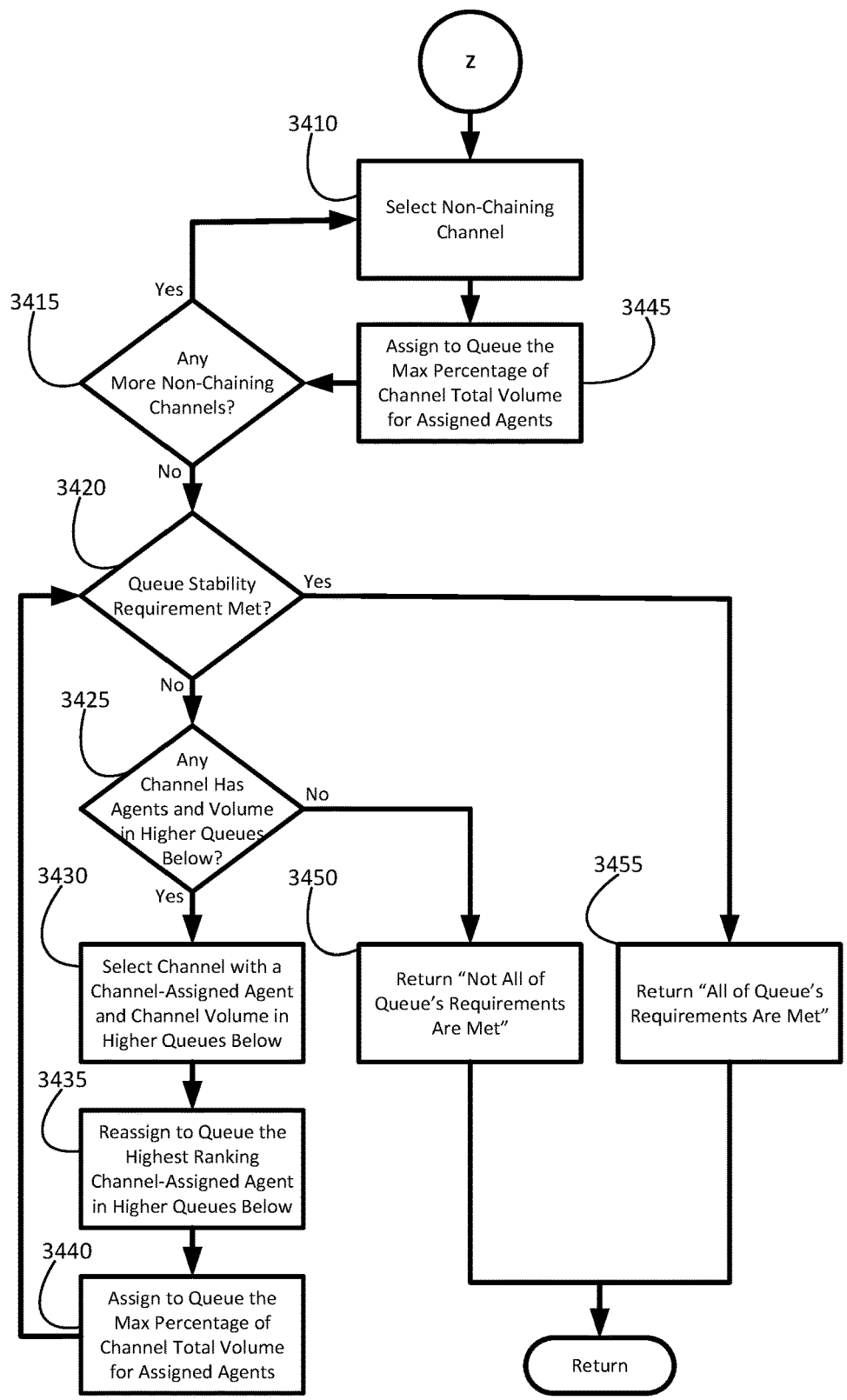
FIG. 34 illustrates a process flow for assigning a percentage of total communication volume and agents per channel to an IQUS general form higher queue in an optimal manner in accordance with various embodiments of the present invention.

At this point, the IQUS add one queue module determines if the currently selected queue is the next-to-lowest queue in Operation 3235. If it is not, then the IQUS add one queue module, for each non-chaining channel, assigns to the current queue a percentage of the total communication volume for the channel and assigns to the current queue a set of agents to handle the channel in Operation 3240. In various embodiments, this assignment process is performed in such a way that all the requirements for the current queue are satisfied, if that result is possible to achieve. Accordingly, in particular embodiments, the IQUS add one module performs this operation by invoking an IQUS queue provisioning module (FIG. 34).

Following completion of Operation 3240, the IQUS add one queue module determines if all the requirements for the current queue are satisfied in Operation 3250. Those requirements include the queue service level requirement, the channel service level requirement for each channel, and the queue stability requirement. If all of the requirements of the current queue are not satisfied, then the IQUS add one queue module creates a message indicating the new configuration with one additional queue is not viable in Operation 3260.

However, if all the requirements for the current queue are satisfied, then the IQUS add one queue module reduces the number of higher queues not yet processed by one in Operation 3245. At this point, the IQUS add one queue module returns to Operation 3225 again to re-compute TRA and TAP for each channel and to allocate the remaining agents for each channel to the remaining higher queues that have not been processed. The IQUS add one queue module then repeats Operations 3230 thru 3245. The process of repeating these operations continues until the next-to-lowest queue is detected in Operation 3235 or until a determination is made in Operation 3250 that not all the requirements of the currently selected queue are satisfied.

Figure 35:
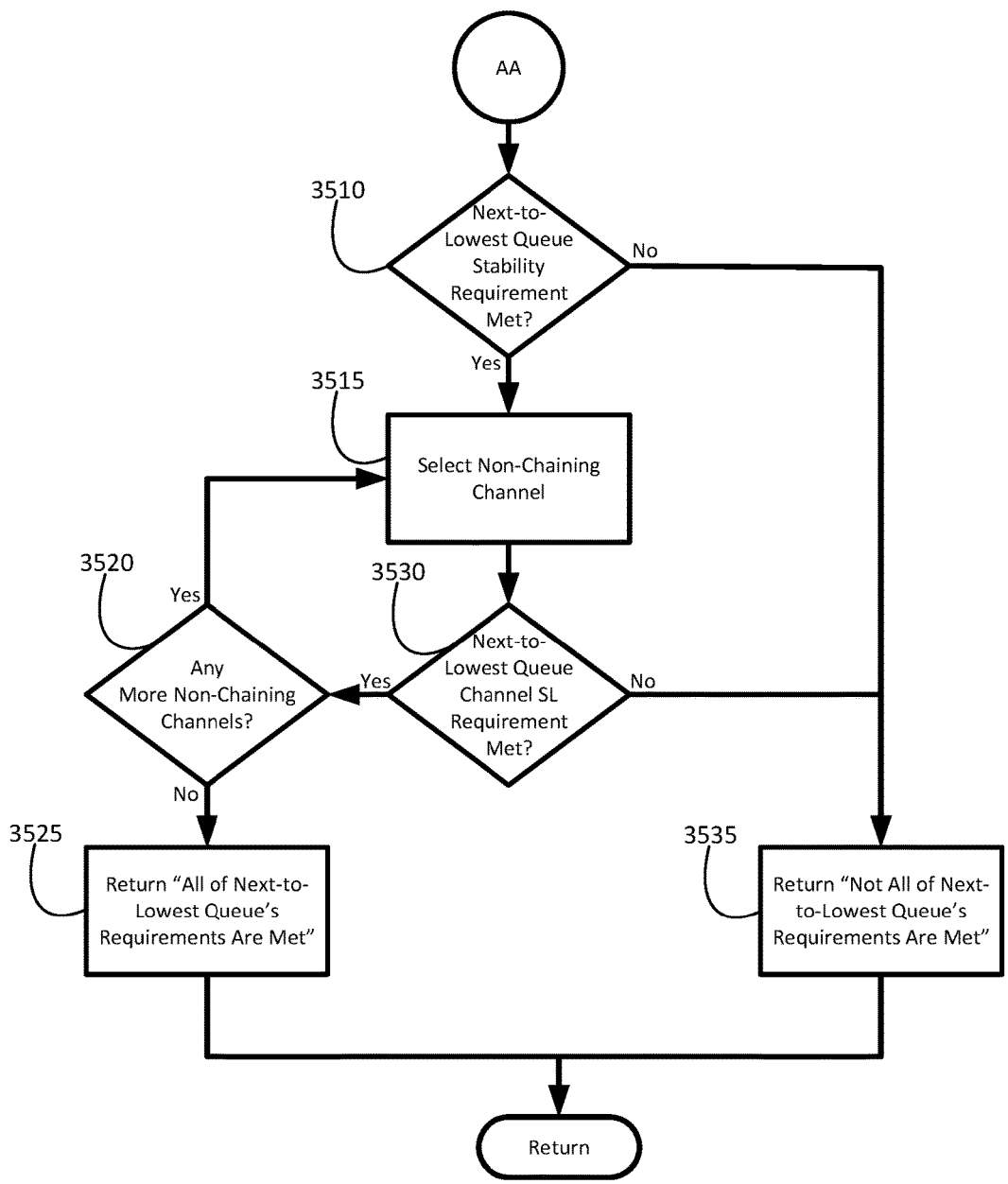
FIG. 35 illustrates a process flow for determining if all the requirements for a next-to-lowest queue of an IQUS configuration are satisfied in accordance with various embodiments of the present invention.

On the other hand, if the repeated sequence of operations halts because a determination is made in Operation 3235 that the currently selected queue is the next-to-lowest queue, then the IQUS add one queue module assesses the performance on each of the requirements of the next-to-lowest queue in Operation 3255. In particular embodiments, the IQUS add one queue module performs this operation by invoking an IQUS next-to-lowest queue module (FIG. 35).

After processing all of the higher queues above the next-to-lowest queue, a set of agents and a percentage of the total communication volume will remain for each channel to handle for the next-to-lowest queue. However, the agents assigned to the next-to-lowest queue may prove to be inadequate to handle all the service level requirements of the next-to-lowest queue, or the stability requirement for the next-to-lowest queue may not be satisfied. Therefore, the IQUS add one queue module determines if all the requirements of the next-to-lowest queue are satisfied in Operation 3265. If they are not satisfied, then the IQUS add one queue module creates a message indicating the new configuration with one additional queue is not viable in Operation 3260.

Figure 36:
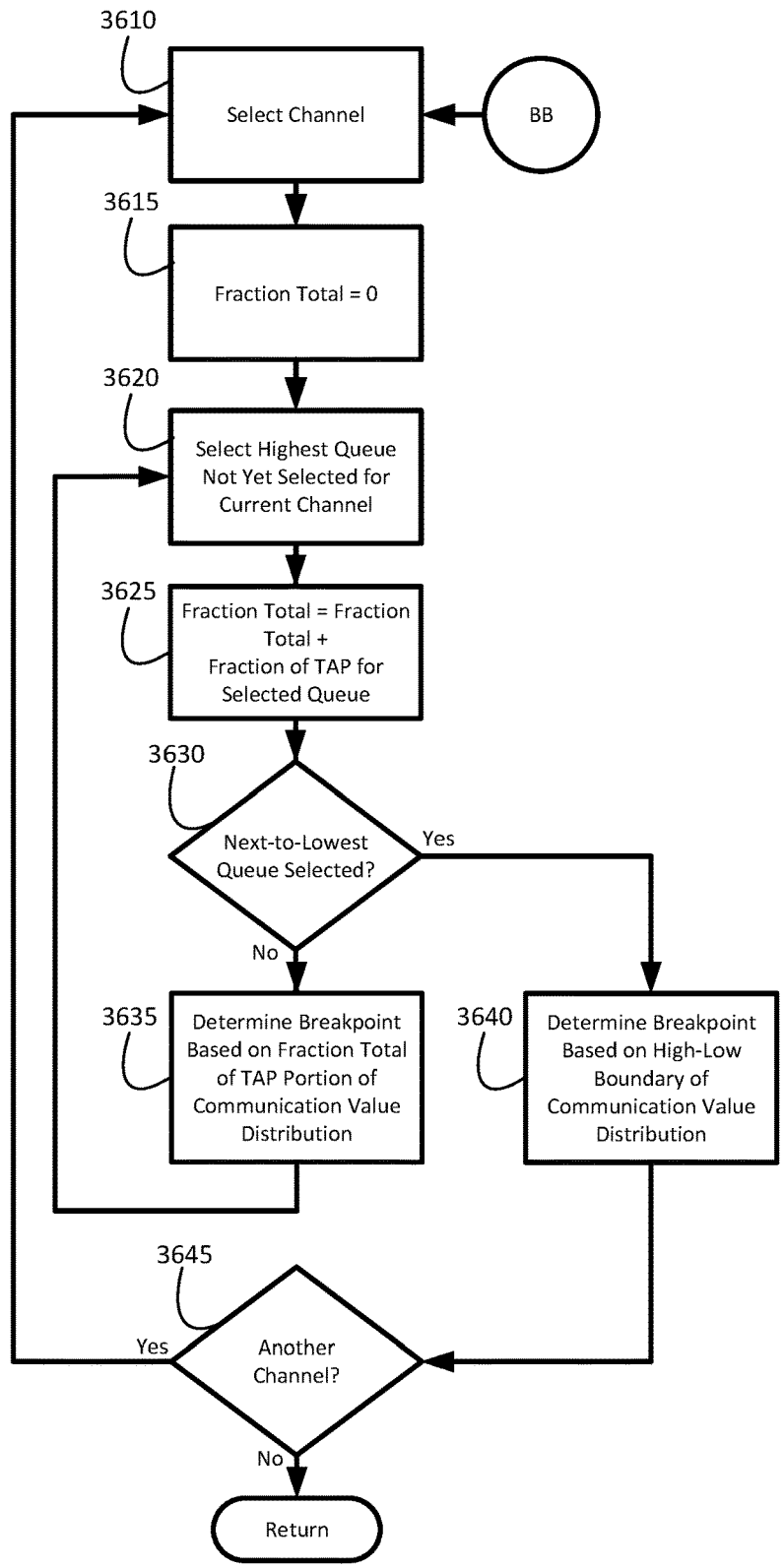
FIG. 36 illustrates a process flow for determining the breakpoints between the IQUS queues of a treatment in accordance with various embodiments of the present invention.

However, if all the requirements of the next-to-lowest queue are satisfied, then the IQUS add one queue module computes the communication value breakpoints for each channel, which define the lower boundary for each of the higher queues above the next-to-lowest queue for that queue and channel in Operation 3270. Specifically, in particular embodiments, the IQUS add one queue module performs this operation by invoking an IQUS breakpoints module (FIG. 36). Accordingly, those communication value breakpoints are chosen for each channel based on the percentage of total communication volume assigned for that channel to each of the higher queues above the next-to-lowest queue.

Finally, the IQUS add one queue module creates a message indicating the new configuration with one additional queue is viable in Operation 3275. Following completion of this operation, the IQUS add one queue module completes its execution.

IQUS TRA TAP Module

FIG. 33 provides additional details regarding a process flow for allocating for each non-chaining channel a percentage of all the remaining available agents who handle that channel to each of the unprocessed higher queues, and identifying for each channel the percentage of total communication volume of that channel that will be jointly handled by a set of unprocessed higher queues according to various embodiments of the invention. In particular, FIG. 33 is a flow diagram showing an IQUS TRA TAP module for performing such functionality according to various embodiments of the invention. For example, the flow diagram shown in FIG. 33 may correspond to operations carried out by one or more processors in one or more components, such as, for example, the communications handler 150 described above, as it executes the IQUS TRA TAP module stored in the component's volatile and/or nonvolatile memory.

As previously mentioned, the IQUS TRA TAP module may be invoked by the IQUS add one queue module in various embodiments to allocate a percentage of all the remaining available agents for each non-chaining channel handling that channel to each of the unprocessed higher queues and to identify the percentage of total communication volume for each channel that is jointly handled by a set of unprocessed higher queues. However, the IQUS TRA TAP module in other embodiments may not be invoked by the IQUS add one queue module, but may instead be invoked by a different module or independently as a standalone module.

Also, as previously mentioned, the IQUS add one queue module attempts to construct a new IQUS configuration with one more queue than a reference IQUS configuration. The higher queues are constructed starting first with the highest queue, then second highest queue, and so forth until the lowest of the higher queues (the next-to-lowest queue) is reached. During this process, the available agents and the remaining percentages of total communication volume need to be determined each time one of the higher queues is assigned a percentage of the total communication volume for each non-chaining channel and provided a set of agents for each non-chaining channel who handle that channel for the assigned percentage of total communication volume.

Accordingly, in particular embodiments, this determination process may involve the use of the variables total residual agents (TRA) and total available percentage (TAP). For a given non-chaining channel I, TRA(I) is the difference between the total number of IQUS agents online for channel I and the number of IQUS agents online for channel I which are assigned to either the lowest queue or to one of the higher queues that has been processed. For a given non-chaining channel I, TAP(I) is the percentage of the total communication volume for channel I that remains after the sum of the percentages of total communication volume for channel I assigned to the lowest queue or to one of the processed higher queues is subtracted from 100%.

Turning now to FIG. 33, the process begins with the IQUS TRA TAP module determining the set of K higher queues that has not yet been processed in Operation 3310. If N is the number of higher queues and K is the number of higher queues not yet processed, then the number of higher queues that have been process is N–K. As a result, the K unprocessed higher queues are queues N–K–1 through queue 2 (the next-to-lowest queue). Depending on the embodiment, the IQUS add one queue module may identify for the IQUS TRA TAP module the set of unprocessed higher queues or the IQUS TRA TAP module may extract that information from some storage media.

Next the IQUS TRA TPA module selects a non-chaining channel I in Operation 3315. After channel selection, the IQUS TRA TAP module computes the sum SP of the percentage of total communication volume assigned to the lowest queue for the selected channel (channel I) and the percentages of total communication volume assigned to each of the processed higher queues for the selected channel in Operation 3320. At this point, the IQUS TRA TPA module computes the TAP(I) for channel I that is shared by the unprocessed higher queues as 100—SP in Operation 3325.

Accordingly, the IQUS TRA TPA module then computes the sum SA of the number of agents channel-assigned to the lowest queue for channel I and the number of agents channel-assigned to each of the processed higher queues for channel I in Operation 3330. Following Operation 3330, the IQUS TRA TAP module computes the TRA(I) of channel I agents to be shared across the set of unprocessed higher queues as the difference between the total number of online agents that handle channel I and the previously defined quantity SA in Operation 3335.

Next, the IQUS TRA TPA module splits the TRA(I) evenly across the K unprocessed higher queues in Operation 3340. For instance, the module performs this operation in particular embodiments by dividing TRA(I) by K. If there are any agent count left over from this division, then those remaining agents are assigned one at a time, first to the highest unprocessed queue, then to the next highest unprocessed queue, and so forth until all the remaining agents are assigned to one of the unprocessed higher queues. In general, the process of agent assignment in particular embodiments follows the rule that all the agents assigned for channel I to a given higher queue will be higher ranked than any of the agents assigned for channel I for a queue below that higher queue.

At this point, the IQUS TRA TPA module determines if there are any additional non-chaining channels to process in Operation 3345. If there are, then the IQUS TRA TPA module returns to Operation 3315, selects another non-chaining channel, and repeated the process described above for the newly selected channel. Once the IQUS TRA TPA module has processed all the non-chaining channels for the treatment, the IQUS TRA TPA module completes its execution.

IQUS Queue Provisioning Module

FIG. 34 provides additional details regarding a process flow for assigning a percentage of total communication volume and agents per channel to an IQUS general form higher queue in an optimal manner according to various embodiments of the invention. In particular, FIG. 34 is a flow diagram showing an IQUS queue provisioning module for performing such functionality according to various embodiments of the invention. For example, the flow diagram shown in FIG. 34 may correspond to operations carried out by one or more processors in one or more components, such as, for example, the communications handler 150 described above, as it executes the IQUS queue provisioning module stored in the component's volatile and/or nonvolatile memory.

As previously mentioned, the IQUS queue provisioning module may be invoked by the IQUS add one queue module in various embodiments to provision a single higher queue, per non-chaining channel, with a portion of total communication volume and agents in an IQUS configuration. However, the IQUS queue provisioning module in other embodiments may not be invoked by the IQUS add one queue module, but may instead be invoked by a different module or independently as a stand-alone module.

Here, the process begins with the IQUS queue provisioning module selecting a non-chaining channel in Operation 3410. A set of agents has already been channel-assigned to the queue for the selected channel, however no portion of the total communication volume for the selected channel has been assigned for the queue to handle. Therefore, the IQUS queue provisioning module determines the largest portion of the total available percentage (that is, of TAP(I) for the selected channel I) that can be assigned to the queue while still allowing the channel's service level requirement to be satisfied with the assigned set of agents in Operation 3445.

However, it may occur that all of the channel's total available percentage is less than the percentage of total communication volume for the channel that can be handled by the assigned agents while meeting the channel's service level requirement. When that occurs in particular embodiments, the entirety of the channel's total available percentage is assigned to the queue in Operation 3445 (not shown in FIG. 34).

Next, the IQUS queue provisioning module determines if there are any remaining non-chaining channels in Operation 3415. If so, then the IQUS queue provisioning module repeats Operations 3410 and 3445 for another non-chaining channel until all of the non-chaining channels have been processed.

At that point, the IQUS queue provisioning module determines if the stability requirement for the queue is satisfied in Operation 3420. The reader may recall that a major factor in assessing the performance of the queue based on the stability requirement is the communication arrival rate for the queue. That is, the combination of the communication arrival rate for the queue of all the non-chaining channels. If the IQUS queue provisioning module determines that the stability requirement of the queue is satisfied, then the module identifies that all the requirements of the queue are satisfied in Operation 3455.

However, if instead the IQUS queue provisioning module determines the stability requirement of the queue is not yet satisfied, then the module determines in Operation 3425 whether there is any non-chaining channel for which the following two conditions are met: (a) there are one or more channel agents still assigned to any of the higher queues below the higher queue currently being provisioned, and (b) any portion of the channel's total communication volume is still assigned to any of the higher queues below the higher queue currently being provisioned. If that is not the case, then the IQUS queue provisioning module provides a message in Operation 3450 indicating it is not possible to satisfy all of the queue's requirements.

However, if the IQUS queue provisioning module determines there is at least one non-chaining channel that meets both of conditions (a) and (b), then the IQUS queue provisioning module selects such a channel in Operation 3430. Note that in particular embodiments, if Operation 3430 is later repeated, then any previously unselected non-chaining channel are selected with each repetition of the operation, to the extent possible (not explicitly shown in FIG. 34).

Next, the IQUS queue provisioning reassigns the agent who is currently channel-assigned to any of the higher queues below the queue currently being provisioned and who has the highest ranking for the selected channel of any such agent to the queue currently being provisioned in Operation 3435. Note that, since the agents channel-assigned to any one of the higher queues are always higher ranked for the channel than the agents channel-assigned to any queue below that higher queue, the act of selecting the highest ranking agent in Operation 3435 for particular embodiments involves picking the highest ranking agent from the higher queue that is below the queue currently being provisioned and is closest to the queue currently being provisioned, out of a set of higher queues below the queue currently being provisioned that still has an agent channel-assigned.

As a result of performing Operation 3435, the number of agents channel-assigned to the queue currently being provisioned for the selected channel has increased by one. Therefore, the percentage of total communication volume for the channel that can be handled by the queue has also increased. Thus, the IQUS queue provisioning module in particular embodiments increases the percentage of total communication volume for the selected channel by duplicating the action previously taken in Operation 3445 in Operation 3440. Note generally, that increasing the percentage has the effect of increasing the communication arrival rate for the queue.

Finally, the IQUS queue provisioning module returns to Operation 3420 and determines if the changes made for the selected channel resulted in the stability requirement for the queue being satisfied. Accordingly, the sequence of Operations 3420, 3425, 3430, 3435, and 3440 is repeated in various embodiments until the stability requirement is determined to be satisfied, or until there is no remaining channel that satisfies conditions (a) and (b) in Operation 3425.

If the stability requirement is determined to be satisfied in Operation 3420, then the IQUS queue provisioning module provides a message in Operation 3455 indicating all of the queue's requirements are satisfied. On the other hand, if the IQUS queue provisioning module determines there is no remaining channel that satisfies conditions (a) and (b) in Operation 3425, then the IQUS queue provisioning module provides a message in Operation 3450 indicating it is not possible to satisfy all of the queue's requirements. Following completion of either Operations 3450 and 3455, the IQUS queue provisioning module completes its execution.

IQUS Next-to-Lowest Queue Module

FIG. 35 provides additional details regarding a process flow for determining if all the requirements for the next-to-lowest queue of an IQUS configuration are satisfied according to various embodiments of the invention. In particular, FIG. 35 is a flow diagram showing an IQUS next-to-lowest queue module for performing such functionality according to various embodiments of the invention. For example, the flow diagram shown in FIG. 35 may correspond to operations carried out by one or more processors in one or more components, such as, for example, the communications handler 150 described above, as it executes the IQUS next-to-lowest queue module stored in the component's volatile and/or nonvolatile memory.

As previously mentioned, the IQUS next-to-lowest queue module may be invoked by the IQUS add one queue module in various embodiments to reassign agents to higher queues in an IQUS configuration. However, the IQUS next-tolowest queue module in other embodiments may not be invoked by the IQUS add one queue module, but may instead be invoked by a different module or independently as a stand-alone module.

The process begins with the IQUS next-to-lowest queue module determining if the stability requirement for the next-to-lowest queue is satisfied in Operation 3510. Unlike the higher queues above it, the next-to-lowest queue does not have the option to pull agents from a queue below it to improve its performance with respect to its stability requirement. If the IQUS next-to-lowest queue module determines the stability requirement for the next-to-lowest queue is not satisfied, then the IQUS next-to-lowest queue module provides a message in Operation 3535 indicating not all the requirements of the next-to-lowest queue are satisfied.

On the other hand, if the IQUS next-to-lowest queue module determines the stability requirement for the next-to-lowest queue is satisfied, then the IQUS next-to-lowest queue module starts the process of checking all the channel service level requirements for the next-to-lowest queue. Accordingly, the IQUS next-to-lowest queue module selects a non-chaining channel in Operation 3515. Next, the IQUS next-to-lowest queue module determines if the service level requirement for the selected channel is satisfied in Operation 3530. If the service level requirement is not satisfied, then the IQUS next-to-lowest queue module provides a message in Operation 3535 indicating not all the requirements of the next-to-lowest queue are satisfied.

However, if the IQUS next-to-lowest queue module determines the service level requirement for the selected channel is satisfied, then the IQUS next-to-lowest queue module determines whether any non-chaining channels remain in Operation 3520. If not, then the IQUS next-to-lowest queue module provides a message in Operation 3525 that all the requirements of the next-to-lowest queue are satisfied and the module completes its execution.

On the other hand, if there is a least one more non-chaining channel remaining, then the IQUS next-to-lowest queue module returns to Operation 3515 and selects another non-chaining channel. The IQUS next-to-lowest queue module then repeats the operations already discussed for the newly selected non-chaining channel. This sequence of operations is repeated until at some point the currently selected non-chaining channel's service level requirement is not satisfied, or there are no more non-chaining channels remaining for the next-to-lowest queue. If no more non-chaining channels are remaining, then the IQUS next-to-lowest queue module provides a message in Operation 3525 indicating all the requirements of the next-to-lowest queue are satisfied. At that point, the IQUS next-to-lowest queue module completes its execution.

IQUS Breakpoints Module

FIG. 36 provides additional details regarding a process flow for determining the breakpoints between the IQUS queues of a treatment according to various embodiments of the invention. In particular, FIG. 36 is a flow diagram showing an IQUS breakpoint module for performing such functionality according to various embodiments of the invention. For example, the flow diagram shown in FIG. 36 may correspond to operations carried out by one or more processors in one or more components, such as, for example, the communications handler 150 described above, as it executes the IQUS breakpoints module stored in the component's volatile and/or nonvolatile memory.

As previously mentioned, the IQUS breakpoints module may be invoked by the IQUS add one queue module in various embodiments to determine the breakpoints between the IQUS queues of a treatment. However, the IQUS breakpoints module in other embodiments may not be invoked by the IQUS add one queue module, but may instead be invoked by a different module or independently as a stand-alone module.

Accordingly, the process begins with the IQUS breakpoints module selecting a non-chaining channel supported by the treatment in Operation 3610. After selecting a channel, the IQUS breakpoints module initializes a fraction total to 0 in Operation 3615. This fraction total is used to accumulate a running sum of fractions of TAP for the channel. Next, the IQUS breakpoints module selects the highest IQUS queue for the treatment that has not been previously selected for the channel in Operation 3620. The IQUS breakpoints module is configured in various embodiments to select the highest queue in the IQUS configuration initially and work down through the queues to the lowest queue in the IQUS configuration.

The fractions (portions) of the TAP that are assigned to each of the higher queues, per channel, are used to define the range of application of each of the higher queues based on the communication value distribution of each non-chaining channel. Those fractions of the TAP always sum to one. Therefore, the IQUS breakpoints module initially selects the highest queue in the IQUS configuration and the breakpoint for this queue in the communication value distribution of the selected channel is such that the set of communications in the distribution that utilize the selected channel with communication values higher than that breakpoint is the fraction of the TAP assigned to the highest queue. Thus, all communications utilizing the selected channel that have communication values higher than the breakpoint are routed to the highest queue.

As for the breakpoint for the next highest queue in the IQUS configuration (the higher queue that sits just below the highest queue in the IQUS configuration), the breakpoint for this queue in the communication value distribution of the selected channel is such that the set of communications in the distribution that utilize the selected channel with communication values higher than that breakpoint is the fraction of the TAP assigned to the highest queue plus the fraction of the TAP assigned to the next highest queue. Thus, all communications utilizing the selected channel that have communication values that are not higher than the breakpoint for the highest queue but are higher than the breakpoint for the next highest queue are routed to the next highest queue. The same process is followed for the remainder of higher queues in the IQUS configuration.

Thus, returning to FIG. 36, the IQUS breakpoints module determines in Operation 3625 that the fractional part of the TAP for the currently selected queue is the fraction total of the TAP determined for the previously selected queues plus the fraction of the TAP for the currently selected queue. The IQUS breakpoints module then determines whether the currently selected queue is the next-to-lowest queue in the IQUS configuration in Operation 3630. If not, then the IQUS breakpoints module determines the breakpoint for the queue based on the fraction total of the TAP portion of the communication value distribution in Operation 3635.

At this point, the IQUS breakpoints module returns to Operation 3620, selects the next queue in the IQUS configuration, and then computes the breakpoint for the newly selected queue via the procedure just described. Accordingly, the IQUS breakpoints module eventually selects the next-to-lowest queue for the IQUS configuration, determines such in Operation 3630, and determines the breakpoint for this particular queue based on the high-low boundary of the communication value distribution in Operation 3640.

Once the IQUS breakpoints module has worked through all of the higher queues for the IQUS configuration and currently selected non-chaining channel, the IQUS breakpoints module determines whether the treatment supports another non-chaining channel in Operation 3645. If so, then the IQUS breakpoints module returns to Operation 3610, selects the next non-chaining channel, and performs the operations discuss above with respect to the newly selected channel. Once the IQUS breakpoints module has process all of the non-chaining channels supported by the treatment, the process ends.

Relationships Between Modules

Figure 37:
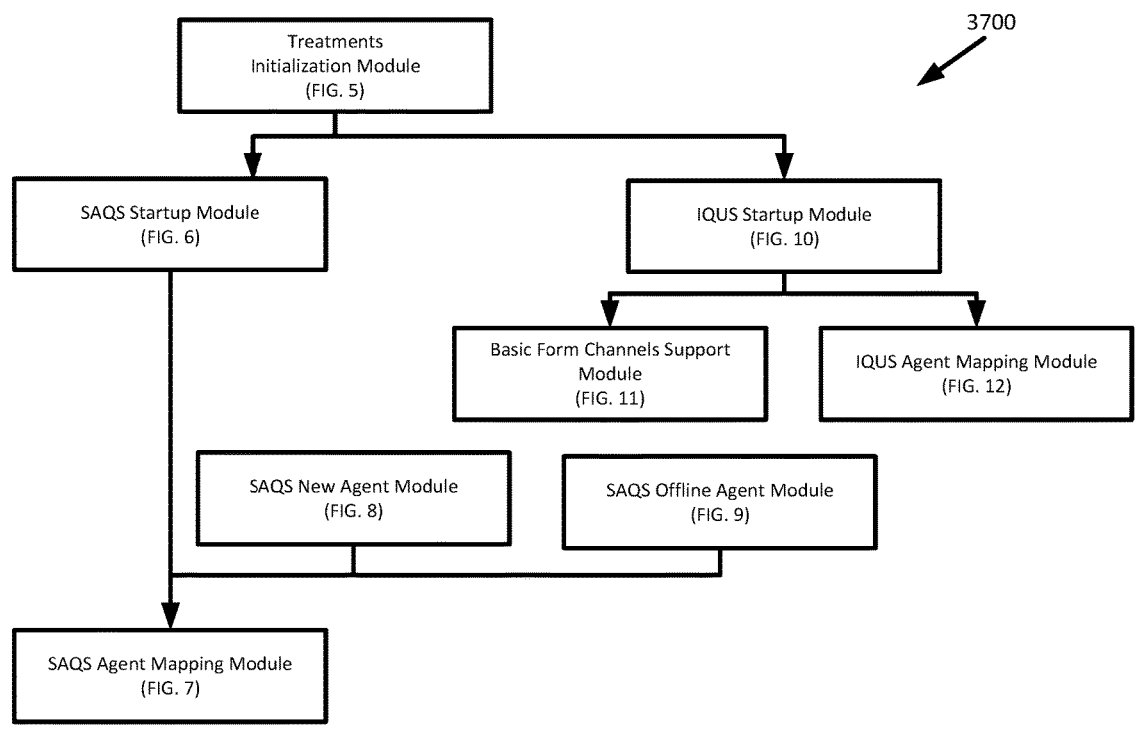
FIGS. 37-39 illustrations relationships between various modules in accordance with various embodiments of the present invention.
Figure 38:
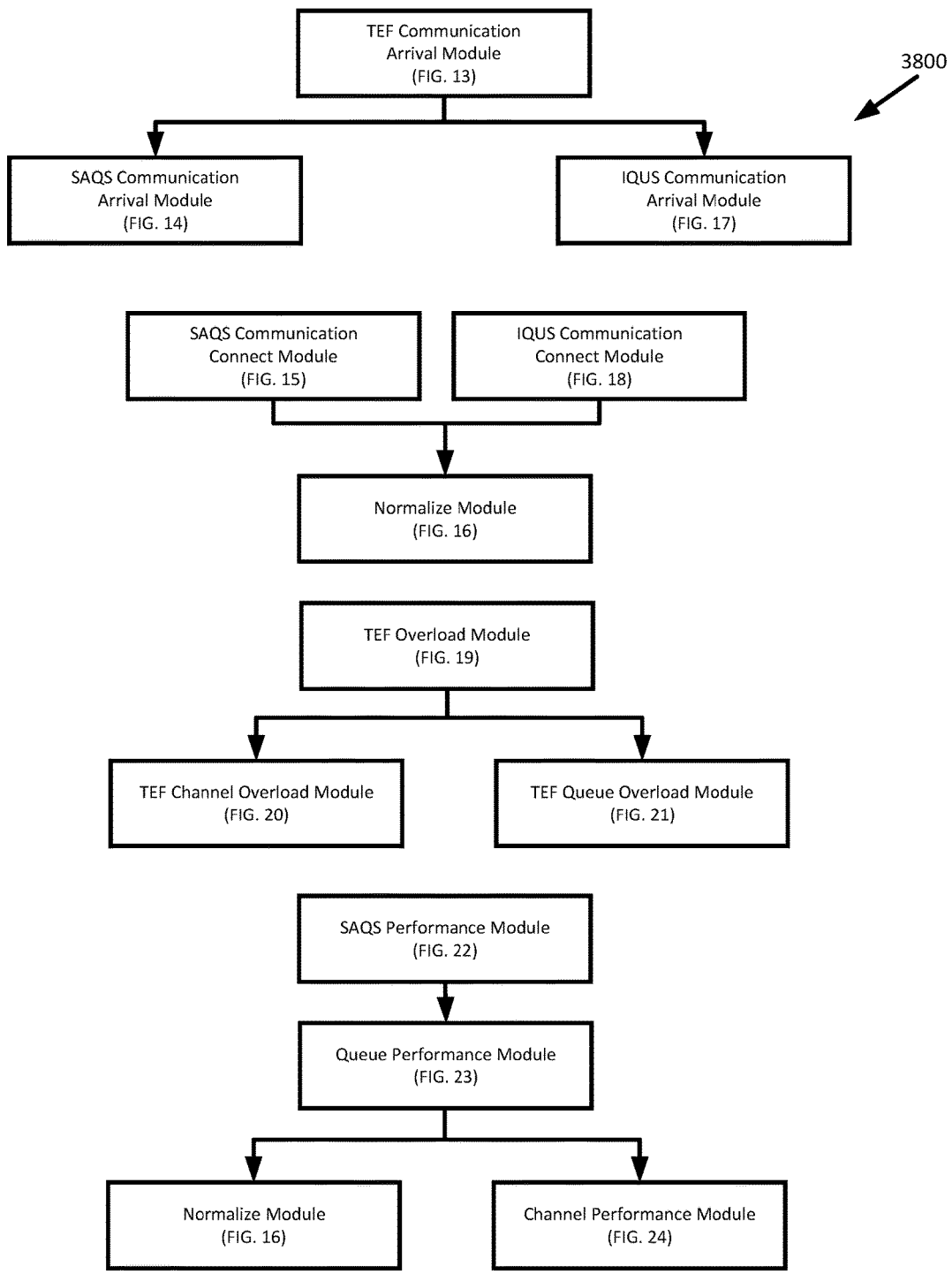
Figure 39:
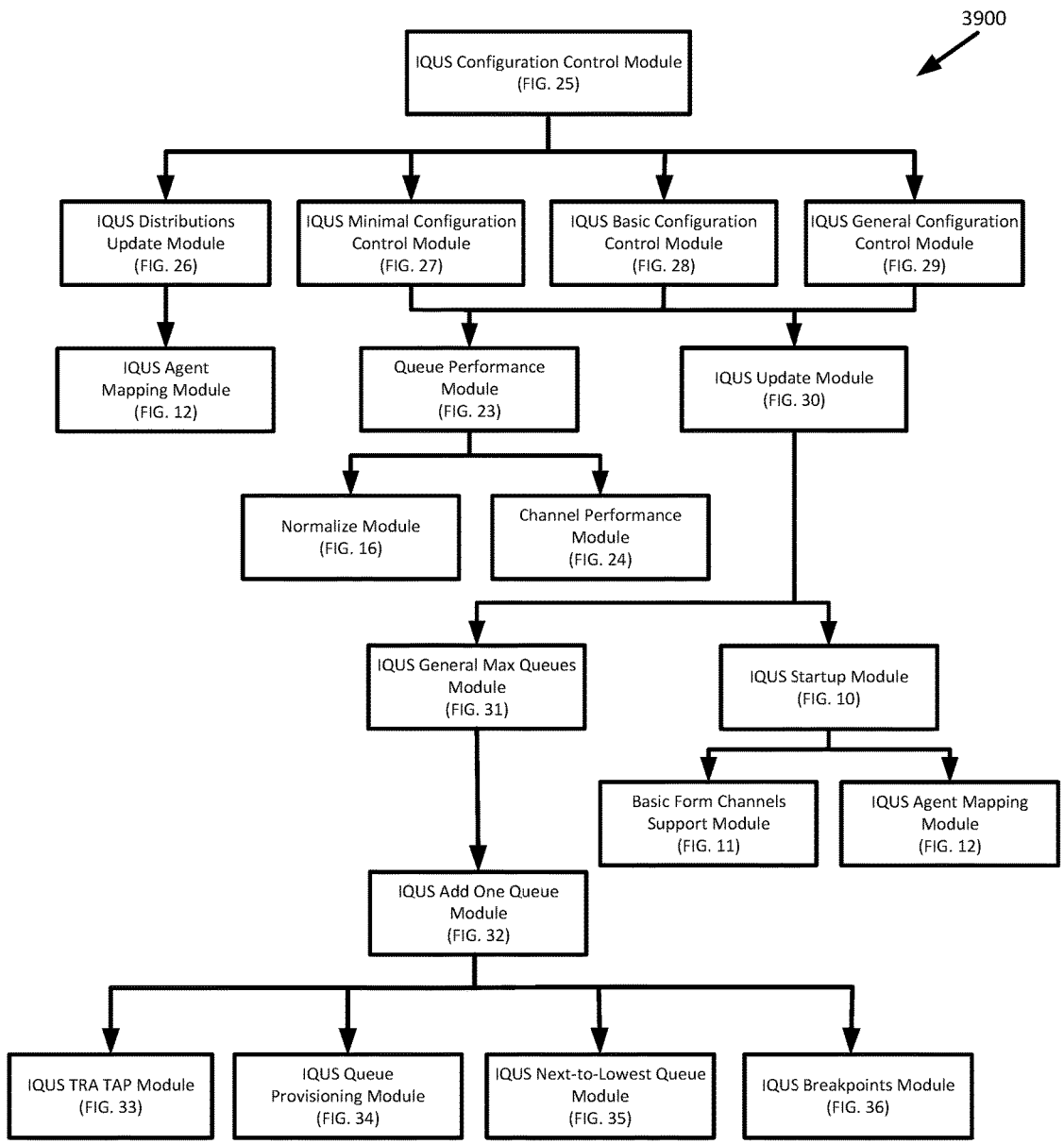

FIGS. 37-39 provides the relationships 3700, 3800, 3900 between the modules described herein with respect to various embodiments of the invention. Here, the figures demonstrate the operational flow between modules and which modules are invoking other modules depending on the embodiment.

Exemplary Processing Device Architecture

Figure 40:
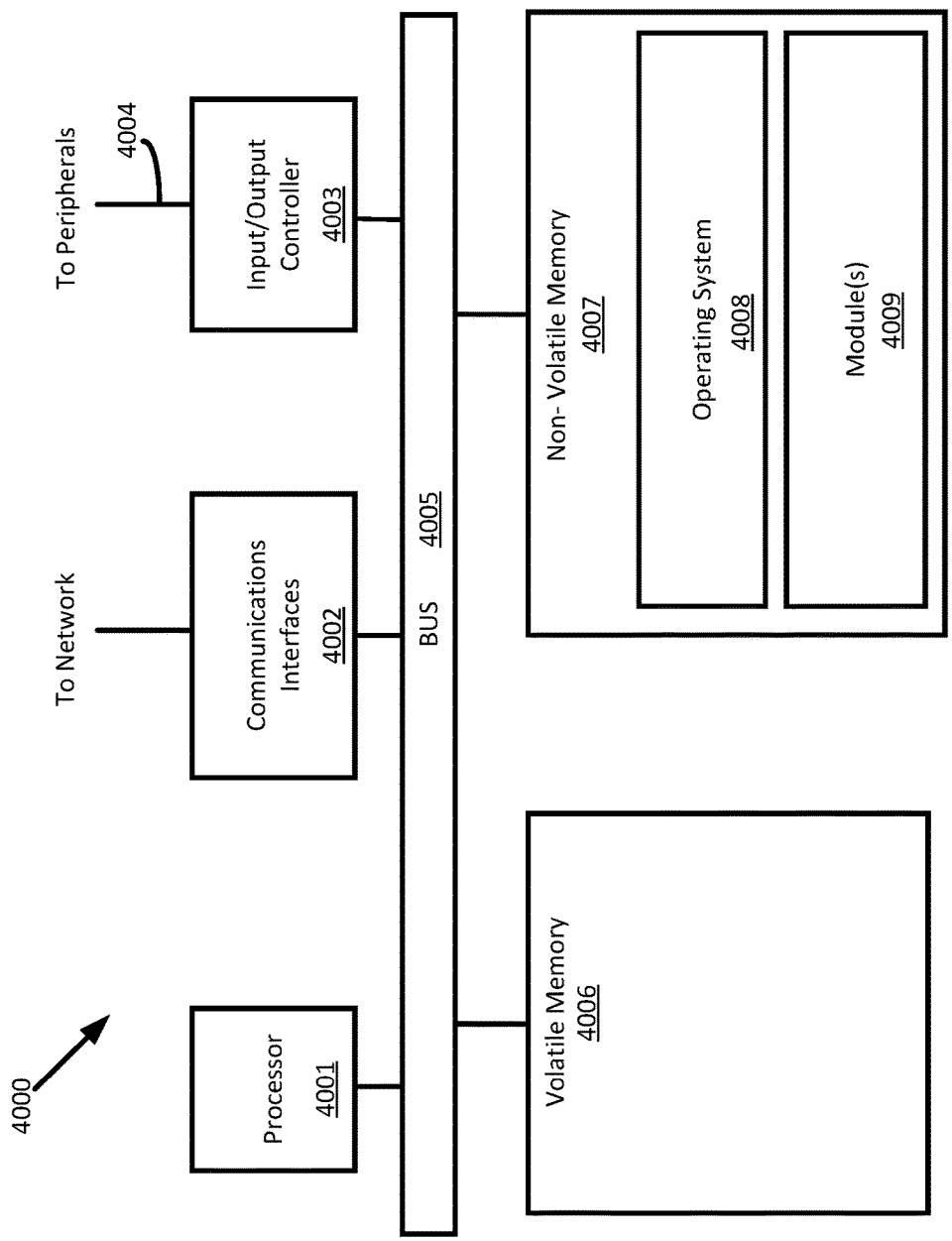
FIG. 40 is an exemplary schematic diagram of a processing component used in various embodiments of the contact center architecture to practice the technologies disclosed herein.

As discussed in conjunction with FIG. 1, the contact center architecture 100 may comprise various components. Accordingly, FIG. 40 is an exemplary schematic diagram of a processing component 4000 that may be used in various embodiments of the contact center architecture 100 to practice the technologies disclosed herein such as, for example, the communications handler 150, the email server 135, the text gateway server 140, the web server 145, and/or an agent's computing device 160a-160c. In general, the term "processing component" may be exemplified by, for example, but without limitation: various types of computers, servers, blades, gateways, switches, and the like, as well as any combination of devices or entities adapted to perform the functions described herein.

As shown in FIG. 40, the processing component 4000 may include one or more processors 4001 that may communicate with other elements within the processing component 4000 via a bus 4005. The processor 4001 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing component 4000 may also include one or more communication interfaces 4002 for communicating data via the local network with various external devices, such as other components of FIG. 1. Depending on the embodiment, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The processing component 4000 may further include an input/output controller 4003 that may communicate with one or more input devices or peripherals using an interface 4004, such as, but not limited to: a keyboard, a mouse, a touch screen/display input, microphone, pointing device, etc. The input/output controller 4003 may also communicate with output devices or peripherals, such as displays, printers, speakers, headsets, banner displays, etc.

The processor 4001 may be configured to execute instructions stored in volatile memory 4006, non-volatile memory 4007, or other forms of computer-readable storage media accessible to the processor 4001. The volatile memory 4006 may comprise various types of memory technologies, including, but not limited to: random access memory ("RAM"), dynamic random access memory ("DRAM"), static random access memory ("SRAM"), and other forms well known to those skilled in the art. The non-volatile memory 4007 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 4007 may store program code and data, which also may be loaded into the volatile memory 4006 at execution time. Specifically, the non-volatile memory 4007 may store one or more program modules 4009, such as the various modules described above containing instructions for performing the processes and/or functions associated with the technologies disclosed herein, and/or operating system code 4008. In addition, these program modules 4009 may also access, generate, or store data 4010, in the non-volatile memory 4007, as well as in the volatile memory 4006. The volatile memory 4006 and/or non-volatile memory 4007 may be used to store other information including, but not limited to: records, applications, programs, scripts, source code, object code, byte code, compiled code, interpreted code, machine code, executable instructions, or the like. These may be executed or processed by, for example, the processor 4001 and/or may form a part of, or may interact with, the program modules 4009.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for routing a communication involving a remote party in a contact center comprising:
   selecting a treatment for the communication by a computer processor from a plurality of treatments supported by the contact center, in which each treatment in the plurality of treatments (1) is applicable to at least one of a reason and an opportunity for conducting communications, (2) comprises a plurality of agents assigned to handle communications placed in the treatment, and (3) comprises a set of queues in which each queue in the set of queues comprises a value range and an agent from the plurality of agents who is assigned to handle communications placed in the queue;
   determining by the computer processor whether the communication is part of an existing chain of communications being conducted between the remote party and a particular agent of the plurality of agents assigned to handle communications placed in the selected treatment;
   in response to determining the communication is part of the existing chain of communications:
      placing the communication in the queue from the set of queues associated with the particular agent; and
      connecting the communication to the particular agent upon the particular agent becoming available; and
   in response to determining the communication is not part of the existing chain of communications:
      determining a communication value for the communication by the computer processor, the communication value defining an expected payback from applying the selected treatment to the communication;
      identifying a target agent from the plurality of agents who are designated to handle communications placed in the selected treatment by the computer processor based on the communication value for the communication being within the value range for the queue from the set of queues associated with the target agent;
      placing the communication in the queue associated with the target agent; and
      connecting the communication to the target agent upon the target agent becoming available.

2. The method of claim 1 further comprising determining the target agent has a capacity for handling the communication prior to placing the communication in the queue associated with the target agent.

3. The method of claim 2, wherein determining the target agent has the capacity for handling the communication is based on a virtualization discipline comprising a set of constraints placed on the target agent with respect to what combinations and numbers of communications from different channels of communication the target agent may handle concurrently.

4. The method of claim 1, wherein the value range for each queue of the set of queues for the selected treatment is sequentially positioned to the value range for another queue of the set of queues for the selected treatment.

5. The method of claim 4, wherein each agent is assigned to each queue of the set of queues based on a ranking of the agent with respect to the other agents in the plurality of agents.

6. The method of claim 1 further comprising determining a priority value for the communication placed in the queue associated with the target agent based on the communication value for the communication and an amount of time the communication has waited in the queue, wherein the communication is connected with the target agent upon the target agent becoming available based on the priority value for the communication being higher than priority values for all other communications that have been placed in the queue associated with the target agent.

7. A non-transitory, computer-readable medium comprising computer-executable instructions for routing a communication involving a remote party in a contact center, that when executed, cause at least one computer processor to:
   select a treatment for the communication from a plurality of treatments supported by the contact center, in which each treatment in the plurality of treatments (1) is applicable to at least one of a reason and an opportunity for conducting communications, (2) comprises a plurality of agents assigned to handle communications placed in the treatment, and (3) comprises a set of queues in which each queue in the set of queues comprises a value range and an agent from the plurality of agents who is assigned to handle communications placed in the queue;
   determine whether the communication is part of an existing chain of communications being conducted between the remote party and a particular agent of the plurality of agents assigned to handle communications placed in the selected treatment;
   in response to determining the communication is part of the existing chain of communications:
      place the communication in the queue from the set of queues associated with the particular agent; and
      have the communication connected to the particular agent upon the particular agent becoming available; and
   in response to determining the communication is not part of the existing chain of communications:
      determine a communication value for the communication, the communication value defining an expected payback from applying the selected treatment to the communication;
      identify a target agent from the plurality of agents who are designated to handle communications placed in the selected treatment by the computer processor based on the communication value for the communication being within the value range for the queue from the set of queues associated with the target agent;
      place the communication in the queue associated with the target agent; and
      have the communication connected to the target agent upon the target agent becoming available.

8. The non-transitory, computer-readable medium of claim 7, wherein the computer-executable instructions further cause the at least one computer processor to determine the target agent has a capacity for handling the communication prior to placing the communication in the queue associated with the target agent.

9. The non-transitory, computer-readable medium of claim 8, wherein the computer-executable instructions cause the at least one computer processor to determine the target agent has the capacity for handling the communication based on a virtualization discipline comprising a set of constraints placed on the target agent with respect to what combinations and numbers of communications from different channels of communication the target agent may handle concurrently.

10. The non-transitory, computer-readable medium of claim 7, wherein the value range for each queue of the set of queues for the selected treatment is sequentially positioned to the value range for another queue of the set of queues for the selected treatment.

11. The non-transitory, computer-readable medium of claim 10, wherein each agent is assigned to each queue of the set of queues based on a ranking of the agent with respect to the other agents in the plurality of agents.

12. The non-transitory, computer-readable medium of claim 7, wherein the computer-executable instructions further cause the at least one computer processor to determine a priority value for the communication placed in the queue associated with the target agent based on the communication value for the communication and an amount of time the communication has waited in the queue, and the communication is connected with the target agent upon the target agent becoming available based on the priority value for the communication being higher than priority values for all other communications that have been placed in the queue associated with the target agent.

13. A system for routing a communication in a contact center comprising:
    at least one computer processor configured to:
        select a treatment for the communication from a plurality of treatments supported by the contact center, in which each treatment in the plurality of treatments (1) is applicable to at least one of a reason and an opportunity for conducting communications, (2) comprises a plurality of agents assigned to handle communications placed in the treatment, and (3) comprises a set of queues in which each queue in the set of queues comprises a value range and an agent from the plurality of agents who is assigned to handle communications placed in the queue;
        determine whether the communication is part of an existing chain of communications being conducted between the remote party and a particular agent of the plurality of agents assigned to handle communications placed in the selected treatment;
        in response to determining the communication is part of the existing chain of communications:
            place the communication in the queue from the set of queues associated with the particular agent; and
            have the communication connected to the particular agent upon the particular agent becoming available; and
        in response to determining the communication is not part of the existing chain of communications:
            determine a communication value for the communication, the communication value defining an expected payback from applying the selected treatment to the communication;
            identify a target agent from the plurality of agents who are designated to handle communications placed in the selected treatment by the computer processor based on the communication value for the communication being within the value range for the queue from the set of queues associated with the target agent;
            place the communication in the queue associated with the target agent; and
            have the communication connected to the target agent upon the target agent becoming available.

14. The system of claim 13, wherein the at least one computer processor is further configured to determine the target agent has a capacity for handling the communication prior to placing the communication in the queue associated with the target agent.

15. The system of claim 14, wherein the at least one computer processor is configured to determine the target agent has the capacity for handling the communication based on a virtualization discipline comprising a set of constraints placed on the target agent with respect to what combinations and numbers of communications from different channels of communication the target agent may handle concurrently.

16. The system of claim 13, wherein the value range for each queue of the set of queues for the selected treatment is sequentially positioned to the value range for another queue of the set of queues for the selected treatment.

17. The system of claim 16, wherein each agent is assigned to each queue of the set of queues based on a ranking of the agent with respect to the other agents in the plurality of agents.

18. The system of claim 13, wherein the at least one computer processor is further configured to determine a priority value for the communication placed in the queue associated with the target agent based on the communication value for the communication and an amount of time the communication has waited in the queue, and the communication is connected with the target agent upon the target agent becoming available based on the priority value for the communication being higher than priority values for all other communications that have been placed in the queue associated with the target agent.

* * * * *